United States Patent
Fujiwara et al.

(10) Patent No.: US 6,924,924 B2
(45) Date of Patent: Aug. 2, 2005

(54) MULTI-WAVELENGTH GENERATING METHOD AND APPARATUS BASED ON FLATTENING OF OPTICAL SPECTRUM

(75) Inventors: Masamichi Fujiwara, Tokyo (JP); Katsuhiro Araya, Tokyo (JP); Mitsuhiro Teshima, Tokyo (JP); Junichi Kani, Tokyo (JP); Kenichi Suzuki, Tokyo (JP)

(73) Assignee: Nippon Telegraph and Telephone Corporation (JP)

(*) Notice: Subject to any disclaimer, the term of this patent is extended or adjusted under 35 U.S.C. 154(b) by 133 days.

(21) Appl. No.: 10/655,675

(22) Filed: Sep. 4, 2003

(65) Prior Publication Data

US 2004/0100682 A1 May 27, 2004

Related U.S. Application Data

(62) Division of application No. 09/900,613, filed on Jul. 6, 2001.

(30) Foreign Application Priority Data

| Jul. 7, 2000 | (JP) | 2000-207475 |
| Jul. 7, 2000 | (JP) | 2000-207494 |
| Jul. 19, 2000 | (JP) | 2000-218424 |
| Sep. 1, 2000 | (JP) | 2000-266125 |

(51) Int. Cl.[7] .............. G02F 2/02; G02F 1/01; G02B 6/293; G02B 6/27
(52) U.S. Cl. ............ 359/326; 385/11; 385/24; 359/259
(58) Field of Search .............. 359/326–332, 359/254, 259; 385/1, 11, 15, 24

(56) References Cited

U.S. PATENT DOCUMENTS

| 3,746,879 A | * | 7/1973 | Esaki et al. ............ 359/328 |
| 5,062,112 A | * | 10/1991 | Buchman et al. .......... 372/3 |
| 5,436,757 A | * | 7/1995 | Okazaki et al. .......... 359/332 |
| 6,154,310 A | * | 11/2000 | Galvanauskas et al. ..... 359/328 |

OTHER PUBLICATIONS

A Multiwavelength Source Having Precise Channel Spacing for WDM Systems, J.J. Veselka and S.K. Korotky, Fellow, IEEE Phototonics Technology Letters, vol. 10, No. 7, Jul. 1998.

More Than 1000 Channel Optical Frequency Chain Generation from Single Supercontinuum Source with 12.5 GHz Channel Spacing, H. Takara et al., Electronics Letters, vol. 36, No. 25, Dec. 7, 2000.

3.17–THz Frequency–Difference Measurement Between Lasers Using Two Optical Frequency Combs, M. Kourogi et al., IEEE Photonics Technology Letters, vol. 8, No. 4, Apr. 1996.

Modulation Characteristics of Waveguide–Type Optical Frequency Comb Generator, T. Saitoh et al., Journal of Lightwave Technology, vol. 16, No. 5, May 1998.

Tunable Gain Equalization Using a Mach–Zehnder Optical Filter in Multistage Fiber Amplifiers, K. Inoue et al., IEEE Photonics Technology Letters, vol. 3, No. 8, Aug. 1991.

3 Tbit/s (160 Gbit/s×19 channel) Optical TDM and WDM Transmission Experiment, S. Kawanishi et al., Electronics Letters, vol. 35, No. 10, May 13, 1999.

* cited by examiner

*Primary Examiner*—John D. Lee
(74) *Attorney, Agent, or Firm*—Ostrolenk, Faber, Gerb & Soffen, LLP

(57) ABSTRACT

A multi-wavelength generating apparatus generates a wavelength division multiplexing (WDM) signal by modulating light with a single central frequency and with an electric signal having a particular pulse repetition frequency. The resulting optical spectrum configuration is controllable so that a Relative Intensity Noise (RIN) or Signal to Noise Ratio (SNR) requirement may be achieved. A modulated or pulsed light source is used to obtain a discrete spectrum with particular mode spacing, which is then modulated to permit dynamic power control for specific modes of the discrete spectrum.

7 Claims, 74 Drawing Sheets

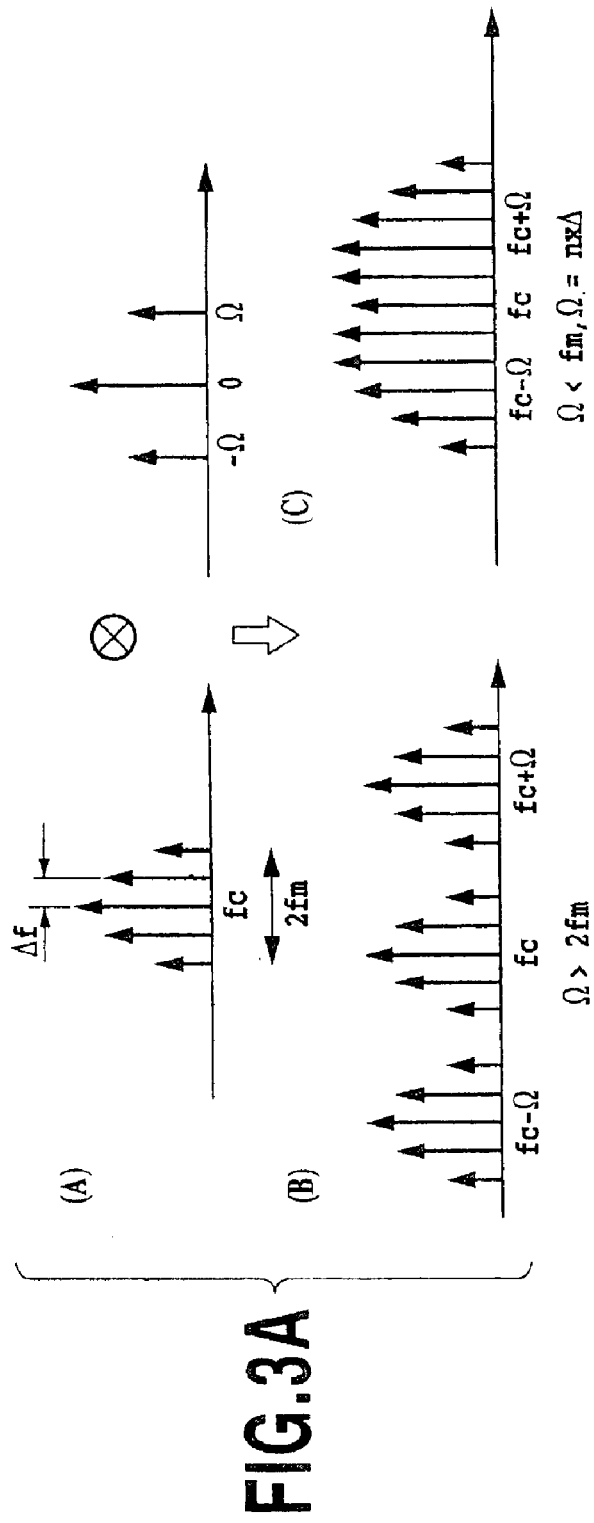
FIG.3A
FIG.3B
FIG.3C

FIG. 53 PRINCIPLE OF GENERATION OF MULTI-WAVELENGTH LIGHT FROM MULTI-WAVELENGTH LIGHT SOURCE

FIG.65 RELATIONSHIP BETWEEN STIMULATED EMISSION LIGHT AND SPONTANEOUS EMISSION LIGHT FROM SEMICONDUCTOR LASER

ODD-NUMBER-TH LIGHT SOURCE WAVELENGTH AND SIDE MODES

EVEN-NUMBER-TH LIGHT SOURCE WAVELENGTH AND SIDE MODES

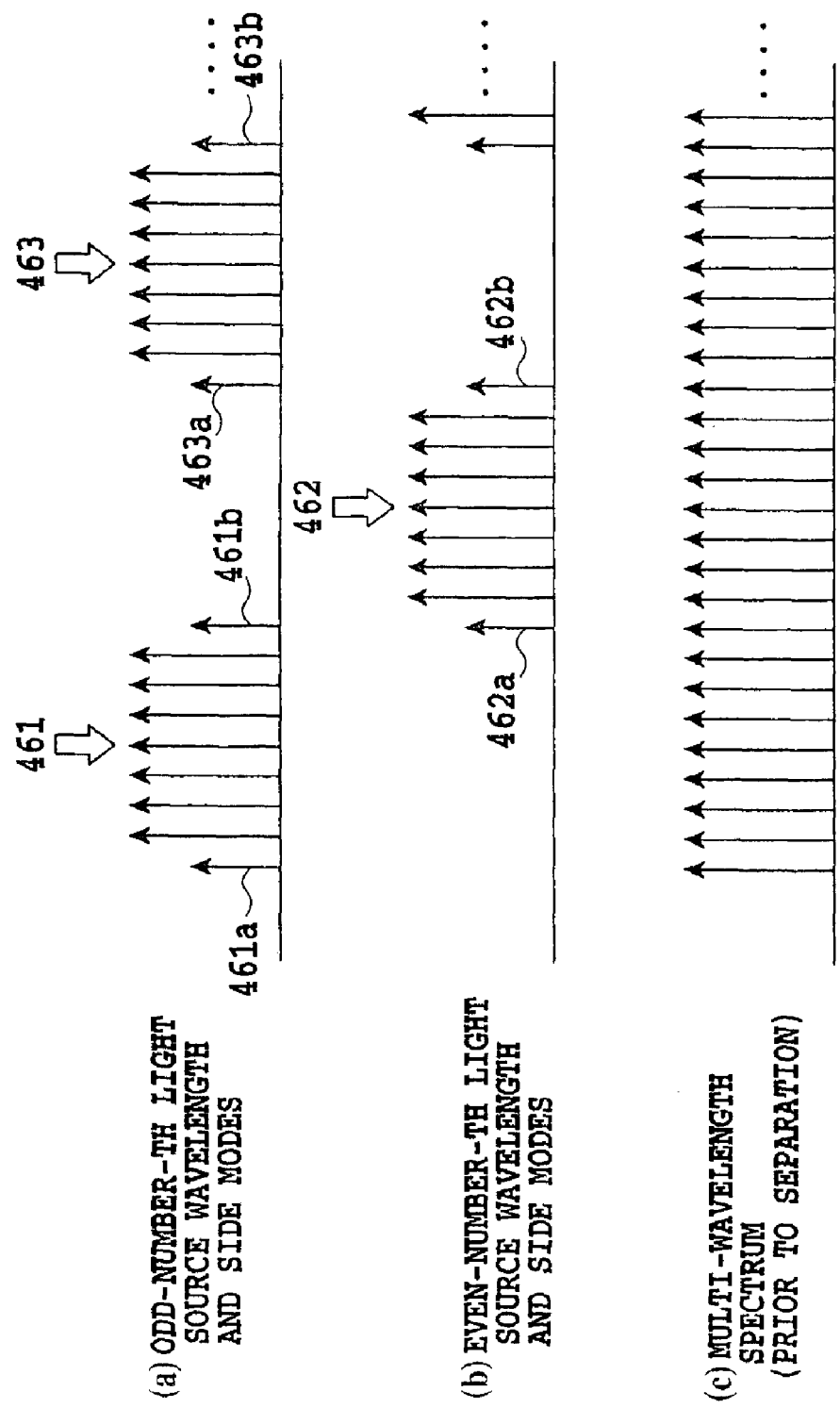

MULTI-WAVELENGTH GENERATING METHOD AND APPARATUS BASED ON
FLATTENING OF OPTICAL SPECTRUM

CROSS REFERENCE TO RELATED APPLICATION

The present application is a divisional under 37 C.F.R. §1.53(b) of prior application Ser. No. 09/900,613, filed Jul. 6, 2001, by Masamichi Fujiwara et al. entitled "MULTI-WAVELENGTH GENERATING METHOD AND APPARATUS BASED ON FLATTENING OF OPTICAL SPECTRUM" which is based on Japanese Patent Application Nos. 2000-207475 and 2000-207494 both filed Jul. 7, 2000, 2000-218424 filed Jul. 19, 2000 and 2000-266125 filed Sep. 1, 2000.

This application is based on Japanese Patent Application Nos. 2000-207475 and 2000-207494 both filed Jul., 7, 2000, 2000-218424 filed Jul. 19, 2000 and 2000-266125 filed Sep. 1, 2000, the content of which is incorporated hereinto by reference.

BACKGROUND OF THE INVENTION

1. Field of the Invention

The present invention relates to a collective multi-wavelength generating technique for use in the field of optical communication technologies, and in particular, to elimination of power level deviations among the modes of a discrete optical spectrum, collective generation of a multi-wavelength light with a plurality of central wavelengths from a light with a single central wavelength, controlling an optical spectrum shape, while slicing a spectrum of coherent multi-wavelength output from a multi-wavelength light source and modulating the coherent multi-wavelength from the multi-wavelength light source with a plurality of optical modulators, output from the multi-wavelength light source so as to cause noise characteristic at inputs and outputs of the optical modulators to satisfy a design value, and collective generation of a plurality of optical carriers of different wavelengths from a plurality of input lights.

2. Background of the Invention

FIG. 1 shows an example of the configuration of a conventional WDM (Wavelength Division Multiplexing) transmission system. In FIG. 1, an optical transmitter 50 is composed of semiconductor lasers (for example, distribution feedback lasers: DFB-LD) 51-1 to 51-n having different wavelengths defined in a transmission specification (for example, the ITU-T G.692 recommendation), optical modulators 52-1 to 52-n for modulating optical outputs from the semiconductor lasers by means of transmitted signals, a multiplexer 53 for multiplexing modulated signal lights to output a WDM signal light, and an optical amplifier 55. An optical receiver 70 connected to the optical transmitter 50 via a transmission path optical fiber 60 is composed of an optical amplifier 71 for amplifying the transmitted WDM signal light, a demultiplexer 72 for demultiplexing the WDM signal light into signal lights of different wavelengths, and receivers 73-1 to 73-n for receiving the signal lights of the different wavelengths.

The semiconductor lasers require a wavelength stabilizing circuit to maintain the wavelength accuracy defined in the transmission specification because they are characterized by having their oscillation wavelengths shifted due to deviations in temperature and injected current and varied with temporal deviations. Since the wavelength stabilization must be carried out for each semiconductor laser, the area of the apparatus occupied by the wavelength stabilizing circuit increases consistently with the number of wavelength multiplexing operations required and with the wavelength multiplexing density. Accordingly, the costs of a light source used must be reduced in order to realize dense WDM transmissions involving a large number of wavelengths.

Such a configuration with a plurality of semiconductor lasers employs a method of generating a multi-wavelength light composed of a plurality of wavelengths, by using a demultiplexer with a plurality of output ports to filter (spectrum slicing) a continuous or discrete optical spectrum of a wide band output from a single optical element or circuit. Light sources for generating such a continuous optical spectrum of a wide band include optical amplifiers for outputting an amplified spontaneous emission (ASE) light. Light sources for generating discrete optical spectra include pulsed light sources for outputting a recurrent short optical pulse, and optical circuits for generating a sideband composed of discrete modes by modulating (intensity or phase modulation) a CW (continuous wave) light output from a semiconductor laser.

A light obtained by slicing a spectrum of the ASE light, however, is incoherent and thus unsuitable for dense WDM transmissions involving a large number of wavelengths. On the other hand, a repetition short optical pulse or a discrete spectrum obtained by modulating a continuum has longitudinal modes discretely distributed on a frequency axis at the same intervals as a repetition frequency; these longitudinal modes are very coherent. Thus, this optical circuit can be replaced for the conventional system and is suited for the wavelength-dividing multiplexing method. In general, however, the above described multi-wavelength light obtained by slicing an optical spectrum of a wide band has large power level deviations among channels, thus requiring such power adjustments that the wavelength channels have an equal power.

Another method comprises eliminating power level deviations by using an optical filter with a transmission characteristic reverse to that of an optical spectrum of a multi-wavelength light in order to restrain the power level deviations. For the recurrent short optical pulse, a method is used which comprises generating a flattened wide-band optical spectrum of a wide band by positively using a non-linear optical fiber, as in a process of generating a supercontinuum by allowing a light to pass through the non-linear optical fiber.

While flattening involved in such supercontinuum generation, the input power of a given seed pulse, the dispersion profile of the non-linear fiber, and the fiber length ought to be designed so that an output optical spectrum of the seed pulse is flattened and has a wide band after being output from the non-linear fiber. Such design and production, however, is in effect difficult. Further, since the shape of the optical spectrum is uniquely determined by its design parameters, it is impossible to dynamically control power level deviations among the longitudinal modes. Moreover, the process of flattening an optical spectrum using the optical filter with the reverse transmission characteristic also has problems in design difficulty and uniquely decided output spectrum as in the above described supercontinuum generation.

It is a first object of the present invention to provide an optical-spectrum flattening method and apparatus which has a simple and inexpensive configuration and which enables the control of power level deviations among the modes of a discrete optical spectrum.

It is a second object of the present invention to provide a collective multi-wavelength generating apparatus which has a simple and inexpensive configuration and which makes it possible to generate, without the need to design a complicated optical circuit, a WDM signal with a flattened optical spectrum by modulating a light with a single central frequency by means of an electric signal of a particular pulse repetition frequency.

It is a third object of the present invention to provide a coherent multi-wavelength signal generating apparatus, in a configuration controllable shape of an optical spectrum of a multi-wavelength light, which controls the shape of the optical spectrum of the multi-wavelength light such that a predetermined RIN (Relative Intensity Noise) or SNR (Signal to Noise Ratio) value required from parameters of transmission system, the type and distance of optical fibers, the number of repeaters is obtained, by using the above described multi-wavelength generating apparatus to generate the multi-wavelength light.

It is a fourth object of the present invention to provide a multi-wavelength light source having a simple and inexpensive configuration that does not require a complicated optical circuit to be designed, the light source being realized by taking a plurality of lights into the above described multi-wavelength generating apparatus and making it possible to generate a WDM signal with a flattened optical spectrum without any interfering noise.

SUMMARY OF THE INVENTION

A method according to the present invention comprises a first process of obtaining a discrete spectrum of a mode spacing $\Delta f$ using an output light obtained by modulating the amplitude or phase of a CW output from a single-wavelength light source or an output light from a pulsed light source or an optical-pulse output circuit for outputting a pulsed light of a repetition frequency $\Delta f$, and a second process of modulating the discrete spectrum of the mode spacing $\Delta f$ at a frequency $\Omega < 2$ fm when the discrete spectrum has a band 2 fm, thereby making it possible to dynamically control power level deviations among the longitudinal modes of the discrete spectrum.

The above and other objects, effects, features and advantages of the present invention will become more apparent from the following description of embodiments thereof taken in conjunction with the accompanying drawings.

BRIEF DESCRIPTION OF THE DRAWINGS

FIGS. 3A to 3C are characteristic diagrams showing how an optical spectrum is flattened on the basis of modulation-based frequency shift according to the first aspect of the present invention.

FIGS. 71(a)–71(c) are views useful in explaining an example of the shape of modulated side mode lights according to the second embodiment of the multi-wavelength light source of the aspect of the present invention shown in FIG. 66.

BEST MODE FOR CARRYING OUT THE INVENTION

[Basic Configuration: 1]

First, the basic configuration of the present invention will be described.

Figure 1:
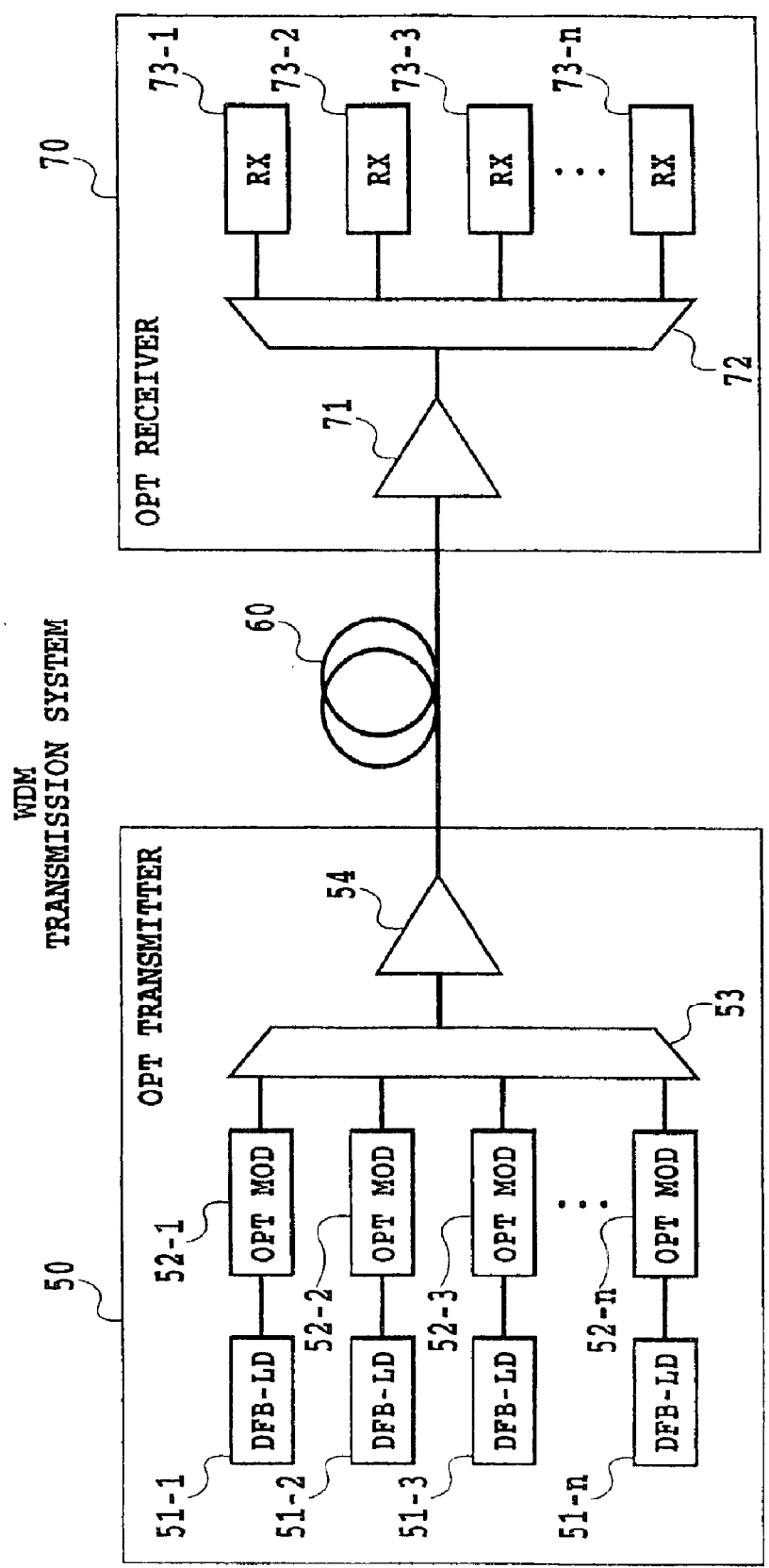
FIG. 1 is a view showing an example of the configuration of a conventional WDM transmission system.
Figure 2:
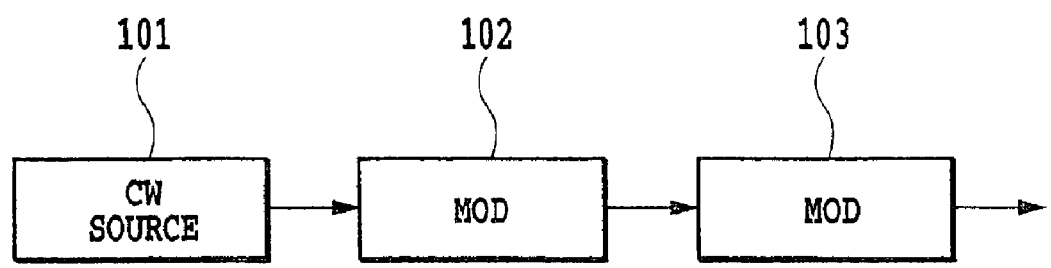
FIG. 2 is a block diagram showing the basic configuration of an apparatus for realizing an optical-spectrum flattening method according to a first aspect of the present invention.

FIG. 2 shows an example of the configuration of an apparatus for realizing an optical-spectrum flattening method according to a first embodiment of the present invention. This optical-spectrum flattening apparatus is composed of a continuum source 101 for outputting a single wavelength, a modulator 102 for outputting a light by modulating the amplitude or phase of a temporal waveform of the light output from the CW light source 101 to apply a fixed correlationship to the phases of the modes of a discrete optical spectrum of the output light, and a modulator 103 for modulating the amplitude or phase of the modulated wave output from the modulator 102 to shift a discrete optical spectrum of the modulated wave to an upper or lower sideband and regulating the frequency shift amount to control power level deviations among the modes.

(Basic Operation)

FIGS. 3A to 3C show how an optical spectrum is flattened on the basis of optical-spectrum shifts based on modulations carried out by the modulators 102 and 103. First, the modulator 102 applies a fixed correlationship to the phases of the modes of a discrete optical spectrum to generate a new discrete optical spectrum. At this time, the amplitude of each mode has an arbitrary value (FIG. 3A). The central frequency of the band (2 fm) of this discrete optical spectrum is defined as fc, and the phase of each mode is defined as $\theta n$ (n=0, 1, 2, . . . ). For simplicity, the modes are assumed to be spaced at equal intervals ($\Delta f$).

The modulator 103 modulates the amplitude or phase of a temporal waveform with a frequency shift $\Omega$, which is composed of a discrete optical spectrum of which each mode has the phase $\theta n$. In this case, the discrete optical spectrum is sifted $\pm\Omega$ from the central frequency fc on the frequency axis, that is, sifted to an upper or lower sideband (FIG. 3A).

When the frequency shift $\Omega$ is $\Omega$<2 fm, the discrete optical spectrum around the central frequency fc overlaps discrete optical spectra obtained by sifting the original discrete optical spectrum $\pm\Omega$ (FIG. 3A). In particular, if $\Omega=n\times\Delta f$, then the modes of the discrete optical spectra overlap each other. It is now assumed that a plurality of modes overlap each other at a frequency $\upsilon$. When the amplitude of each of the overlapping modes is defined as Am and its phase is defined as $\theta m$ (m=1, 2, . . . ) and if $\beta m = Am\times exp\{j(\theta m)\}$, then the electric field Em of each mode is given by the following equation:

$$Em(t) = \beta m \times exp(j2\pi\upsilon t) \quad (1)$$

Em(t) can be considered a two-dimensional vector on a complex plane (amplitude and phase diagram) when its real part is indicated on the axis of abscissa and when its imaginary part is indicated on the axis of ordinate. The overlap at the frequency $\upsilon$ is given as superimposition of two-dimensional vectors of each mode on the complex plane (FIG. 3B shows an example of the superimposition in which two modes overlap at the frequency $\upsilon$, for simplicity). If the phase $\theta m$ of each mode varies randomly, a superimposed wave moves randomly on the complex plane, and the phase and amplitude thereof are unstable.

On the other hand, a superimposed wave with the phases of the modes, which are correlated with one another, will be considered. For example, if the phases $\theta m$ of the modes are the same ($\theta m=\theta 0$), a multiplexed wave is obtained by adding only the amplitudes thereof together (FIG. 3C) and thus always has a fixed amplitude. Thus, for a stable output, a fixed correlationship must be applied to the phases of the modes.

(Basic Configuration 2)

In a second aspect according to the present invention, a pulsed light source or an optical-pulse output circuit for outputting a pulse repetition frequency light is used during the above first process.

Figure 4:
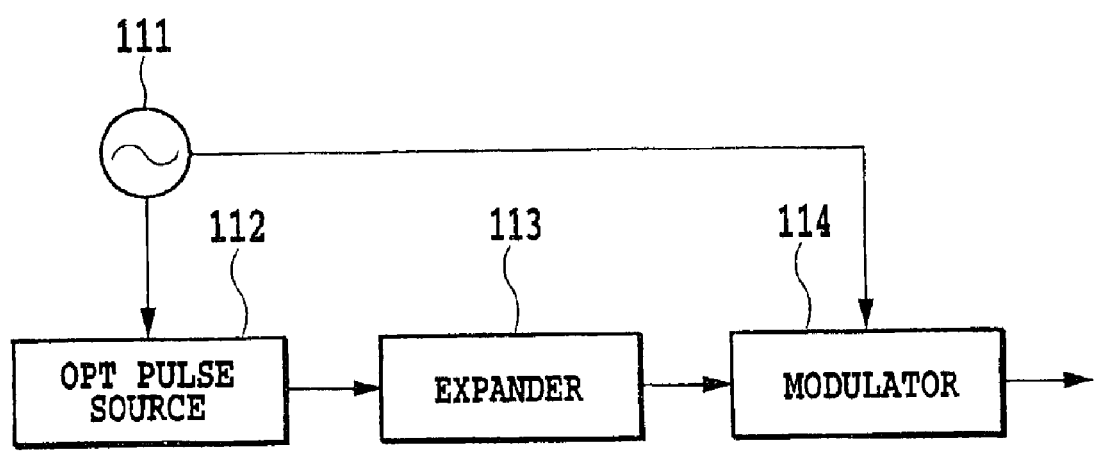
FIG. 4 is a block diagram showing the basic configuration of an optical-spectrum flattening apparatus for reducing a modulation band by means of pulse expansion according to a second aspect of the present invention.

FIG. 4 shows the configuration of an optical-spectrum flattening apparatus as a special example of the second aspect according to the present invention. This apparatus comprises a first constituting part composed of a pulsed light source or an optical-pulse generator 112 for outputting an optical pulse of a pulse width (or full width at half maximum) t0 a pulse repetition frequency $\Delta f$ (t0<<(1/$\Delta f$), an oscillator 111 for driving the pulsed light source or optical-pulse generator 112, and a pulse expander 113 for expanding the pulse width of a pulsed light (or the full width at half maximum), as wall as a second constituting part. The above first process is carried out using the first constituting part. A subsequent process is carried out using the second constituting part. That is, a modulator 114 modulates the amplitude or phase of the expanded optical pulse using a modulating frequency $\Omega$. The modulator 114 synchronizes with the oscillator 111.

(Basic Operation)

The above aspect of the present invention provides a method of flattening an optical pulse whose pulse width (or full width at half maximum) t0 and pulse repetition frequency $\Delta f$ meet a relationship t0<<(1/$\Delta f$). If this method is used for an optical pulse whose pulse width (or full width at half maximum) is very small compared to its pulse repetition frequency 1/$\Delta f$, a modulating frequency that is faster than the frequency of this optical pulse is required in order to provide sufficient modulations during the second process. Thus, when the pulse width (or full width at half maximum) is expanded before the second process, effects similar to those achieved by the second process of the first aspect are obtained using a modulating frequency substantially the same as the pulse repetition frequency of the optical pulse. This second aspect is effective on a recurrent optical pulse having a spectrum of a wide band and in particular, having a pulse width (or full width at half maximum) of several picoseconds or less.

[Basic Configuration 3]

Figure 5:
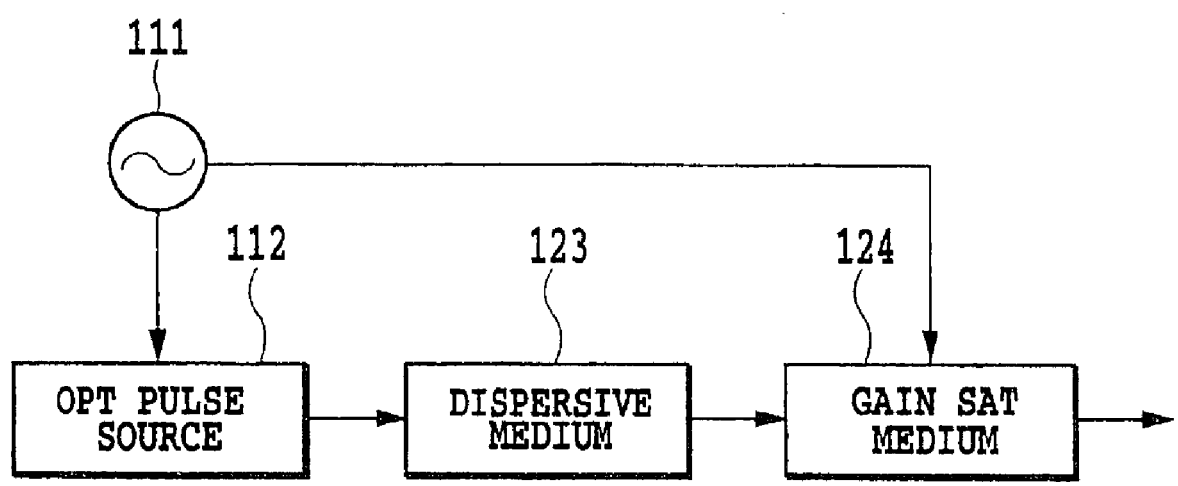
FIG. 5 is a block diagram showing the basic configuration of an optical-spectrum flattening apparatus utilizing a gain saturated medium according to a deviation of the second aspect of the present invention.

FIG. 5 shows an example of the configuration of an apparatus for realizing the optical-spectrum flattening method utilizing a gain saturated medium according to a deviation of the second aspect of the present invention. This apparatus is composed of the optical-pulse generator 112 for outputting an optical pulse of the pulse repetition frequency $\Delta f$, the oscillator 111 for driving the pulsed light source or optical-pulse generator 112, a dispersive medium for expanding the pulse width (or full width at half maximum) of the optical pulse output from the pulsed light source or optical-pulse generator 112, and a gain saturated medium 124 for generating a saturated output from the peak power of the optical pulse output from a dispersive medium 123.

Next, specific embodiments of the present invention will be described in detail.

[First Embodiment of the Optical-Spectrum Flattening Apparatus]

Figure 6:
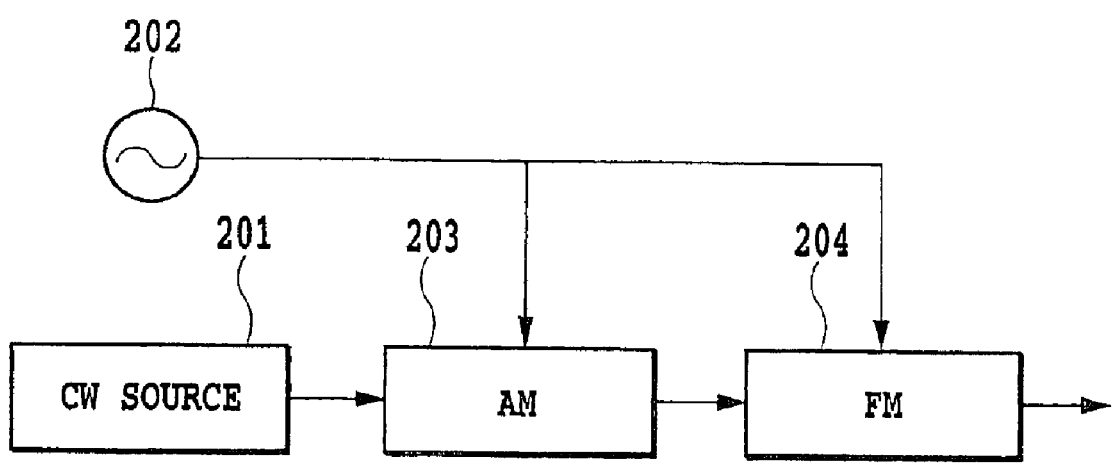
FIG. 6 is a block diagram showing the configuration of a first embodiment of an optical-spectrum flattening apparatus of the present invention.

FIG. 6 shows the configuration of an apparatus for implementing the optical-spectrum flattening method according to the first embodiment of the present invention. This optical-spectrum flattening apparatus can be used to carry out a process of generating a discrete optical spectrum with a fixed correlationship applied to the phases of the modes thereof and a process of sifting the discrete optical spectrum on the frequency axis. The generation process is carried out using a CW light source 201 for outputting a continuous wave of a single frequency fc and an amplitude modulator 203 driven by a sinusoidal wave of a frequency $\Delta f$ output from an oscillator 202. The frequency shifting step is carried out using an amplitude modulator 204 synchronizing with the oscillator 202.

Then, the physical parameters used herein will be defined.

$\Delta f$: repetition frequency that modulates the amplitude or phase of a CW output from a single-wavelength light source, as well as the repetition frequency of a pulsed light (=mode spacing of a discrete spectrum)

$\Omega$: modulating frequency used in a sifting process of discrete spectrum on a frequency axis fc: central frequency of the single-wavelength light source 2 fm: discrete spectrum band obtained during the first process Further, the Fourier transformation and reverse Fourier transformation are defined by the following equations:

$$F(f) = \int_{-\infty}^{\infty} f(t)\exp(-j2\pi ft)dt \quad (2)$$

$$f(t) = \int_{-\infty}^{\infty} F(f)\exp(j2\pi ft)df \quad (3)$$

An output light from the CW light source 201 is defined by:

$$f(t)=A\cos(2\pi fct+\phi) \quad (4)$$

where ($2\pi fc=\omega c$) denotes a carrier angular frequency and $\phi$ denotes an initial phase.

When this CW optical output has its amplitude modulated with the modulating frequency $\Delta f$ by the amplitude modu lator 203, an output from the amplitude modulator 203 is expressed by the following equation:

$$fam(t)=A\{1+\cos(2\pi\Delta ft)\}\cos(2\pi fct+\phi) \quad (5)$$

A spectrum Fam(f) of the modulated wave is expressed by the following equation, in which an upper and lower sidebands are formed so as to be separate from the carrier frequency fc by $\pm\Delta f$:

$$Fam(f)=\pi A[\delta(f-fc)+\delta(f-fc-\Delta f)/2+\delta(f-fc+\Delta f)/2] \quad (6)$$

where $\delta(\times)$ denotes a delta function. In this case, the modes of each sideband have the same amplitude as a carrier because the amplitude modulator 203 synchronizes with the oscillator 202. The phases of the modes are correlated with one another.

Furthermore, if the modulating frequency $\Omega=\Delta f$, an amplitude waveform from the amplitude modulator 204 is expressed by the following equation:

$$gam(t)=\cos(2\pi\Delta ft) \quad (7)$$

Accordingly, the final output of the amplitude modulator 204 is expressed by the following equation:

$$fout(t)=fam(t)\times gam(t) \quad (8)$$

In this case, when spectra of waveforms fam(t) and gam(t) are defined as Fam(f) and Gam(f), respectively, a spectrum F(f) is given by means of convolution [Fam(f) * Gam(f)]. Then, the following equation holds:

$$F(f)=(\pi A/2)[\delta(f-fc)+\delta(f-fc+\Delta f)+\delta(f-fc-\Delta f)+\delta(f-fc+2\Delta f)/2+\delta(f-fc-2\Delta f)/2] \quad (9)$$

Such an amplitude modulation causes overlapping of the modes of a discrete optical spectrum obtained by sifting the original discrete optical spectrum $+\Delta f$ and the modes of a discrete optical spectrum obtained by sifting the original discrete optical spectrum $-\Delta f$, at frequencies fc, fc$\pm\Delta f$, and fc$\pm 2\Delta f$. Consequently, as is apparent from a comparison between the above equations (9) and (6), an optical spectrum with reduced level deviations among the modes can be output.

[Second Embodiment of the Optical-Spectrum Flattening Apparatus]

Figure 8:
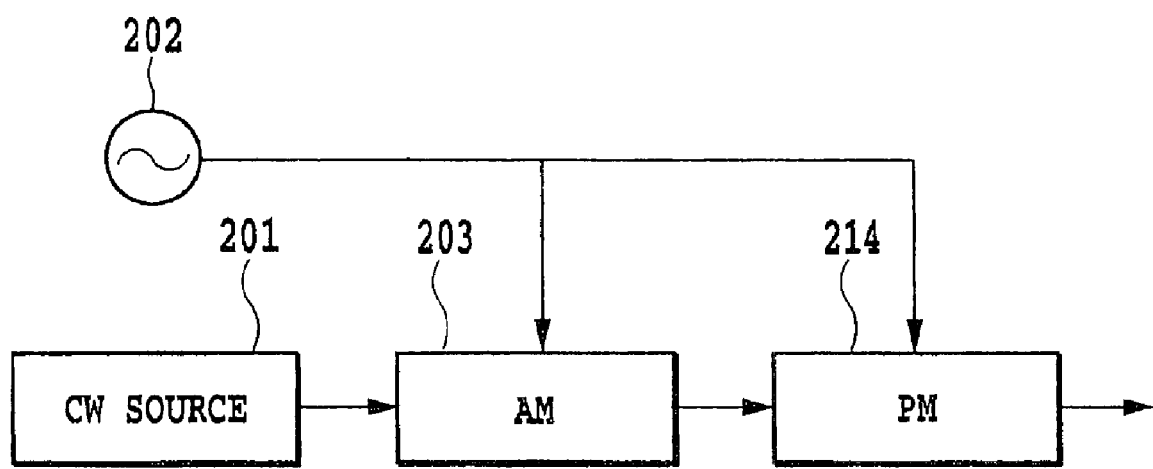
FIG. 8 is a block diagram showing the configuration of a second embodiment of the optical-spectrum flattening apparatus according to the present invention.

FIG. 8 shows the configuration of an apparatus for realizing the optical-spectrum flattening apparatus according to the second embodiment of the present invention. This optical-spectrum flattening apparatus comprises a phase modulator 214 synchronizing with the oscillator 202, instead of the amplitude modulator 204 in FIG. 6. The phase modulator 214 can vary the frequency shift amount by varying a modulation index for phase modulations. That is, a greater amount of frequency shifts than that of a phase modulation frequency is obtained. The remaining part of the configuration is similar to that in the first embodiment.

The ability of the configuration of this embodiment to flatten an output optical spectrum using will be described with reference to FIG. 7.

Figure 7:
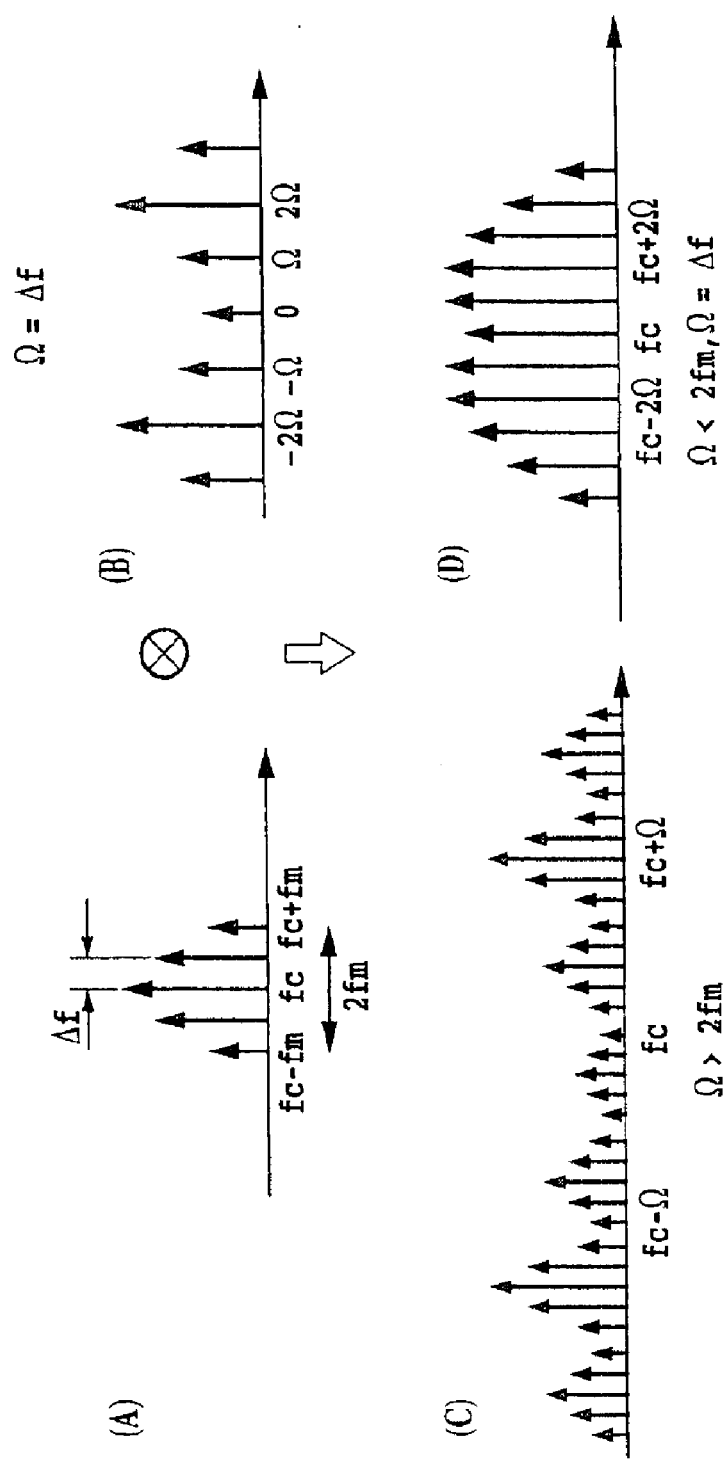
FIGS. 7(A)–7(D) are characteristic diagrams showing how an optical spectrum is flattened on the basis of optical spectrum shifts based on phase modulation according to the first embodiment of the optical-spectrum flattening apparatus of the present invention.

Reference numeral (A) in FIG. 7 shows an optical spectrum obtained by the amplitude modulator 203 by modulating the amplitude of an optical carrier of the central frequency fc from the CW light source 201. The spectrum band obtained is defined as 2 fm. Reference numeral (B) in FIG. 7 shows an optical spectrum output from the phase modulator 214, which has modulated the phase of an input CW light with the repetition frequency $\Omega=\Delta f$. At this time, the modulation index for the phase modulator 214 is set so that the frequency shift $2\Omega(=2\Delta f)$.

An output optical spectrum from the configuration in FIG. 8 is represented by convolution of the spectra in FIG. 7. If Ω>2 fm, then the spectra obtained by the frequency shift do not overlap each other, so that the output optical spectrum is prevented from being flattened as shown by Reference numeral (C) in FIG. 7. If 2 fm>Ω, then the spectra obtained by the frequency shift overlap each other, so that the output optical spectrum is flattened as shown, for example in the case of Ω=Δf (<2 fm), as shown by Reference numeral (D) in FIG. 7.

[Third Embodiment of the Optical-Spectrum Flattening Apparatus]

Figure 9:
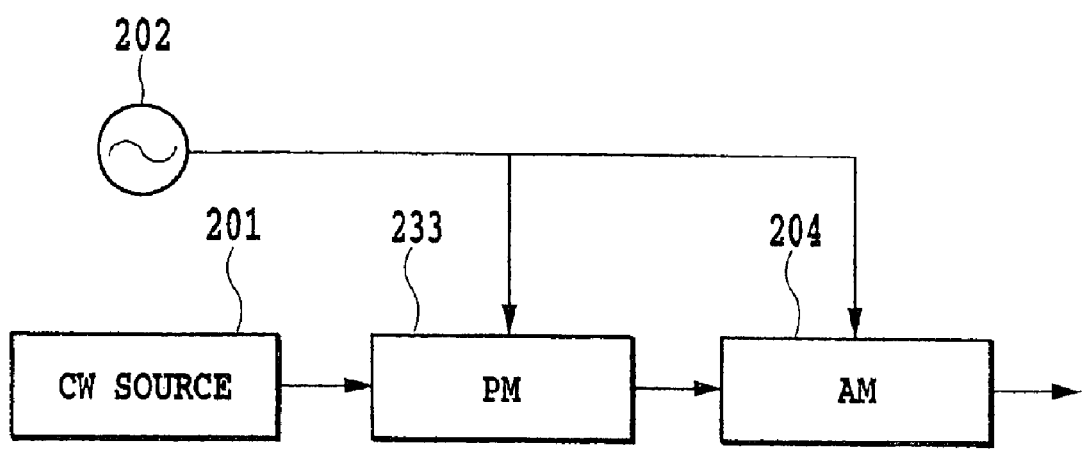
FIG. 9 a block diagram showing the configuration of a third embodiment of the optical-spectrum flattening apparatus according to the present invention.

FIG. 9 shows the configuration of an apparatus for realizing the optical-spectrum flattening apparatus according to the third embodiment of the present invention. In this optical-spectrum flattening apparatus, means for generating a discrete optical spectrum with a fixed correlationship applied to the phases of the modes thereof is composed of the CW light source 201 and a phase modulator 233. Further, means for sifting the discrete optical spectrum on the frequency axis is composed of the amplitude modulator 203 synchronizing with the oscillator 202.

[Fourth Embodiment of the Optical-Spectrum Flattening Apparatus]

Figure 10:
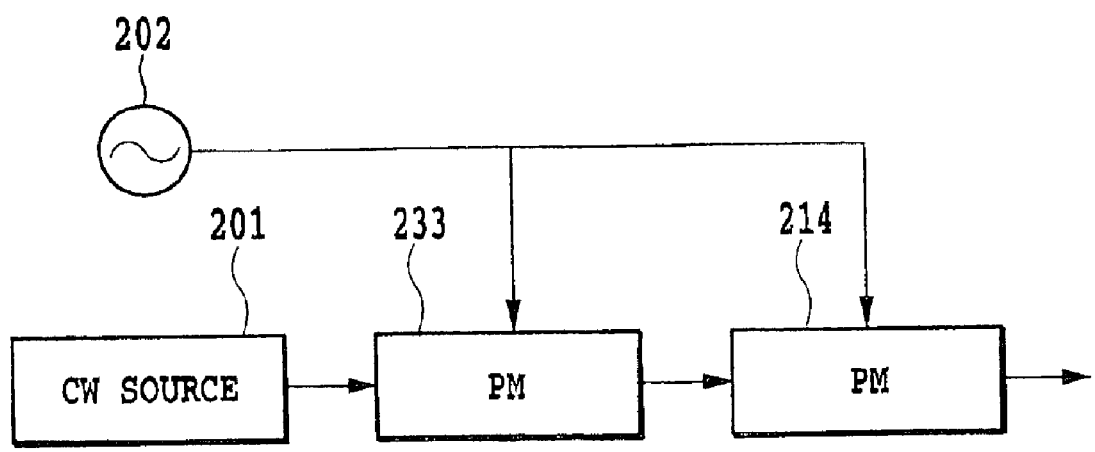
FIG. 10 is a block diagram showing the configuration of a fourth embodiment of the optical-spectrum flattening apparatus according to the present invention.

FIG. 10 shows the configuration of an apparatus for realizing the optical-spectrum flattening apparatus according to the fourth embodiment of the present invention. In this optical-spectrum flattening apparatus, the means for sifting a discrete optical spectrum on the frequency axis is composed of the phase modulator 233 synchronizing with the oscillator 202. The remaining part of the configuration is similar to that in the third embodiment in FIG. 9.

[Fifth Embodiment of the Optical-Spectrum Flattening Apparatus]

Figure 11:
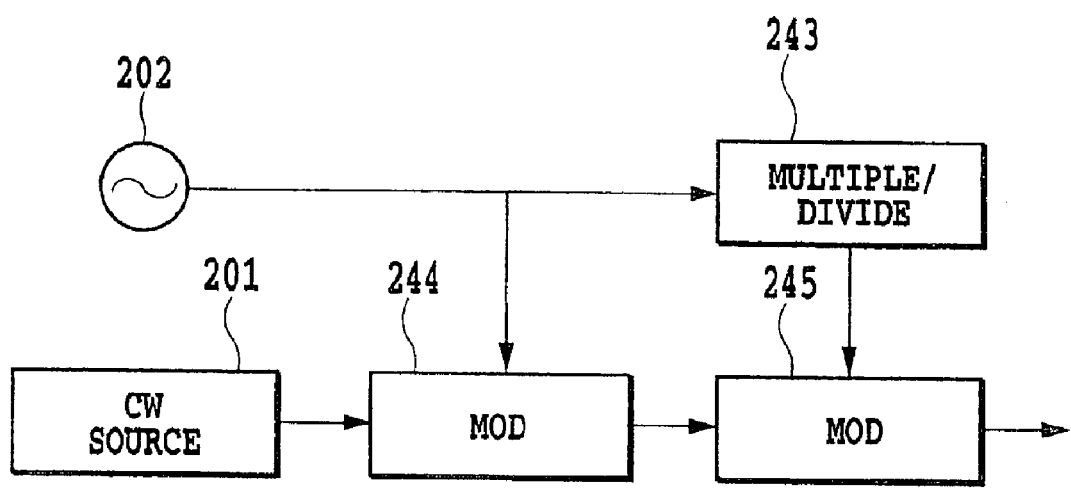
FIG. 11 a block diagram showing the configuration of a fifth embodiment of then optical-spectrum flattening apparatus according to the present invention.

FIG. 11 shows the configuration of an apparatus for realizing the optical-spectrum flattening apparatus according to the fifth embodiment of the present invention. As means for controlling a shift in a discrete optical spectrum, this optical-spectrum flattening apparatus has a multiplier (or divider) 243 for multiplying (or dividing) the frequency of a driving signal output from the oscillator 202. A modulator 245 controls the frequency shift amount of the discrete optical spectrum depending on the multiplied (or divided) frequency from the multiplier (or divider) 243.

A modulator 244 located before the multiplier (divider) 243 as means for generating a discrete optical spectrum with a fixed correlationship applied to the phases of the modes thereof is the amplitude modulator 203 in FIG. 6 or 8 or the phase modulator 223 or 233 in FIG. 9 or 10, respectively. The modulator 245 located after the multiplier (divider) 243 as means for sifting the discrete optical spectrum is the amplitude modulator 204 in FIG. 6 or 9 or the phase modulator in FIG. 8.

[Sixth Embodiment of the Optical-Spectrum Flattening Apparatus]

Figure 12:
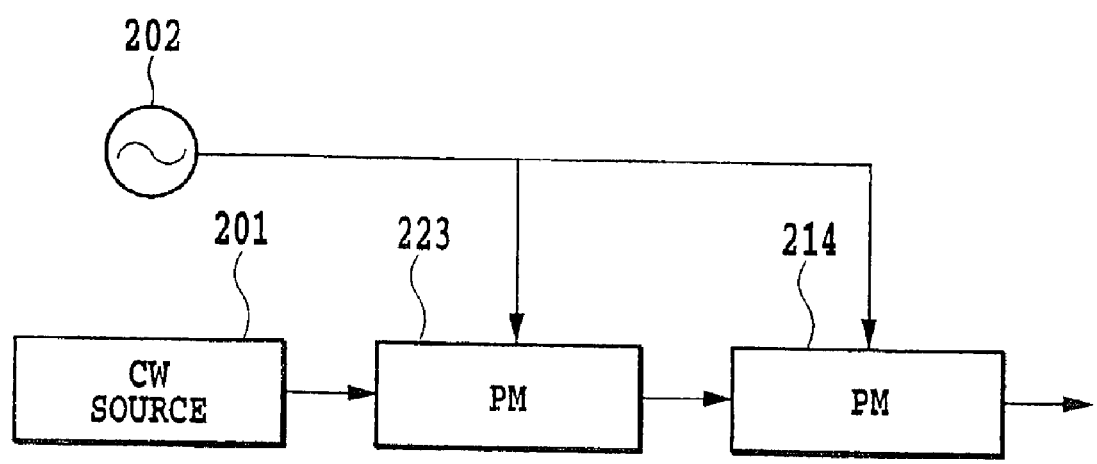
FIG. 12 is a block diagram showing the configuration of a sixth embodiment of the optical-spectrum flattening apparatus according to the present invention.

FIG. 12 shows the configuration of an apparatus for realizing the optical-spectrum flattening apparatus according to the sixth embodiment of the present invention. As means for controlling the frequency shift amount of a discrete optical spectrum, this optical-spectrum flattening apparatus has the phase modulator 214 for counting the modulation index for phase modulations. For wide-band phase modulations having a fixed modulation index or more, the phase modulator 214 generates a higher sideband to provide a larger frequency shift amount. The remaining part of the configuration is similar to that in the third embodiment in FIG. 9.

[Seventh Embodiment of the Optical-Spectrum Flattening Apparatus]

Figure 13:
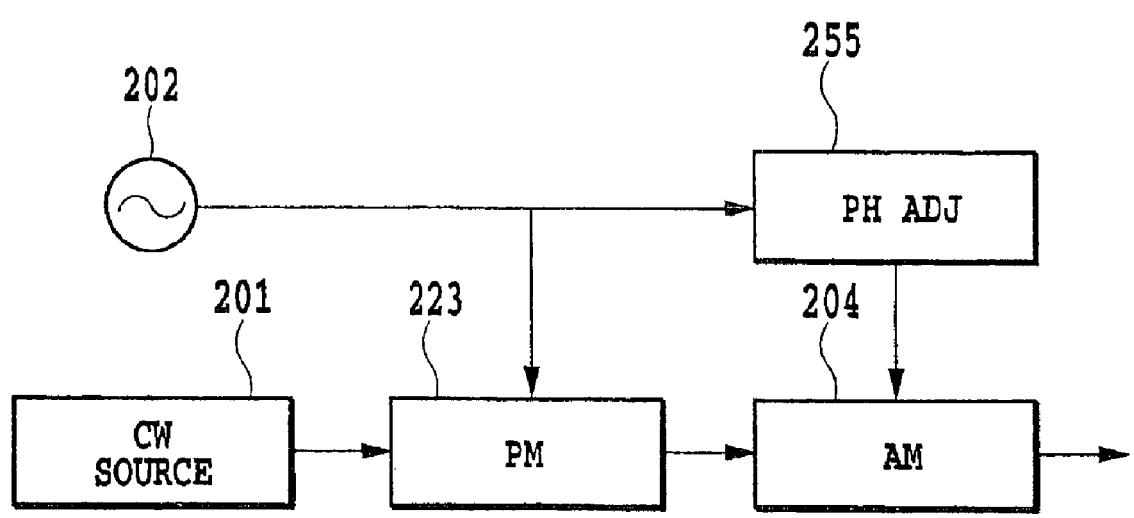
FIG. 13 a block diagram showing the configuration of a seventh embodiment of the optical-spectrum flattening apparatus according to the present invention.

FIG. 13 shows the configuration of an apparatus for realizing the optical-spectrum flattening apparatus according to the seventh embodiment of the present invention. This optical-spectrum flattening apparatus is characterized by having a phase adjuster 255 for controlling the phase of a driving signal from the oscillator 202, as means for controlling level deviations among the modes of a discrete optical spectrum. The driving signal having its phase controlled by the phase adjuster 255 is provided for the amplitude modulator 204. The remaining part of the configuration is similar to that in the third embodiment in FIG. 9.

By way of example, a description will be given of a case in which a discrete optical spectrum obtained by modulating the phase of a CW light to apply a fixed correlationship to the phases of its modes has its amplitude modulated. For simplicity, it is assumed that the driving signal from the oscillator 202 is a sinusoidal wave; this sinusoidal wave, provided for the amplitude modulator 204, has its phase controlled by the phase adjuster 255. In this case, it is assumed that the driving signal to the phase modulator 204 has its amplitude modulated by advancing the phase by θ. An output waveform from the phase modulator 223 is given by the following equation:

$$fpm(t)=\cos(2\pi fct+m\cos 2\pi\Delta ft) \quad (10)$$

where fc represents a carrier frequency, Δf represents a modulated frequency, and m represents a modulation index.

Further, a temporal waveform from the amplitude modulator 204 is given by the following equation:

$$m(t)=A(1+\cos(2\pi\Delta ft+\theta)) \quad (11)$$

Thus, the final output is given by the following equation:

$$f(t)=fpm(t)\times fam(t) \quad (12)$$

In this case, when spectra of the waveforms fpm(t) and fam(t) are defined as Fpm(f) and Fam(f), a spectrum F(f) is given by the following equation:

$$F(f)=[Fpm(f)*Fam(f)] \quad (13)$$

where * represents convolution.

$$F(f)=\Sigma Jn(m)\delta(f-fc-n\Delta f)(n=0,\pm 1,\pm 2,\ldots) \quad (14)$$

where Σ represents the sum of n=0, ±1, ±2, ±3, . . . ±∞. Further, Jn denotes Bessel functions of the order n.

For simplicity, it is assumed that in the case of narrow-band modulations for m<<1, |n|=3 or more is negligible. The phases of the modes are shown below.

$$J_0(m)J0=A\pi[+jm\cos\theta/2]$$

$$J_{+1}(m)J+1=A\pi[\cos\theta+j(m+\sin\theta)]/2$$

$$J_{-1}(m)J-1=A\pi[\cos\theta+j(m-\sin\theta)]/2$$

$$J_{+2}(m)J+2=A\pi m\exp j(\theta+\pi/2)/4$$

$$J_{-2}(m)J-2=A\pi m\exp-j(\theta-\pi/2)/4 \quad (15)$$

Figure 14:
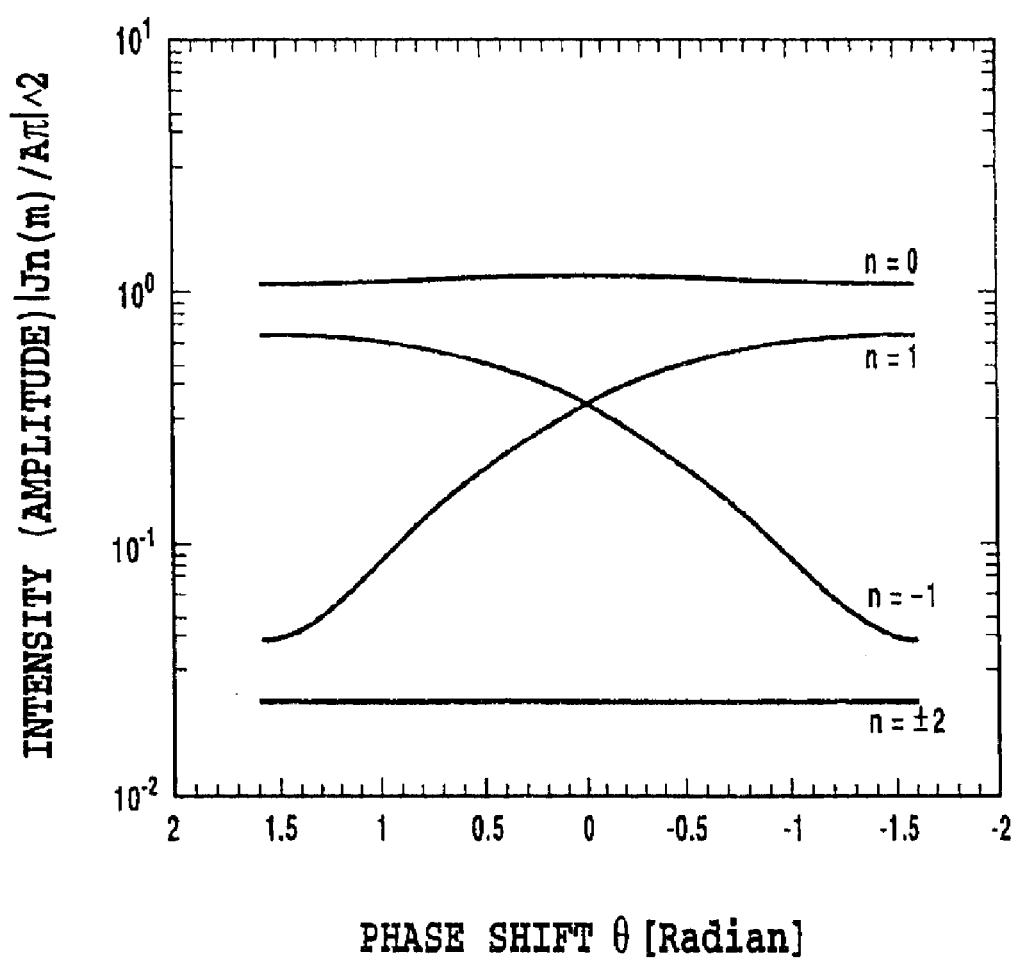
FIG. 14 is a graph showing phase shifts vs. the amplitude of each mode according to the seventh embodiment of the optical-spectrum flattening apparatus of the present invention.

In this manner, the amplitude of each mode depends on a phase shift of zero, as shown in FIG. 14.

Figure 15:
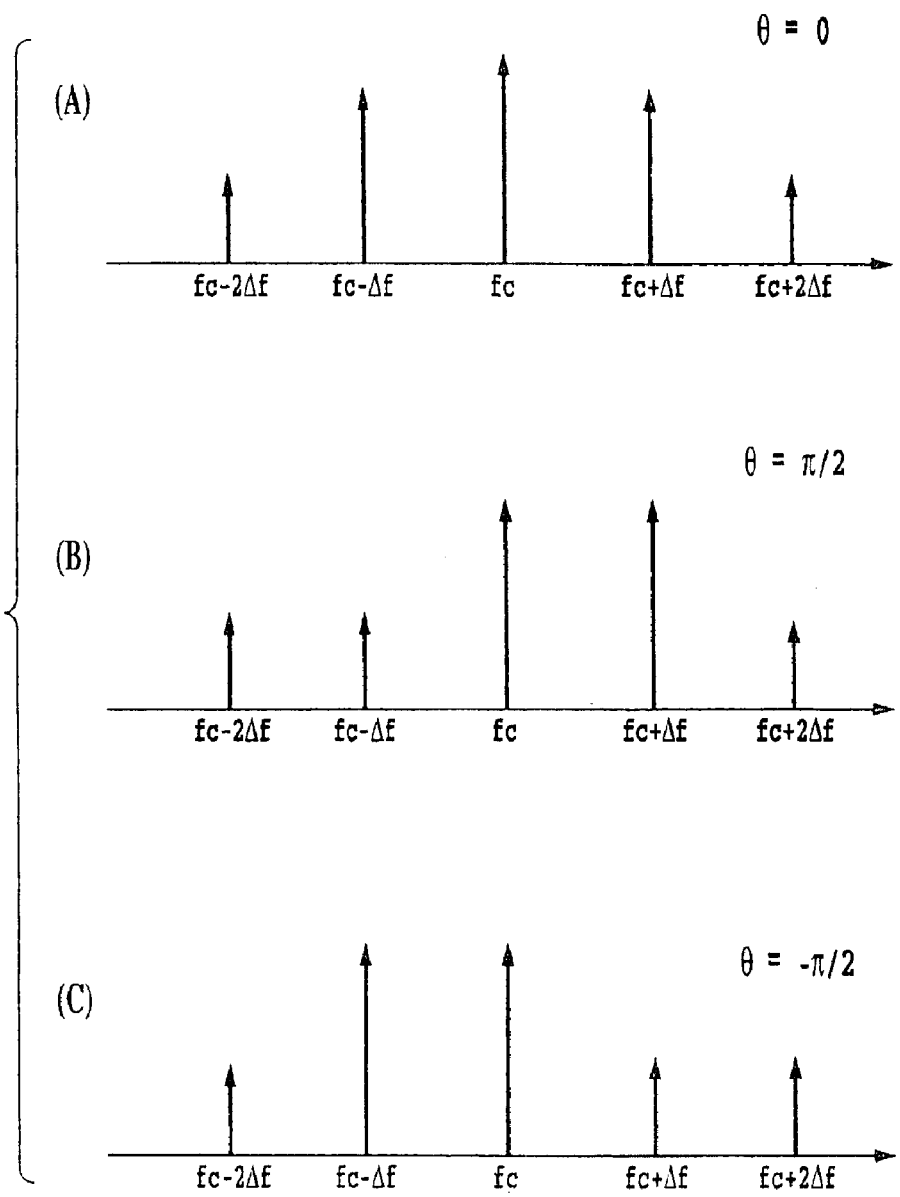
FIGS. 15(A)–15(C) are characteristic diagrams showing deviations in discrete optical spectrum associated with phase shifts according to the seventh embodiment of the optical-spectrum flattening apparatus of the present invention.

Thus, level deviations among the modes can be controlled by the phase adjuster 255 by varying the value of θ. FIG. 15 shows the case of θ=0, π/2, and −π/2.

In this embodiment, the phase modulator 223 is shown as the means for applying the fixed correlationship to the phases of the modes of the discrete optical spectrum, and the amplitude modulator 204 is shown as the means for sifting the spectrum, but level deviations among the modes can be controlled as described above, using the reverse configuration in which the amplitude modulator is used as the means for generating a discrete optical spectrum, while the phase modulator is used as the means for sifting the spectrum.

[Eighth Embodiment of the Optical-Spectrum Flattening Apparatus]

Figure 16:
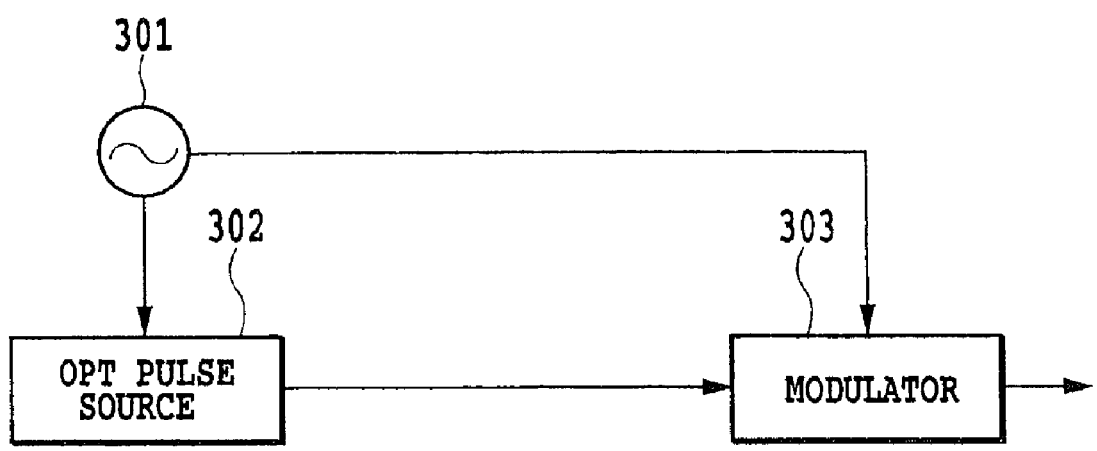
FIG. 16 is a block diagram showing the configuration of an eighth embodiment of the optical-spectrum flattening apparatus according to the present invention which uses a pulsed light source.

FIG. 16 shows the configuration of an apparatus for realizing the optical-spectrum flattening apparatus according to the eighth embodiment of the present invention. This optical-spectrum flattening apparatus is composed of a repetition pulsed light source 302 having the central frequency fc and driven by a sinusoidal signal of the frequency $\Delta f$ output from an oscillator 301, and a modulator 303 synchronizing with the oscillator 301 to modulate the amplitude or phase. In general, an optical-pulse train output at a certain pulse repetition frequency $\Delta f$ has a discrete optical spectrum of a mode spacing $\Delta f$ which has a fixed correlationship among the phases of the modes thereof. The spectrum can be flattened by using the modulator 303 to modulate with a frequency $\Omega$ ($\Omega=\Delta f$ in FIG. 18 and 19), an optical pulse of the central frequency fc from the repetition pulsed light source 302, thereby shifting the spectrum to sidebands occurred by the modulation, so that the spectra shifted to the upper and lower sidebands overlap each other.

When temporal deviations in the envelope of an optical pulse are assumed to be sufficiently slow compared to the period of the light, the field amplitude E(z, t) of the optical pulse is given by the following equation:

$$E(z,t)=Re\{U(z,t)exp-i(2\pi fct+\theta o)\} \qquad (16)$$

The envelope of the optical pulse is given by the following equation:

$$U(z,t)=|U(z,t)|exp\{-i\theta(z,t)\} \qquad (17)$$

where fc denotes the central frequency and $\theta_0$ denotes an initial phase.

First, amplitude modulations will be considered as means for carrying out the above described second process. In this case, $\theta$ (z, t)=$\theta'$. When the amplitude is modulated using a sinusoidal signal V(t)=cos($2\pi\Omega t$) of the frequency $\Omega$ and the modulation index m, an amplitude-modulated wave M(t) is given by the following equation:

$$\begin{aligned}Mam(t) &= Re[+mv(t)]E(z,t) \qquad (18)\\ &= Re[+m\cos(2\pi\Omega t)]|U(z,t)|\exp\{-i(2\pi fct+\theta'+\theta o)\}\\ &= |U((z,t))|\cos\{2\pi fct+\theta'+\theta o)\}+\\ &\quad m|U(z,t)|\cos\{2\pi(fc+\Omega)t+\theta'+\theta o)/2+\\ &\quad m|U(z,t)|\cos\{2\pi(fc-\Omega)t+\theta'+\theta o)/2\end{aligned}$$

In this case, the spectrum is sifted to the sidebands (fc±$\Omega$)based on the frequency shifting theorem. When the spectrum of the optical-pulse is 2 fm in width, the following relationship must be met in order to allow the sifted spectra to overlap each other:

$$\Omega<2fm \qquad (19)$$

When this condition is met, the shifted spectra overlap each other, thus obtaining a flattened wide-band optical spectrum.

Further, a spectrum of an optical pulse of the pulse repetition frequency $\Delta f$ undergoes mode oscillation at intervals of $\Delta f$, so that the frequency shift $\Omega$ must equal the frequency $\Delta f$ or must be a multiple thereof in order to allow the modes to overlap each other.

$$\Omega=n\times\Delta f(n: \text{natural number}) \qquad (20)$$

This condition can be met by synchronizing the oscillator for driving the repetition pulsed light source (or optical-pulse generating circuit) 302, with the oscillator for driving the modulator 303, and multiplying the driving signal from the multiplier (not shown) to the modulator 303 as required.

The use of a phase (frequency) modulator as the modulator 303 will be described below. As described above, when the amplitude is modulated using the sinusoidal signal V(t)=cos($2\pi\Delta ft$) of the frequency $\Omega(\Omega=\Delta f)$ and the modulation index m, an amplitude-modulated wave Mpm(t) is given by the following equation:

$$\begin{aligned}Mpm(t) &= Re\{|U((z,t)|\exp-i(2\pi fct+mv(t)+\theta o)\} \qquad (21)\\ &= |U(z,t)|\exp\{-i(2\pi fct+m\cos(2\pi\Delta f)+\theta(z,t)+\theta o)\}\\ &= |U((Z,t))|\Sigma Jn(m)\cos\{2\pi(fc+n\Delta f)t+\\ &\quad \theta(z,t)+\pi n/2+\theta o\}\end{aligned}$$

The equation (18) indicates that the phase modulation infinitely generates an upper and lower sidebands of a magnitude Jn(m) at locations fc±n$\Delta f$. In this case, the spectrum of the optical pulse shifts to the upper and lower sidebands corresponding to index m (the larger m is, the greater a frequency shift amount is), the resulting spectrum comprises the overlapping spectra, which have been shifted to the locations of the upper and lower sidebands.

We described above on $\Omega=\Delta f$ (n: natural number). In order for overlapping of respective modes, however, due to the generating mode oscillation by intervals $\Delta f$ with the spectrum of the optical pulse, $\Omega$ value is required to be equal to n×$\Delta f$ as well as equation (20). Furthermore, when the spectrum of the optical-pulse is 2 fm in width, $\Omega$value is required to satisfy 2 fm<$\Omega$ in order for overlapping of sifted spectrum as well as the second embodiment.

As described above, a flattened wide-band spectrum can be obtained by modulating the amplitude or phase of a pulsed light of the pulse repetition frequency $\Delta f$ with the frequency $\Omega=n\times\Delta f$ to shift the spectrum to the sidebands occurred by the modulation thereby allow the optical spectra obtained to overlap each other.

The above operation according to this embodiment generates a repetition pulse from the repetition pulsed light source 302 and generates discrete modes with the fixed correlationship applied to the phases. Controlling the power level deviations among the modes can be accomplished by sifting these longitudinal modes by a distance corresponding to the modulating frequency or the modulation index so as to overlap each other by modulating operation of the modulator 303.

[Ninth Embodiment of the Optical-Spectrum Flattening Apparatus]

Figure 17:
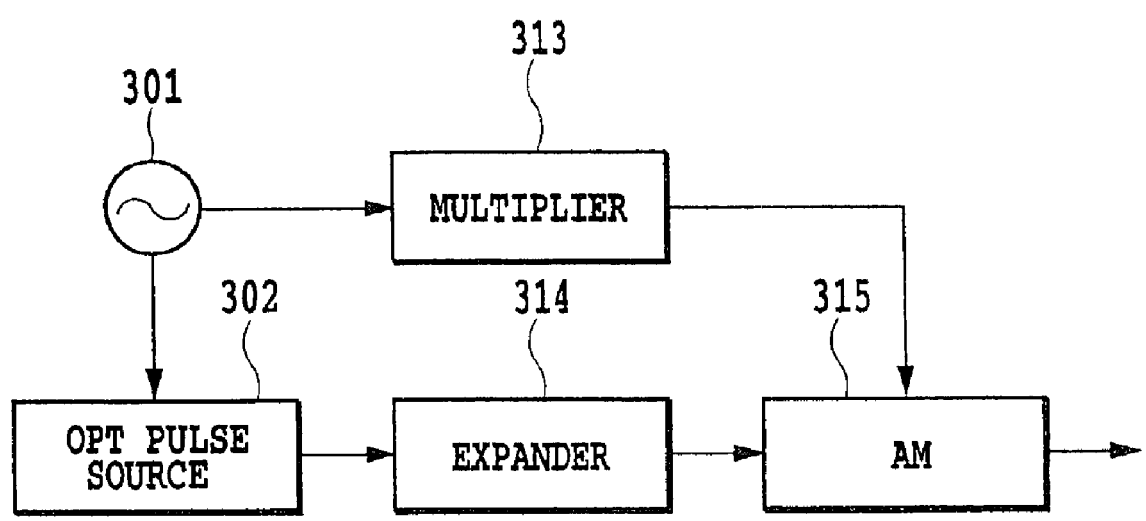
FIG. 17 a block diagram showing the configuration of a ninth embodiment of the optical-spectrum flattening apparatus according to the present invention.

FIG. 17 shows the configuration of an apparatus for realizing the optical-spectrum flattening apparatus according to the ninth embodiment of the present invention. This optical-spectrum flattening apparatus is composed of the repetition pulsed light source 302 or outputting an optical pulse at the frequency $\Delta f$ provided by the oscillator 301, a pulse expander 314 for expanding the optical pulse output from the repetition pulsed light source 302, and a amplitude modulator 315 for modulating the optical pulse output from the pulse expander 314 using a multiplying frequency output from a multiplier 3. he pulse expander 314 may comprise a dispersive medium such as a single-mode fiber or a dispersive optical-function circuit.

In the optical-spectrum flattening apparatus of the above described eighth embodiment, the modulating frequency requires a band of about 1 THz (100 times as wide as the pulse repetition frequency) in order to carry out the above second process on a short optical repetition pulse, particularly, a short optical pulse having a repetition rate of 10 GHz and a pulse width of about several tens of psec (that is, its spectrum has a wide band). Thus, when the pulse width t0 and the pulse repetition frequency Δf have a relationship t0<<(1/Δf), since the current electric circuits have a modulating band of several tens of GHz, it is technically very difficult to execute the above second process. In contrast, the optical-spectrum flattening apparatus of this embodiment provides the means for expanding the pulse width (or full width at half maximum) of the optical pulse during the first process, thus reducing the modulating frequency for the second process. In this case, a relationship Δf≦Ω must be established between the pulse recurrent frequency Δf and the modulating frequency Ω.

In particular, when the dispersive medium such as a single-mode fiber is used in the pulse expander 314 to expand the pulse width, linear chirp is applied to the optical pulse to expand the pulse width.

Figure 18:
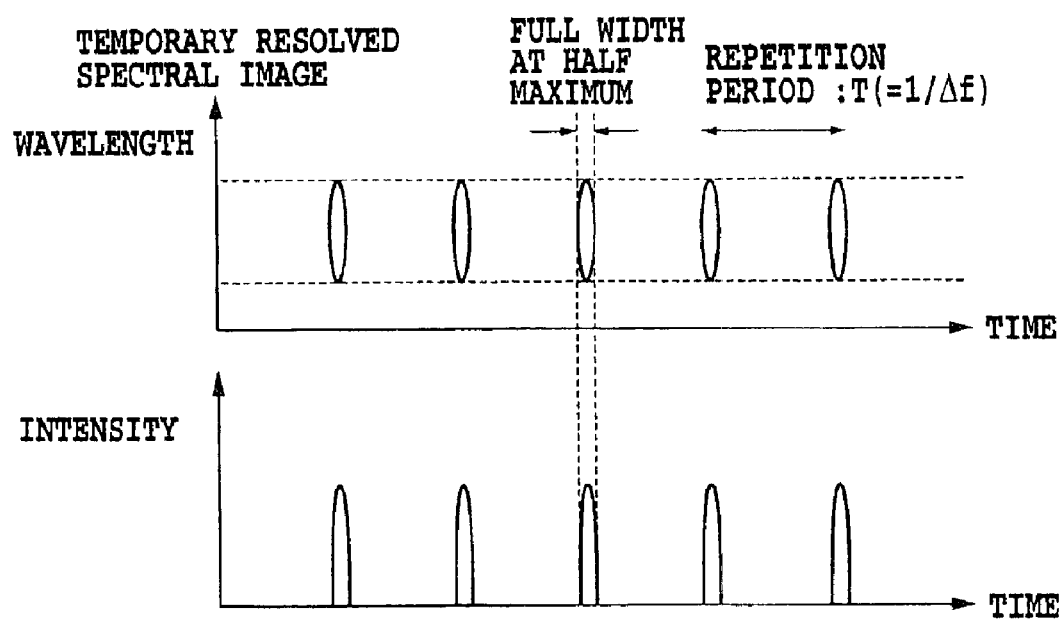
FIG. 18 is a waveform diagram showing a temporally resolved spectral image of an optical pulse according to the ninth embodiment of the optical-spectrum flattening apparatus of the present invention.
Figure 19:
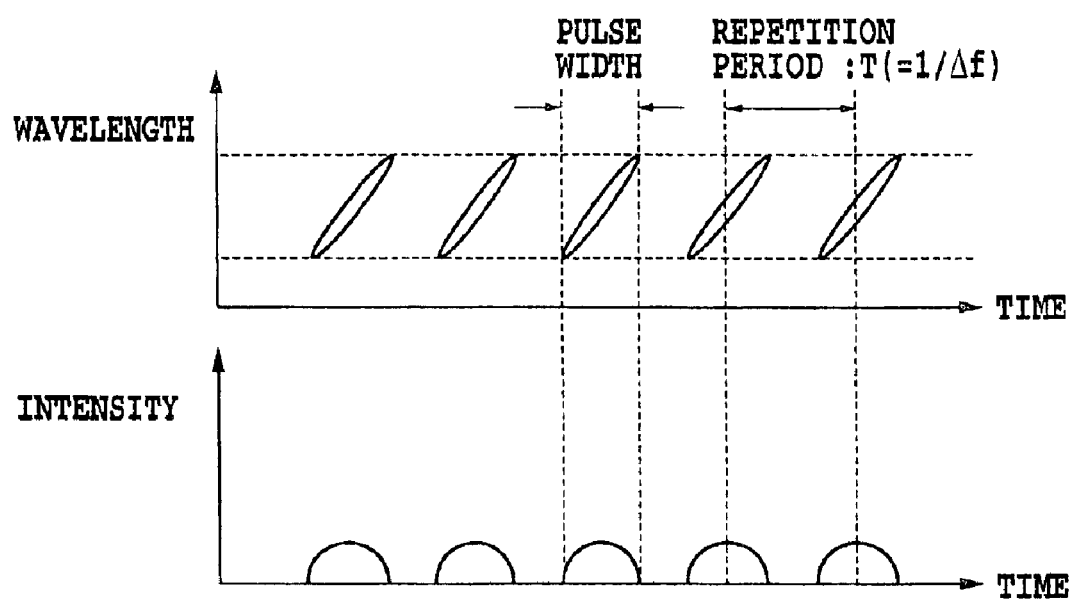
FIG. 19 is a waveform diagram showing how an optical pulse is subjected to linear chirp according to the ninth embodiment of the optical-spectrum flattening apparatus according to the present invention.

A temporally resolved spectral image output from the repetition pulsed light source 302 s shown in FIG. 18. When this optical pulse is passed through the dispersive medium of the pulse expander 14, the linear chirp is applied to the optical pulse to expand the pulse width (or full width at half maximum) of the pulse, as shown in FIG. 19.

Figure 20:
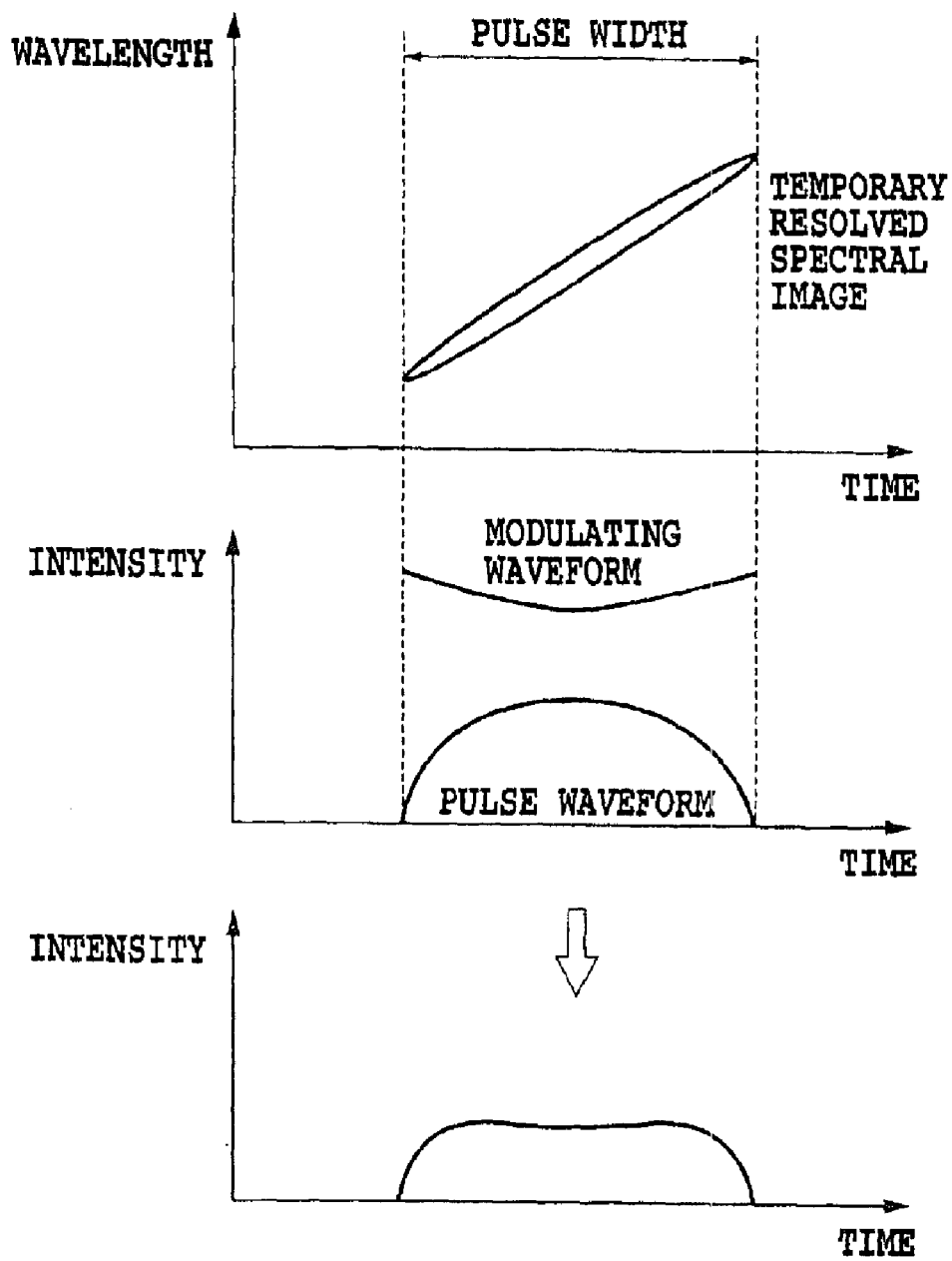
FIG. 20 is a waveform diagram useful in explaining how the shape of a spectrum is manipulated on the based of amplitude modulation according to the ninth embodiment of the optical-spectrum flattening apparatus of the present invention.

The multiplier 313 multiplies a sinusoidal electric signal of the pulse repetition frequency Δf from the oscillator 301 by n to produce an electric signal of frequency n×Δf. The electric signal drives the amplitude modulator 315 to vary the phase of the optical pulse transmitted through the dispersive medium of the pulse expander 314, the optical pulse having been subjected to the linear chirp. At this time the temporal waveform of the optical pulse can have its amplitude modulated as shown in FIG. 20.

Further, power level deviations among the modes can be restrained by varying the waveform of the signal output from the oscillator 301, the modulation index for this signal, or the phase thereof.

[Tenth Embodiment of the Optical-Spectrum Flattening Apparatus]

Figure 21:
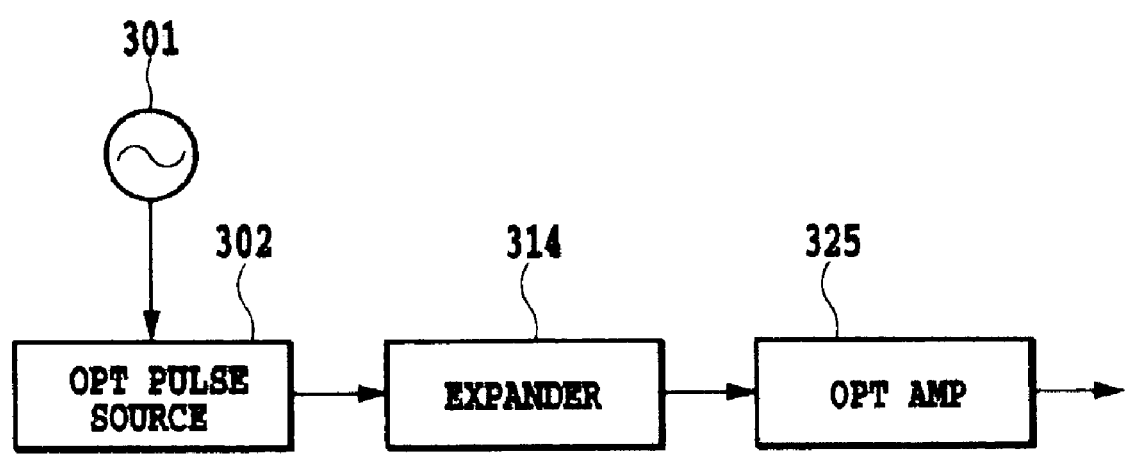
FIG. 21 is a block diagram showing the configuration of a tenth embodiment of optical-spectrum flattening apparatus according to the present invention which uses a saturated gain medium.

FIG. 21 shows the configuration of an apparatus for realizing the optical-spectrum flattening apparatus according to the tenth embodiment of the present invention. This optical-spectrum flattening apparatus is obtained by replacing an optical amplifier 325 or the amplitude modulator 315 varying the amplitude of an optical spectrum with its shape manipulated according to the above ninth embodiment. The other components of this configuration are similar to those of the configuration in FIG. 17.

The optical-spectrum shape manipulating method according to this embodiment allows the shape of a spectrum to be manipulated by causing the optical amplifier 325 to vary the amplitude on the time axis, as in the optical-spectrum shape manipulating method in the above described ninth embodiment.

Further, in this embodiment, since the optical amplifier 325 is used as the means for varying the amplitude, the optical spectrum can be flattened while restraining energy losses from the pulse.

Figure 22:
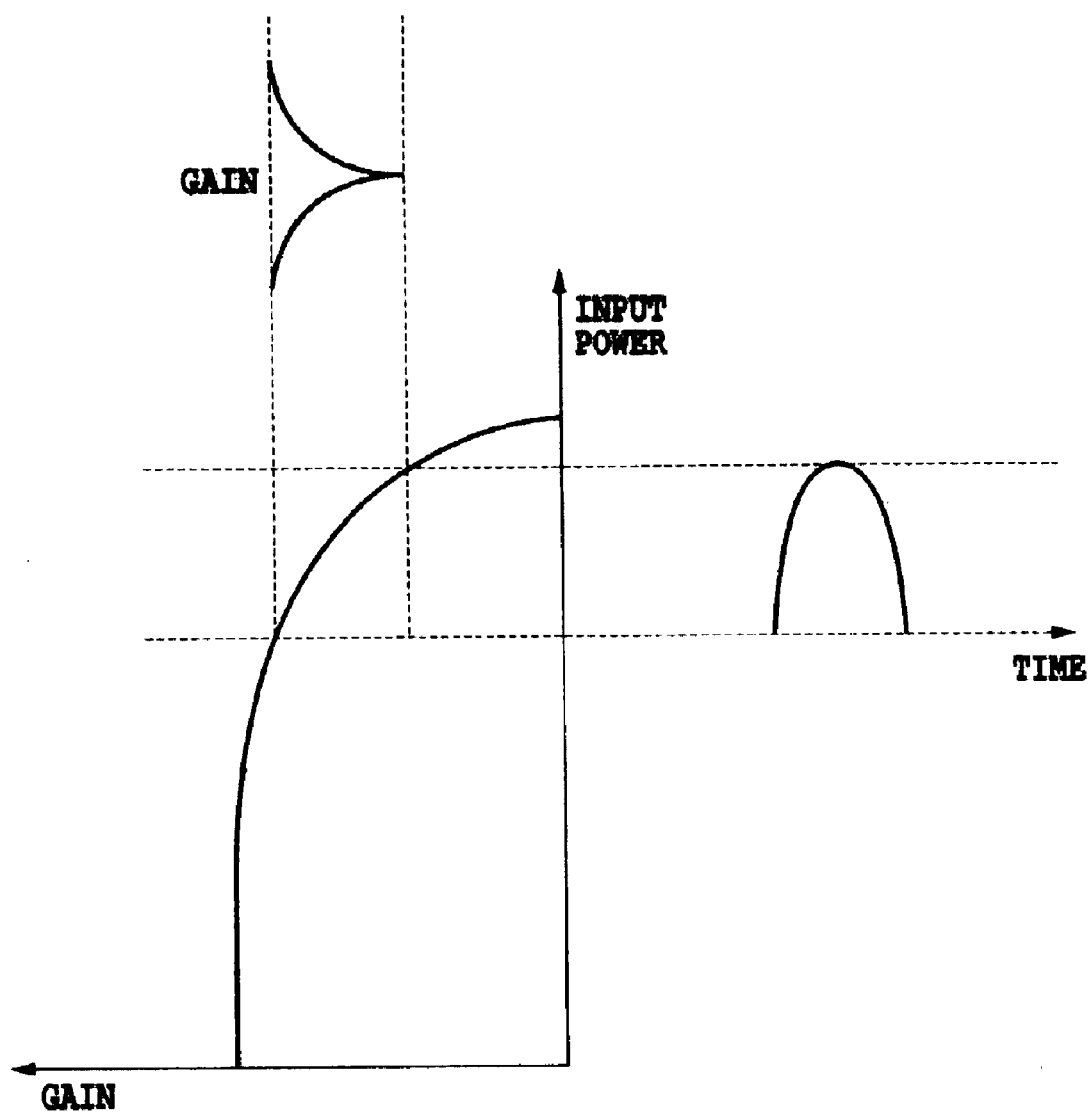
FIG. 22 is a characteristic diagram showing an optical pulse vs. gain in a saturated area according to the tenth embodiment of optical-spectrum flattening apparatus of the present invention.
Figure 23:
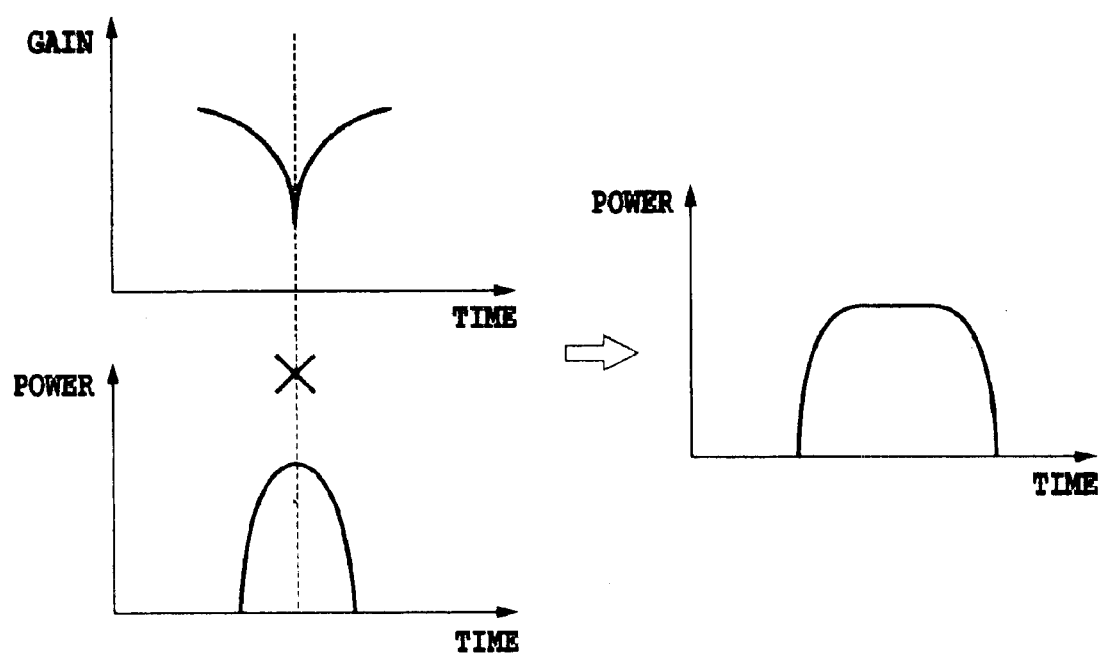
FIG. 23 is characteristic diagram showing how to obtain a rectangular optical pulse using a process of amplification in the saturated area according to the tenth embodiment of optical-spectrum flattening apparatus of the present invention.

More specifically, in the optical-spectrum shape manipulating method according to this embodiment, a chirp pulse resulting from transmission through the linear medium of the pulse expander 314 is input to the optical amplifier 325, which is in a saturated area. The optical amplifier 325 in the saturated area provides a large gain for low power, while providing a small gain for high power, as shown in FIG. 22. Thus, as shown in the left of FIG. 23, the gain is large at a rising and a falling edge of the temporal waveform of the chirp pulse, but is small near the center of the pulse. As a result, as shown in the right of FIG. 23, the optical pulse has a rectangular waveform and is flattened.

As described above, according to this embodiment, when the temporal waveform of the chirp pulse is manipulated, the optical pulse can be flattened while restraining power losses from the pulse. In particular, if the pulse expander 314 comprises a medium for providing a saturated output, and if the optical pulse is input to the gain saturated area of the optical amplifier 325, an optical-spectrum flattening apparatus with reduced pulse power losses can be configured.

The pulsed light source 302 or the optical-pulse output circuit may typically comprise a semiconductor- or fiber-ring-type active/passive mode lock laser.

[Eleventh Embodiment of the Optical-Spectrum Flattening Apparatus]

Figure 24:
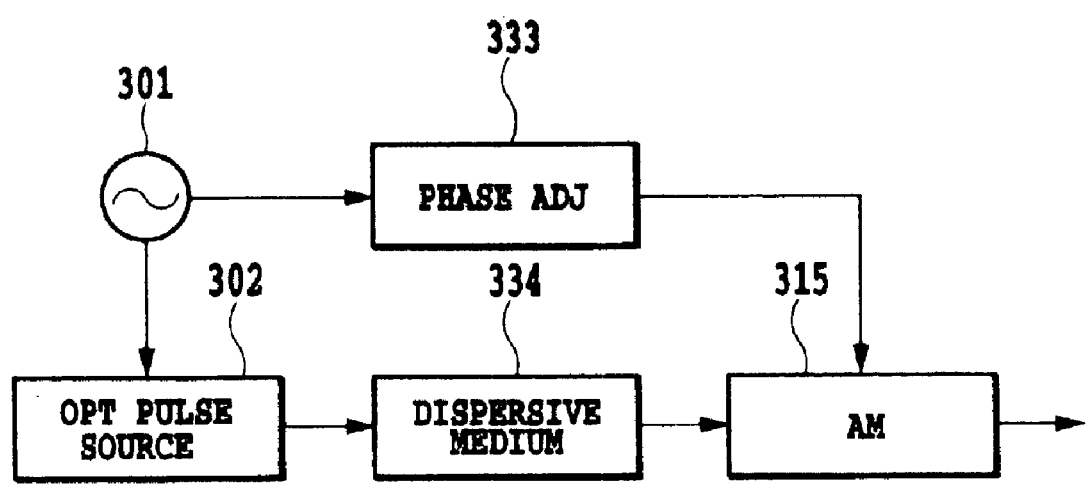
FIG. 24 is a block diagram showing the configuration of an eleventh embodiment of the optical-spectrum flattening apparatus according to the present invention.

FIG. 24 shows the configuration of an apparatus for realizing the optical-spectrum flattening apparatus according to the eleventh embodiment of the present invention. This optical-spectrum flattening apparatus can shift the phase of a modulated signal output from the oscillator 301, by using a phase adjuster 333 for the means for modulating the amplitude of a pulse expanded by a dispersive medium 334. By providing the amplitude modulator 315 with the driving signal with its phase shifted, the amplitude modulator 315 can regulate the flatness of the modulated optical spectrum depending on the phase shift.

[Flow of the Entire Process]

Figure 25:
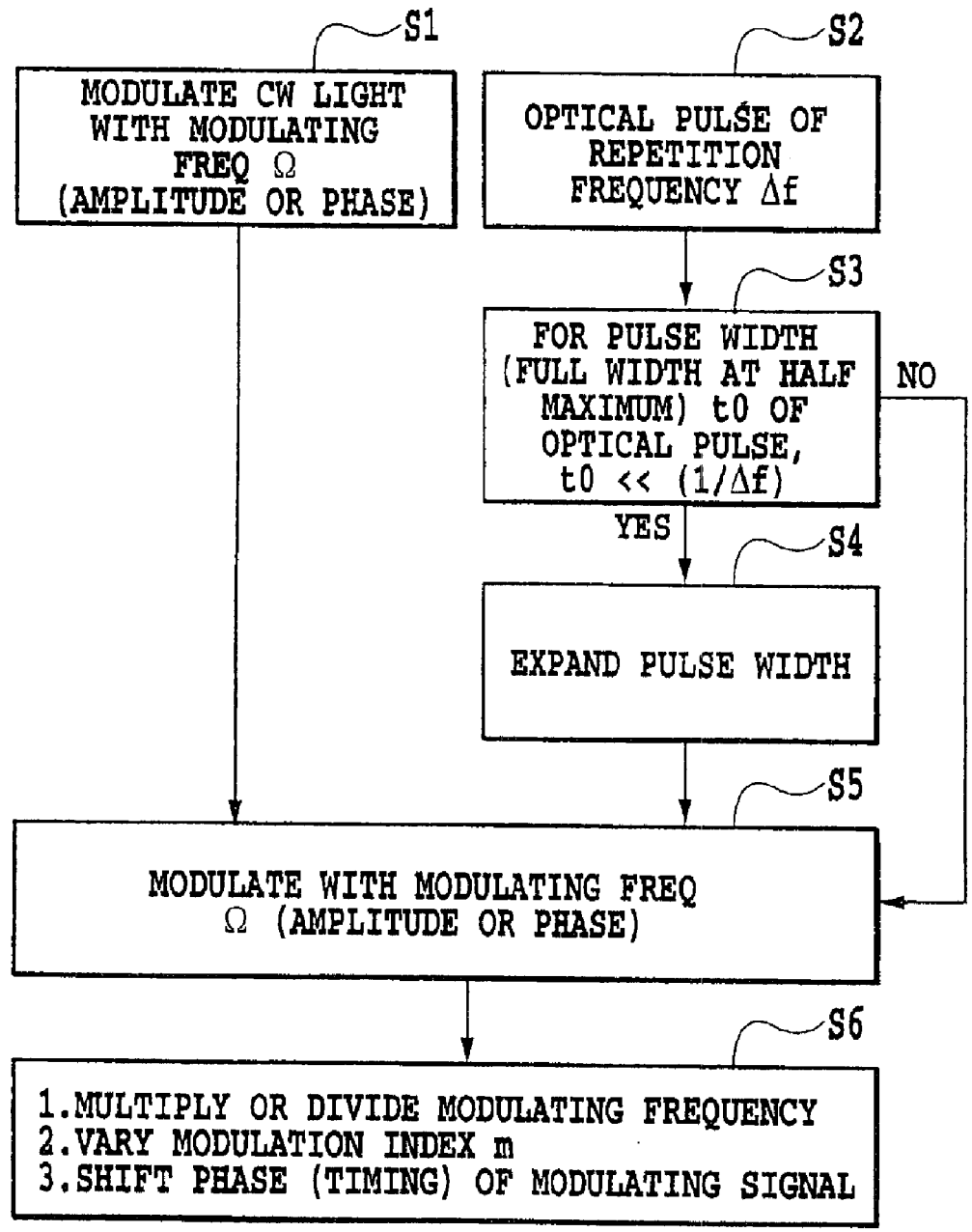
FIG. 25 is a flow chart generally showing a power level deviation restraining method according to each embodiment of the present invention.

The flow chart in FIG. 25 generally shows a power level deviation restraining method according to the above described embodiment of the present invention.

First, at step S1, a CW light is modulated (amplitude or phase) with the modulating frequency Δf to output a discrete optical spectrum with a fixed correlationship applied to the phases of the modes thereof. The process proceeds to step S5.

On the other hand, at step S2, a pulsed light source of the pulse repetition frequency Δf is used to output the discrete optical spectrum with the fixed correlationship applied to the phases of the modes thereof. It is then determined whether or not the optical-pulse width (full width at half maximum) t0<<(1/Δf). If the result of the determination is affirmative, then at the subsequent step S3, the pulse width is expanded, and the process proceeds to step S4. On the other hand, if the result of the determination is negative, the process immediately proceeds to step S5. In the present invention, either the step S1 or S2 may be used.

At the step S4, the above discrete optical spectrum is modulated (amplitude or phase) with the modulating frequency Ω to shift the discrete optical spectrum to an upper and lower sidebands. Then, the process proceeds to the step S5.

At the step S5, level deviations among the modes are restrained, and the following processing is executed:
(1) The modulating frequency is multiplied or divided.
(2) The modulation index is varied.
(3) The phase (timing) of the modulating signal is shifted.

As described above, according to the present invention, the fixed correlationship is applied to the phases of the modes of the discrete optical spectrum to shift the spectrum on the frequency axis while controlling the frequency shift, thereby providing a simple and inexpensive configuration and making it possible to control (restrain) power level deviations among the modes of the discrete optical spectrum.

In particular, according to the first aspect of the present invention, the CW light source for outputting a continuous wave at the fixed frequency fc output from the oscillator is used and the continuous wave from the CW light source is modulated with the frequency Δf to generate the upper and lower sidebands fc±nΔf having the correlationship among the phases of the modes. The amplitude or phase of this modulated wave is modulated again with the frequency Ω to shift the discrete optical spectrum to the locations of the upper and lower sidebands. At this time, if the spectrum of the optical-pulse is 2 fm in width, the modes of the resulting optical spectra overlap each other when Ω<2 fm. Consequently, power level deviations among the modes can be restrained.

Further, according to the second aspect of the present invention, the repetition pulsed light source is used as the means for applying the fixed relationship to the phases of the modes of the discrete optical spectrum. In this case, when the relationship t0<<(1/Δf) is established between the pulse repetition frequency Δf and pulse width (or full width at half maximum) of an output optical pulse train, the discrete optical spectrum can be sifted to the upper and lower sidebands by means of an amplitude or phase modulation after the pulse width has been expanded. The above manipulation makes it possible to relatively reduce the modulating frequency for very short optical pulses of pulse width about 1 ps or less.

Figure 26:
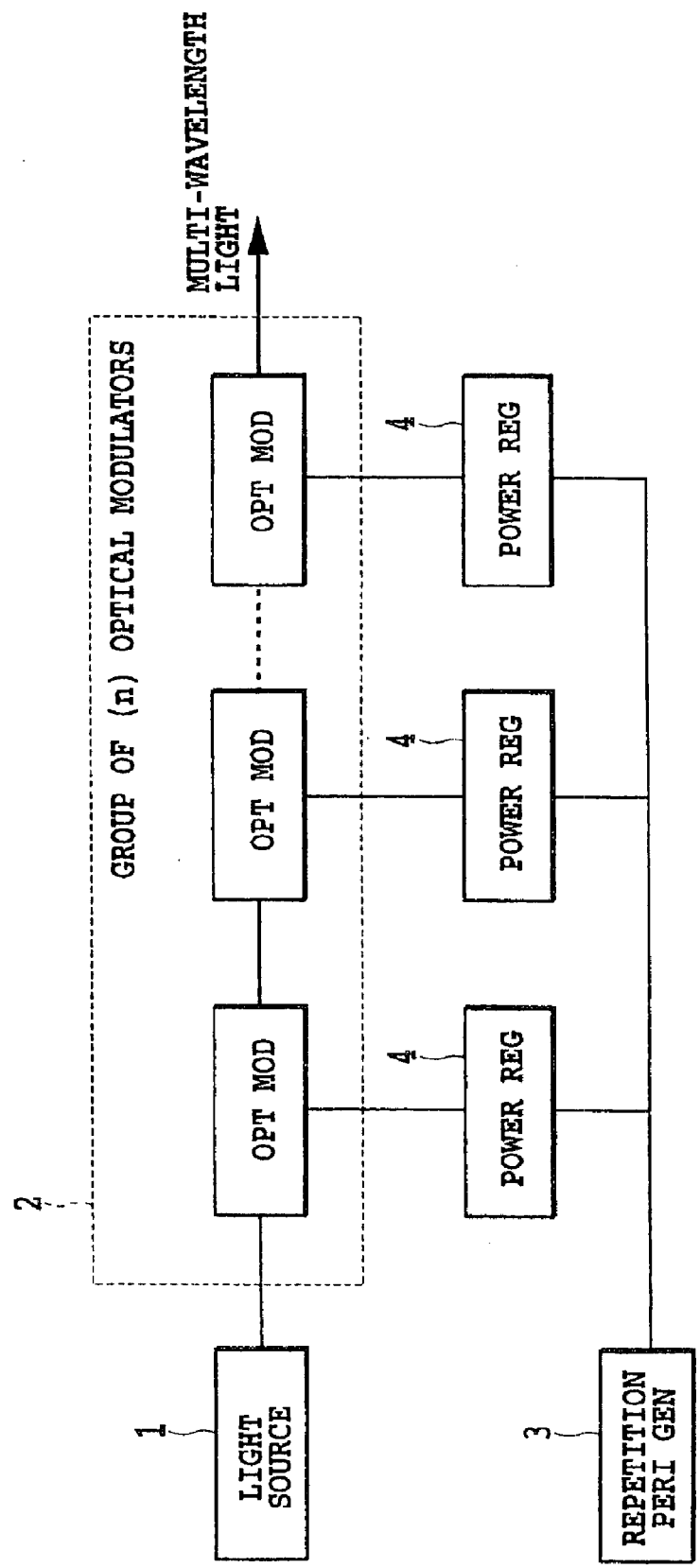
FIG. 26 is a view showing the configuration and principle of a multi-wavelength generating apparatus according to the present invention.

The basic principle of a multi-wavelength generating apparatus according to another aspect of the present invention will be described with reference to FIG. 26.

The present apparatus comprises a group of optical modulators 2 having at least one optical modulators coupled together in series and arranged at predetermined locations of a plurality of optical paths including one to which an incident light having a single central frequency is input, and a plurality of power regulators 4 for independently regulating a signal voltage of a predetermined period and applying the voltage to an input port of each optical modulator. The light source 1 generates an incident light having the single central frequency. The optical modulators can preferably modulate the amplitude or phase of the incident light. The plurality of optical paths in the group of optical modulators 2 may include paths coupled together in parallel.

The output field E(t) obtained when the amplitude and phase of the incident light having the single central frequency are modulated using functions a(t) and b(t) is expressed by:

$$E(t)=a(t)\cos(\omega_c t+b(t)) \qquad (22)$$

Thus, the shape of an output optical spectrum can be designed in accordance with the functions a(t) and b(t). In this equation, $\omega_c$ is the central angular frequency of the incident light having the single central frequency, and t denotes the time.

In the present apparatus, the optical modulators capable of modulating the amplitude and/or phase are arranged in a modulating section at arbitrary locations of the optical paths coupled together in series and/or parallel, and the power of the signal voltage of the predetermined period applied to the optical modulators constituting the group of optical modulators is modulated to properly set the function a(t) for modulating the amplitude of the incident light having the single central frequency and/or the function b(t) for modulating the phase thereof. Consequently, a generated output multi-wavelength optical spectrum can be flattened.

Since the multiplicity of optical modulators are arranged, the amplitude and phase can be modulated more freely, thus improving the flatness of the output optical spectrum and increasing the modulation depth to widen the band of the output optical spectrum.

Subsequently, specific embodiments will be described, [First Embodiment of the Multi-wavelength Generating Apparatus]

Figure 27:
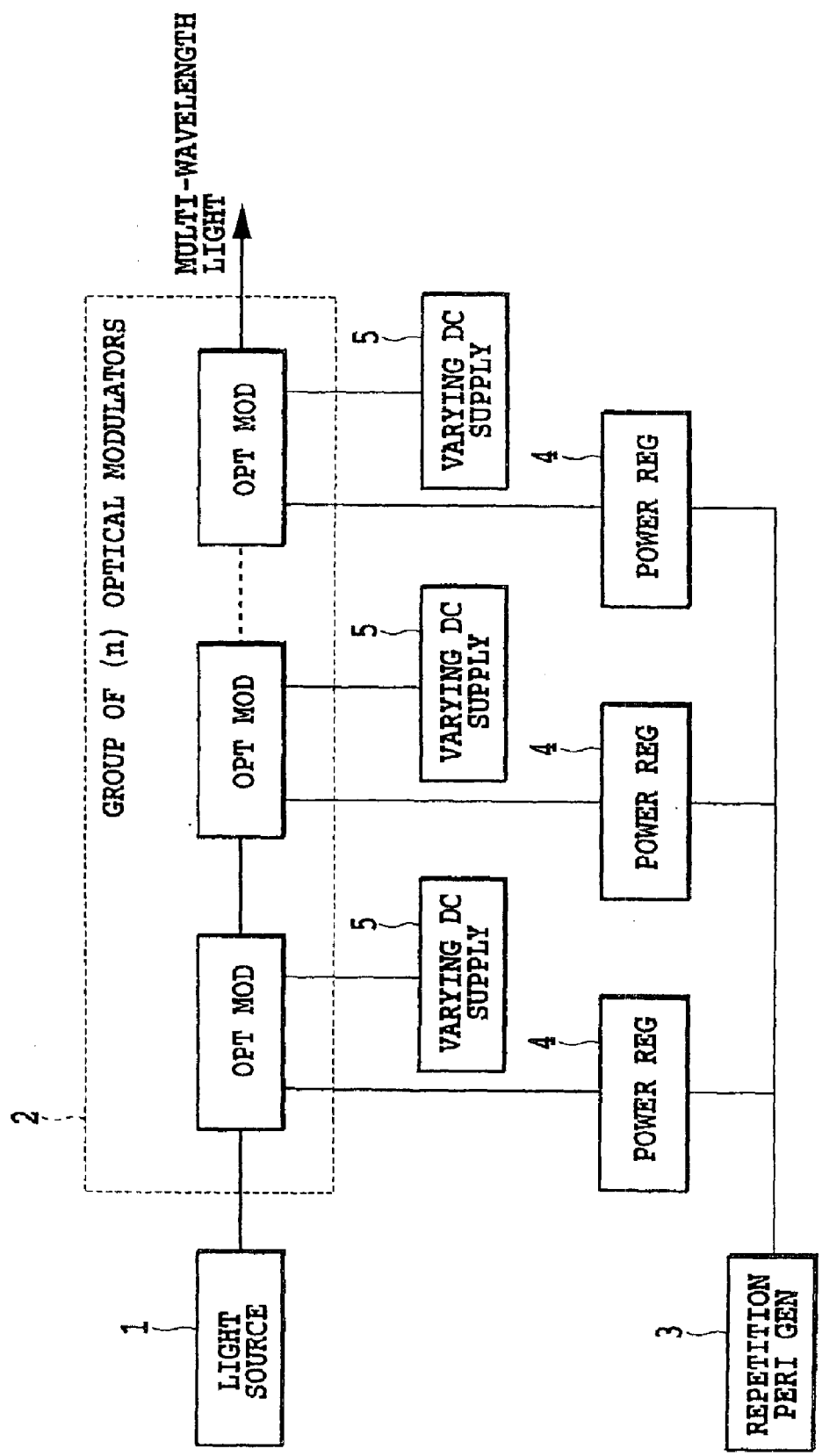
FIG. 27 is a view showing a first embodiment of the multi-wavelength generating apparatus according to the present invention.

FIG. 27 shows the configuration of a first embodiment of a multi-wavelength generating apparatus according to the present invention.

As shown in FIG. 27, the multi-wavelength generating apparatus of this embodiment is composed of the light source 1, the group of optical modulators (modulating section) including n (≧1) optical modulators, a repetition period signal generator 3, the n power regulators 4, and n power-varying DC power supply 5. The light source 1 generates a light having a single central frequency, which then falls on the input-side optical modulator of the group of optical modulators 2. The optical modulators of the group 2 are arranged (in FIG. 27, in series) at arbitrary locations of the plurality of optical paths coupled together in series and/or parallel, so as to modulate the amplitude and/or phase of the incident light. The output-side optical modulator outputs a multi-wavelength light.

The repetition period signal generator 3 generates a signal voltage repeated at a predetermined period, so that this power is applied to the optical modulators after being regulated by the power regulator 4. The power-varying DC power supplies 5 are further coupled to the corresponding optical modulators as required so as to apply a power-regulated bias thereto. The optical modulators modulate the incident light on the basis of the above signal voltage and bias, so as to modulate the amplitude and/or phase of the incident light from the light source 1.

In this connection, an output optical spectrum extended to both sides of a carrier frequency as a result of the phase modulation has a small optical-power area in the vicinity of the carrier frequency; the output optical spectrum can be flattened by modulating the amplitude to apply a pulsed gate to a temporal waveform to thereby increase the power of that area. The flatness of the output optical spectrum is determined by the relationship between the amount of phase modulation and the temporal width of the pulse. In this embodiment, the flatness is determined by causing the power regulator 4 to regulate the signal voltage of the predetermined period applied to the optical modulators and causing the power-varying DC power supplies 5 to vary the bias applied to the optical modulators in order to determine the above relationship.

The ability of the configuration of this embodiment to flatten the output optical spectrum from the group of optical modulators 2 will be described with reference to FIGS. 28 and 29.

Figure 28:
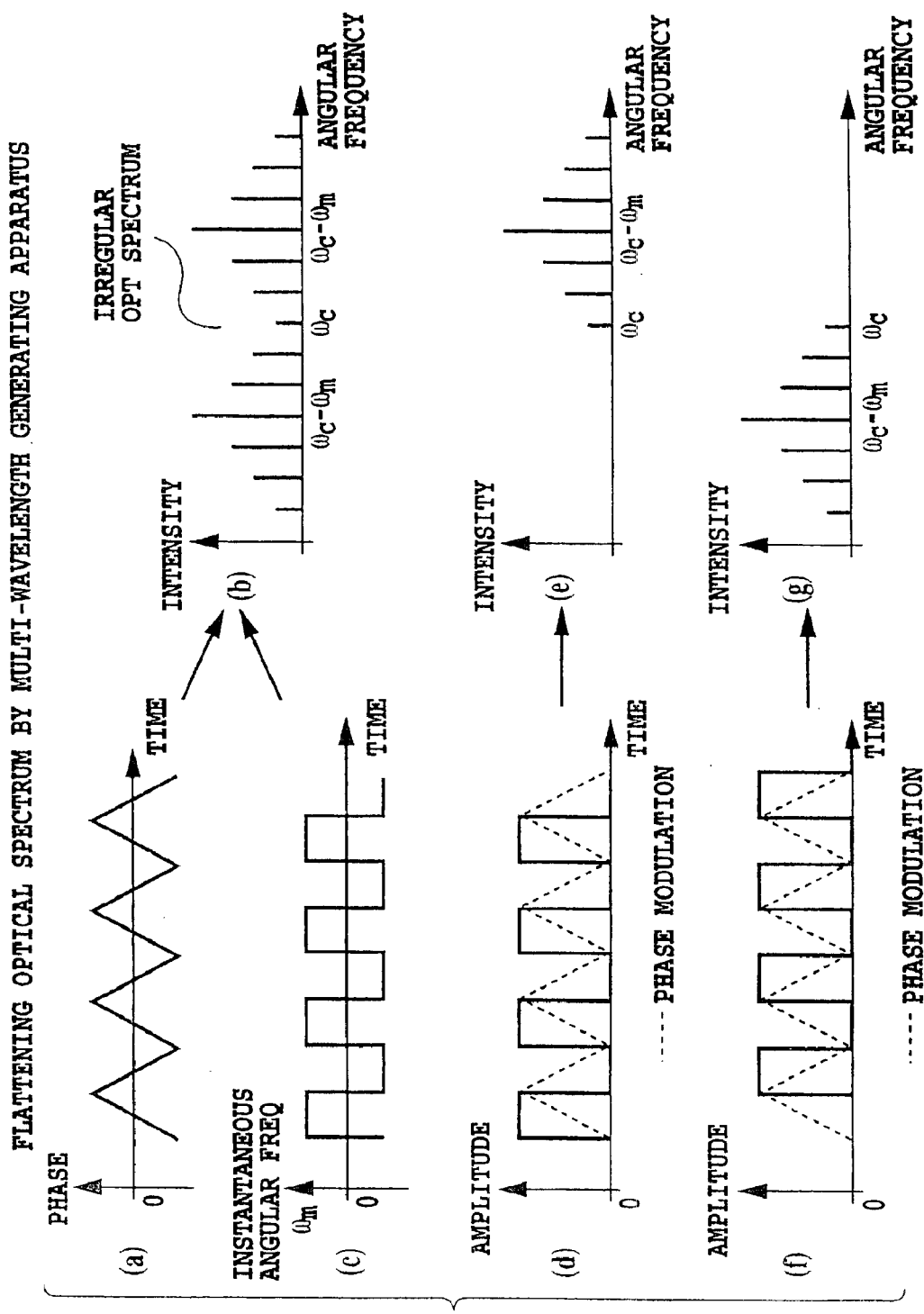
FIGS. 28(a)–28(g) are waveform diagrams useful in explaining that an optical spectrum can be flattened according to the first embodiment of the multi-wavelength generating apparatus of the present invention.

The temporal waveform of the output signal voltage from the repetition period signal generator 3 corresponds to an angular function as shown as shown by Reference numeral (a) in FIG. 28. When the light source light having the single central frequency has its phase modulated in accordance with this function, the resulting multi-wavelength output optical spectrum is as shown by Reference numeral (b) in FIG. 28. This will be described below.

The angular frequency of this phase modulation involves a square wave that reciprocates with a predetermined period between an instantaneous value $\omega_m$ and an instantaneous value $-\omega_m$ as shown by Reference numeral (c) in FIG. 28. As shown by the solid line indicated by Reference numeral (d) in FIG. 28, when a portion of this square wave which has its angular frequency represented by the instantaneous value $\omega_m$ is gated by a repetition NRZ (Non Return to Zero) signal, the resulting optical spectrum is as shown by Reference numeral (e) in FIG. 28; the optical spectrum of the repetition NRZ signal having a central angular frequency $(\omega_c+\omega_m)$ is obtained. Moreover, as shown by the solid line indicated by Reference numeral (f) in FIG. 28, when a portion of -this square wave which has its angular frequency represented by the instantaneous value $-\omega_m$ is similarly gated, the resulting optical spectrum is as shown by Reference numeral (g) in FIG. 28; the optical spectrum of the repetition NRZ signal having a central angular frequency $(\omega_c-\omega_m)$ is obtained.

The overlap between these optical spectra on the angular-frequency axis is as shown by reference numeral (b) in FIG. 28, which corresponds to the sum of FIG. (e) and (g). The optical-spectrum intensity is low in the vicinity of the instantaneous value $\omega_c$ (central frequency, that is, carrier frequency) of the angular frequency, thus preventing the optical spectrum from being flattened.

Thus, the spectrum is flattened as described below by means of regulations using the power regulators 4 and the power-varying DC power supplies 5.

Figure 29:
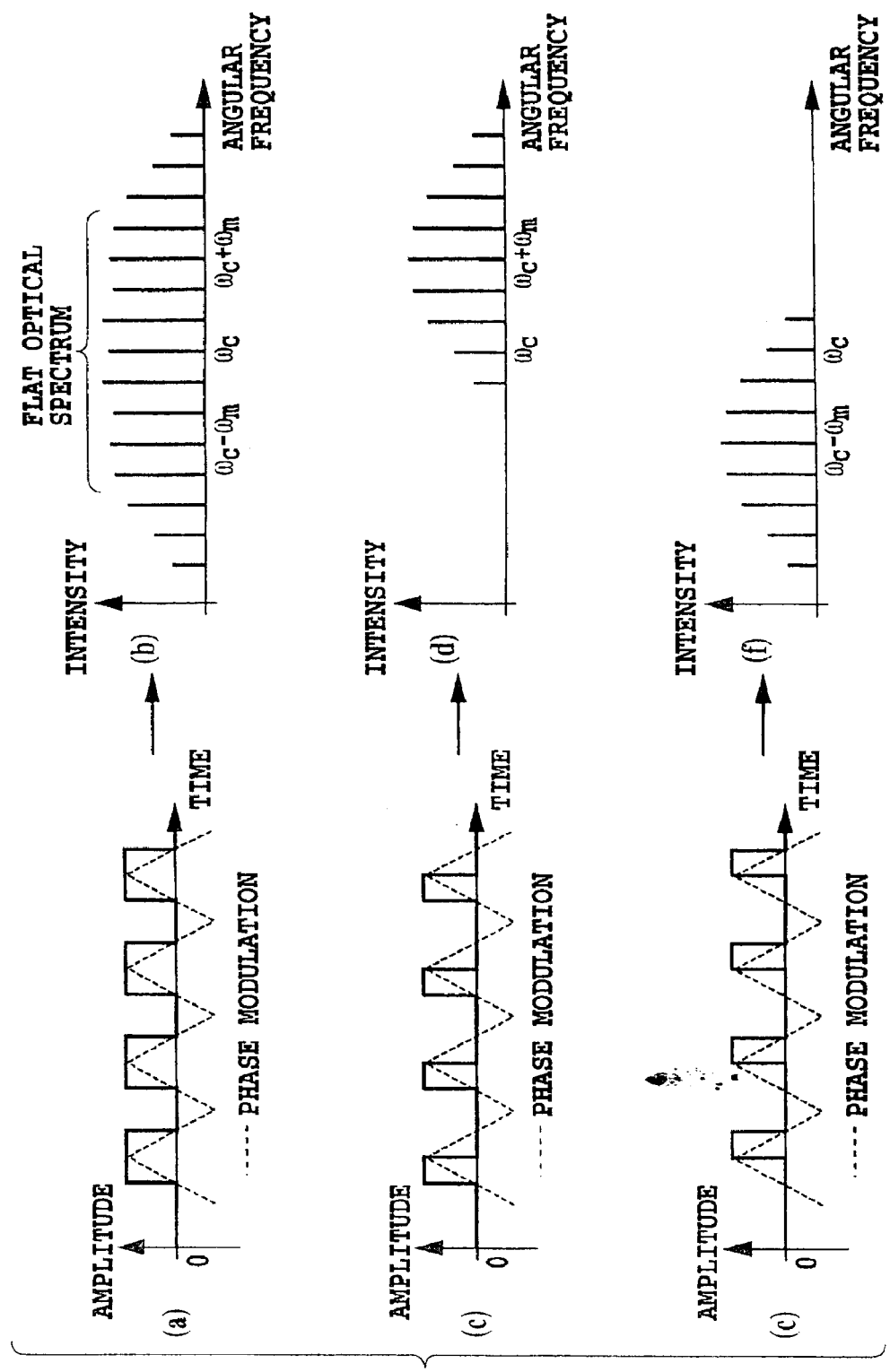
FIGS. 29(a)–29(f) are waveform diagrams useful in explaining that an optical spectrum can be flattened according to the first embodiment of the multi-wavelength generating apparatus of the present invention.

An output optical spectrum will be considered which is obtained through such regulations that the repetition NRZ signal gates the square wave between the instantaneous values $\omega_m$ and $-\omega_m$ of the angular frequency as shown by reference numeral (a) in FIG. 29.

As described above, As shown by the solid line indicated by reference numeral (c) in FIG. 29, when a portion of the square wave which has its angular frequency represented by the instantaneous value $\omega_m$ is gated by a repetition RZ (Return to Zero) signal, the resulting optical spectrum is as shown by reference numeral (d) in FIG. 29; the optical spectrum of the repetition RZ signal having a central angular frequency $(\omega_c+\omega_m)$ is obtained. Moreover, as shown by the solid line indicated by reference numeral (e) in FIG. 29, when a portion of the square wave which has its angular frequency represented by the instantaneous value $-\omega_m$ is similarly gated, the resulting optical spectrum is as shown by reference numeral (f) in FIG. 29; the optical spectrum of the repetition RZ signal having a central angular frequency $(\omega_c-\omega_m)$ is obtained. Both optical spectra have a wider band than that of the repetition NRZ signal.

The overlap between these optical-spectra on the angular-frequency axis is as shown by reference numeral (b) in FIG. 29, and the optical-spectrum intensity is high in the vicinity of the angular frequency $\omega_c$, thus providing a flattened optical spectrum.

According to this embodiment, the amplitude and phase are modulated by properly setting the functions for modulating the amplitude and phase of the light source light having the single central frequency, and correspondingly regulating the power of the signal voltage and variably setting the bias. Consequently, the flatness of the output optical spectrum can be improved with the simple and inexpensive configuration.

[Variation of the First Embodiment of the Multi-Wavelength Generating Apparatus]

Figure 30:
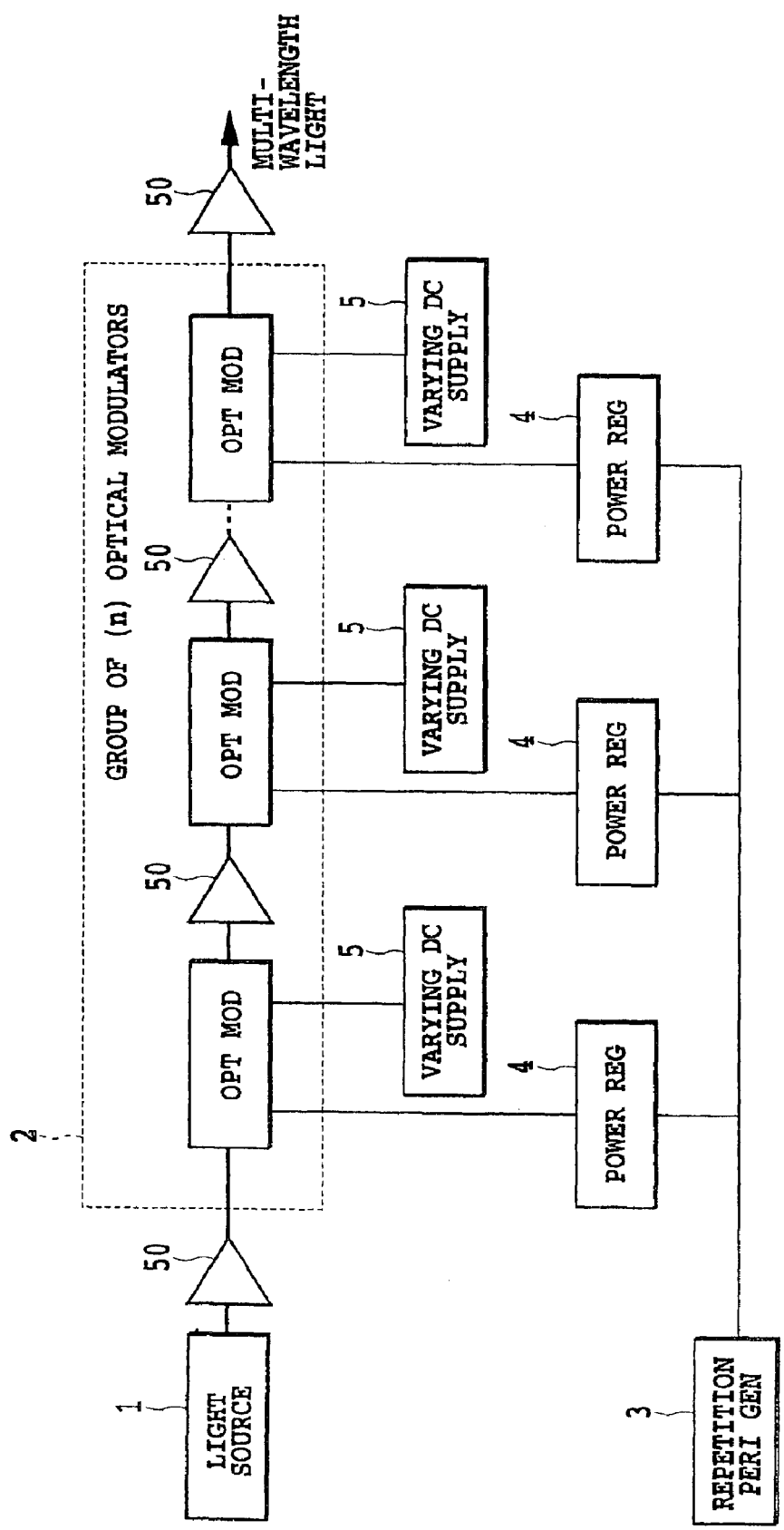
FIG. 30 is a view showing the configuration of a deviation of the first embodiment of the multi-wavelength generating apparatus of the present invention.

FIG. 30 shows the configuration of a deviation of the first embodiment of the multi-wavelength generating apparatus according to the present invention. As shown in FIG. 30, the multi-wavelength generating apparatus of this deviation may comprises optical amplifiers 50 arranged in an optical path to which a multi-wavelength light is emitted by the light source 1. In this figure, the optical amplifiers 50 are arranged in all the plural optical paths including the one to which an incident light from the light source 1 is input. The amplified gain of the optical amplifiers 50 arranged in this manner makes it possible to compensate for a power loss resulting from the passage of the incident light through the optical amplifiers as well as a power loss per wavelength resulting from the multiple wavelengths. This results considerably improved output SNR.

Provided, however, that an optical amplifier 50 is arranged only after the group of optical modulators 2 having no optical amplifier, a drop in SNR caused after the optical amplifier 50 by the loss of the optical power is prevented. When the optical amplifiers 50 are added to all the plural optical paths as shown in the figure, the SNR of the multi-wavelength light obtained in the output can be improved.

Furthermore, if all the optical modulators of the group 2 are phase modulators, power level deviations among channels can be restrained by setting the sum of sinusoidal signal voltages at a value converted into a predetermined phase modulation index, the sinusoidal signal voltages being generated by the repetition period signal generator 4 and applied to the input ports of the optical modulators.

Figure 31:
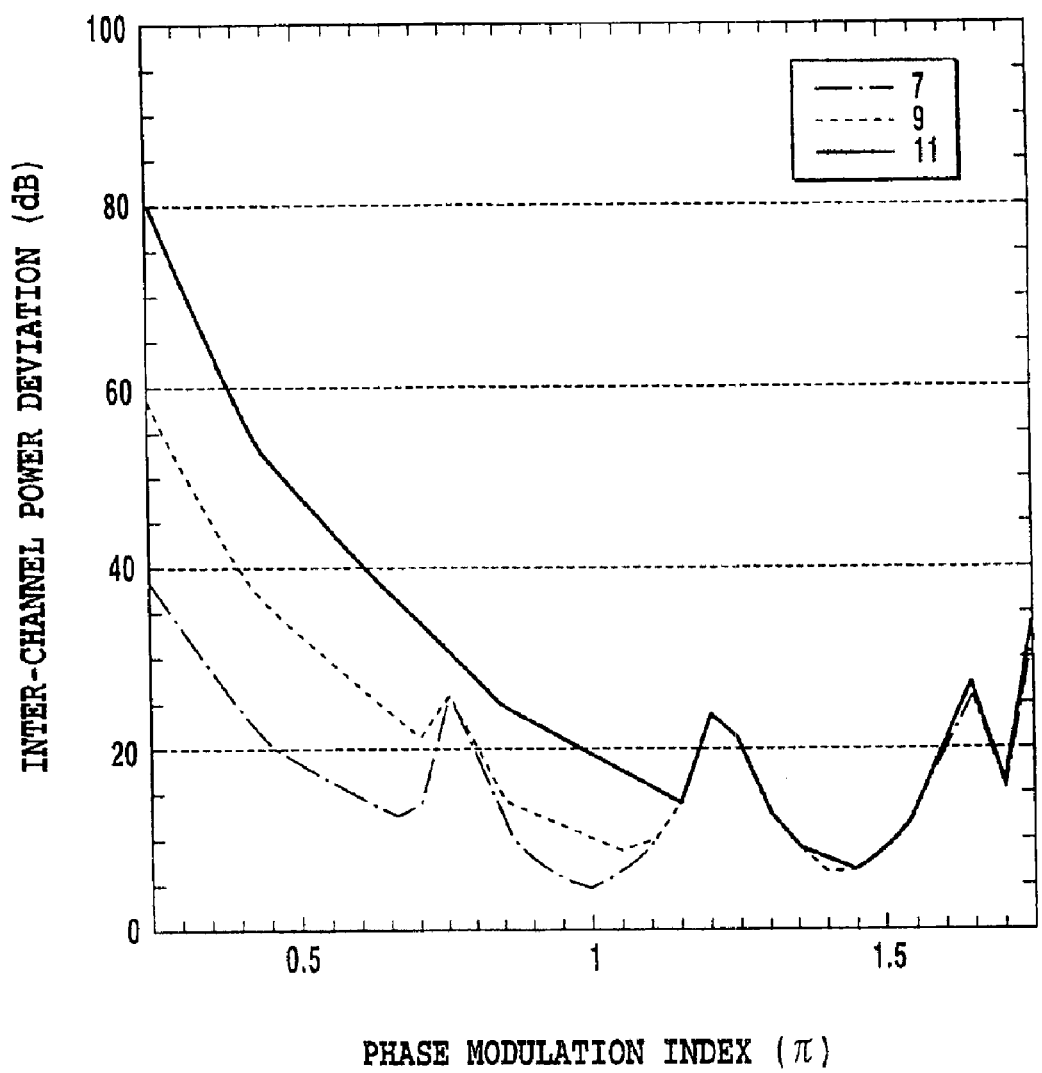
FIG. 31 is a characteristic diagram showing how the power deviation varies with a modulation index according to the deviation of the first embodiment of the multi-wavelength generating apparatus of the present invention.

FIG. 31 is a characteristic diagram showing an example in which the power level deviations among the channels are varied in such a deviation of the first embodiment.

FIG. 31 shows cases where the number of channels is 7, 9, or 11. For example, in the case of 7 channels, small power level deviations of 5 to 6 dB can be achieved among the channels when the sum of the sinusoidal signal voltages are regulated such that their sum is approximately $1.0\pi$ or $1.4\pi$ when it is converted into a phase modulation index. In the case of 9 and 11 channels, the power level deviations among the channels exhibit a substantially minimum value when similar regulating values are used.

Reference numeral (a) in FIG. 29 for the first embodiment shows a case where if the amplitude of the incident light having its phase modulated using the angular modulating function is gated, the spectrum is flattened by gating the amplitude at such temporal intervals that the square wave covers each of the upper angular portions. That is, in the first embodiment, if the wave is composed of increase periods in which the phase of the incident light with the single wavelength is modulated linearly with respect to the signal voltage waveform applied to the input port and in which the signal voltage increases monotonously during a continuous period that is half of the period of the signal voltage, and decrease periods each corresponding to the remaining half continuous period and in which the signal voltage decreases monotonously in such a manner that the monotonous increase in the increase period and this monotonous decrease are symmetrical, the signal voltage waveform is gated with such timings shown by reference numeral (a) in FIG. 29 that the square wave spans across the increase period (the differential coefficient of the phase modulating function is positive) and the decrease period (the differential coefficient of the phase modulating function is negative).

In the deviation described here, the spectrum of the output multi-wavelength light can also be flattened by gating the signal voltage waveform individually during the increase periods and during the decrease periods. This will be described with reference to FIG. 32.

As already described (see (a) to (c) in FIG. 28), if the incident light simply has its phase modulated using the angular modulating function, the optical power decreases in the vicinity of the carrier frequency, thus preventing the spectrum of the output multi-wavelength light from being flattened.

Figure 32:
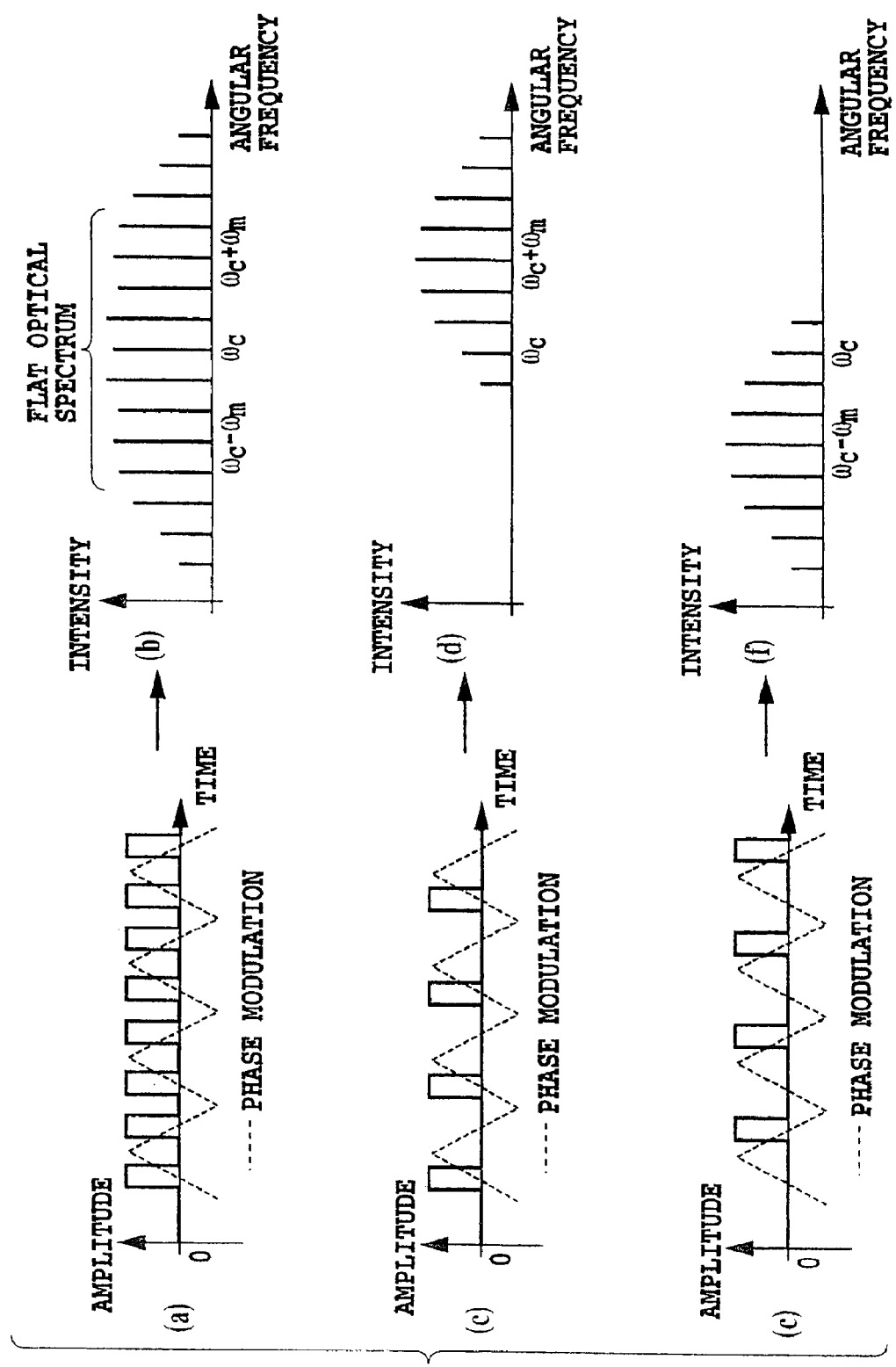
FIGS. 32(a)–32(f) are waveform diagrams useful in explaining that an optical spectrum can be flattened according to the deviation of the first embodiment of the multi-wavelength generating apparatus of the present invention.

Thus, in the deviation described here, the spectrum is flattened as shown by reference numeral (b) in FIG. 32 by gating the signal voltage waveform individually during the periods (phase modulating function increase periods) when the differential coefficient of the phase modulating function is positive and during the periods (phase modulating function decrease periods) when the differential coefficient of the phase modulating function is negative, as shown by reference numeral (a) in FIG. 32.

The waveform shown by reference numeral (a) in FIG. 32 will be considered by dividing it into (c) and (e) in FIG. 32. The gating operation with the waveform shown by reference numeral (c) in FIG. 32 results in an RZ signal spectrum around the instantaneous angular frequency $(\omega_c+\omega_m)$ as shown by reference numeral (d) in FIG. 32. The gating operation with the waveform shown by reference numeral (e) in FIG. 32 results in an RZ signal spectrum around the instantaneous angular frequency $(\omega_c-\omega_m)$ as shown by reference numeral (f) in FIG. 32. Consequently, these overlaps indicate that the spectrum of the output multi-wavelength light can also be flattened as in the above first embodiment by executing the gating with the waveform shown by reference numeral (a) in FIG. 32.

Furthermore, another temporal waveform can be used as a modulating function. For example, the temporal waveform may be, for example, that of a sinusoidal wave that monotonously repeats increasing and decreasing with a fixed period.

[Second Embodiment of the Multi-Wavelength Generating Apparatus]

Figure 33:
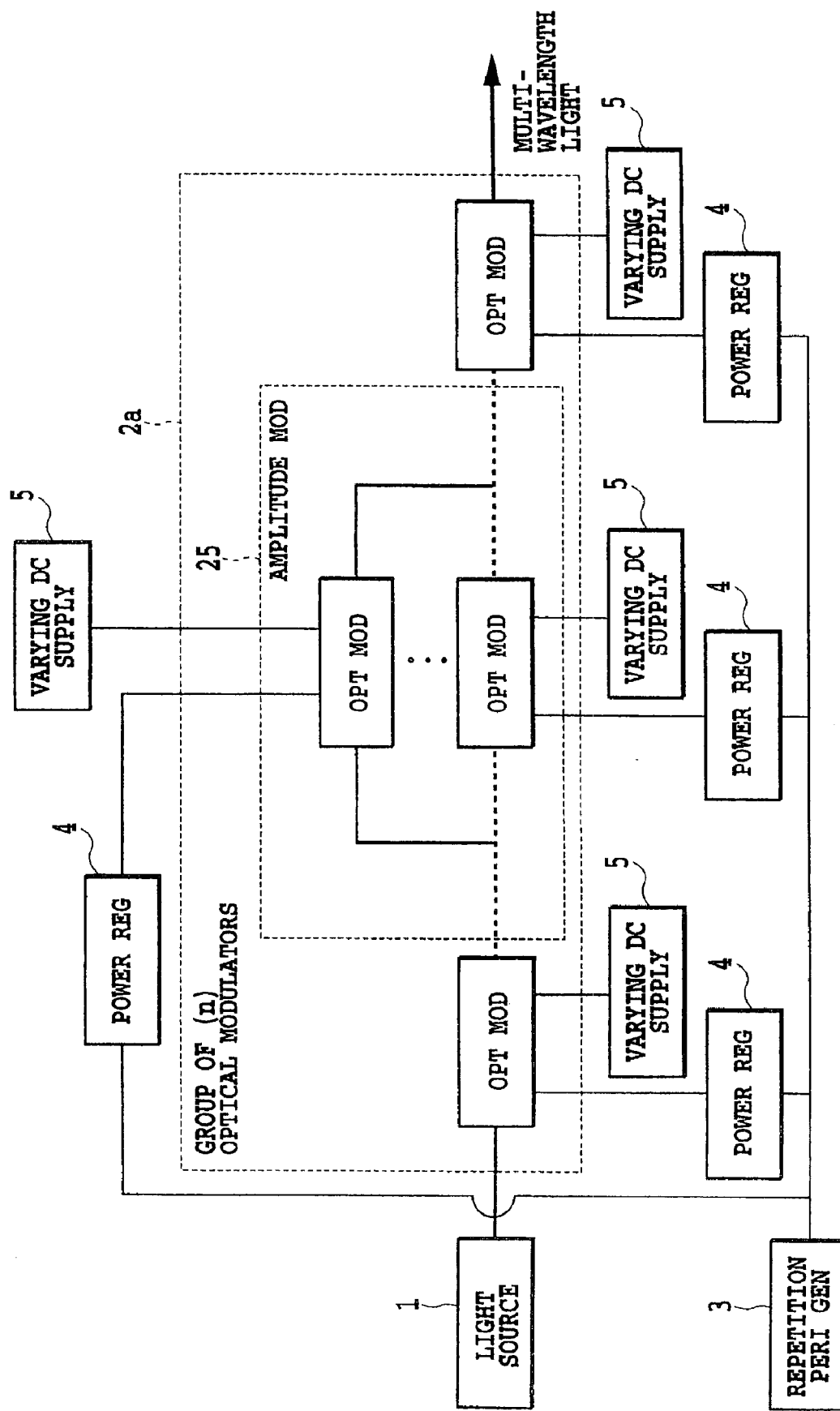
FIG. 33 is a view showing a second embodiment of the multi-wavelength generating apparatus according to the present invention.

The second embodiment of the multi-wavelength generating apparatus according to the present invention includes an amplitude modulating section 25 in which optical paths coupled together in parallel are provided in a group of optical modulators 2a, with at least one of the optical paths having one of the optical modulators arranged therein, as shown in FIG. 33 (in FIG. 33, all the optical paths coupled together in parallel have the optical modulator arranged therein). The amplitude modulating section 25 has an input-side optical modulator and an output-side optical modulator coupled thereto in series via the optical path. The optical modulators themselves are phase modulators, but the optical paths (optical modulators) can cooperate with one another to operate as an amplitude modulator; modulating operations are performed on the basis of a power-regulated signal voltage and a power-varied bias.

[Third Embodiment of the Multi-Wavelength Generating Apparatus]

Figure 34:
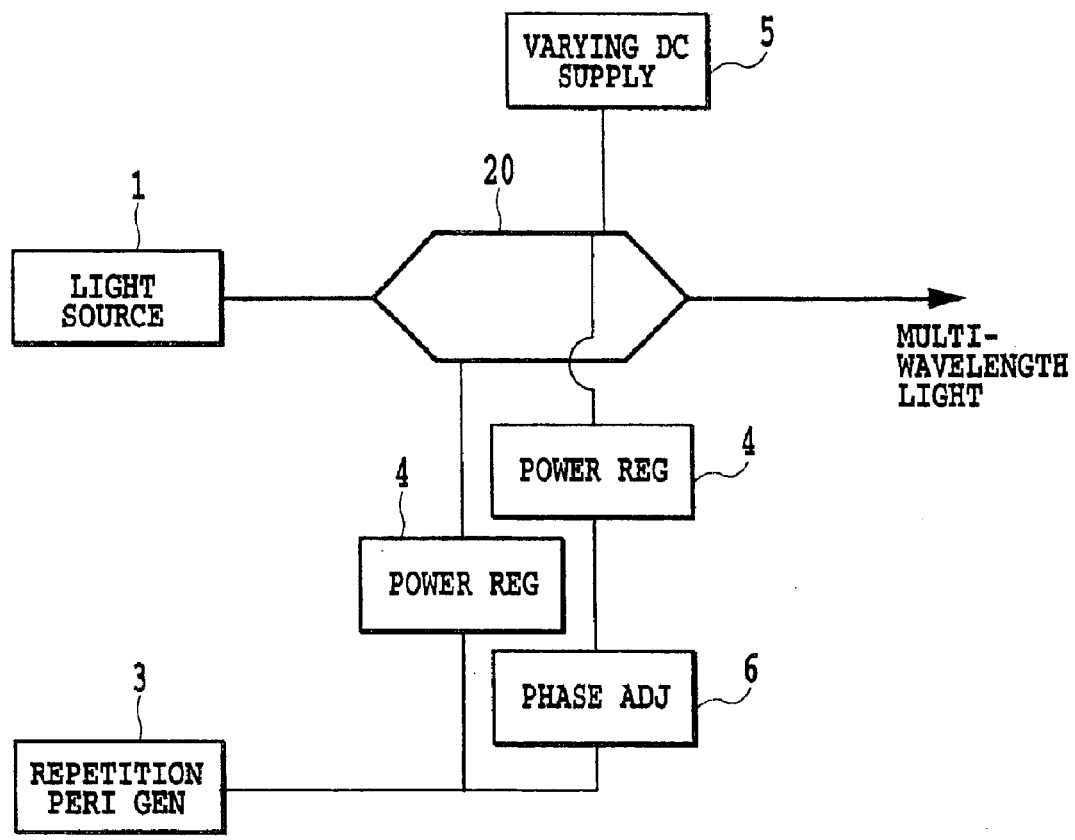
FIG. 34 is a view showing a third embodiment of the multi-wavelength generating apparatus according to the present invention.

FIG. 34 shows the configuration of the third embodiment of the multi-wavelength generating apparatus according to the present invention.

As shown in FIG. 34, the multi-wavelength generating apparatus of this embodiment is composed of the light source 1 generating a light having a single central wavelength, a bipolar Mach-Zehnder intensity modulator 20, a oscillator 3 for generating a signal voltage repeated with a predetermined period, the power regulator 4, the power-varying DC power supply 5, and a phase adjuster 6. The power regulator 4 and the phase regulator 6 are coupled together in series.

The bipolar Mach-Zehnder intensity modulator 20 has such a well-known configuration that an incident light is branched into two optical paths so that output lights from the optical modulators arranged in the corresponding optical paths are multiplexed and converged for emission. Each of the branched paths has optical modulating means (phase modulating means) arranged therein. These plural optical modulating means are each a phase modulating means, but can cooperate with each other in performing an amplitude modulating operation. Although the optical modulating means may be provided in both the optical paths, similar effects can be achieved by providing one of the optical modulating means in only one of the optical paths.

A signal voltage from the oscillator 3 has its power regulated properly by the power regulator 4 and is then applied to one of the electrodes of the Mach-Zehnder intensity modulator 20. This signal voltage further has its temporal position regulated by the phase regulator 6, has its power regulated properly by the power regulator 4, and is then applied to the other electrode of the Mach-Zehnder intensity modulator 20. The latter electrode also receives a bias with its power regulated properly, from the power-varying DC power supply 5.

A light from the light source 1 is incident on the Mach-Zehnder intensity modulator 20. The Mach-Zehnder intensity modulator 20 modulates the incident light on the basis of the above signal voltage and bias; the amplitude and/or phase of the light source light is modulated.

In this embodiment, the Mach-Zehnder intensity modulator 20 has a simple configuration due to its effect of simultaneously modulating the amplitude and phase by properly regulating the power of the signal voltage applied via the power regulator 4 and the bias applied by the power-varying DC power supply 5.

[Fourth Embodiment of the Multi-Wavelength Generating Apparatus]

Figure 35:
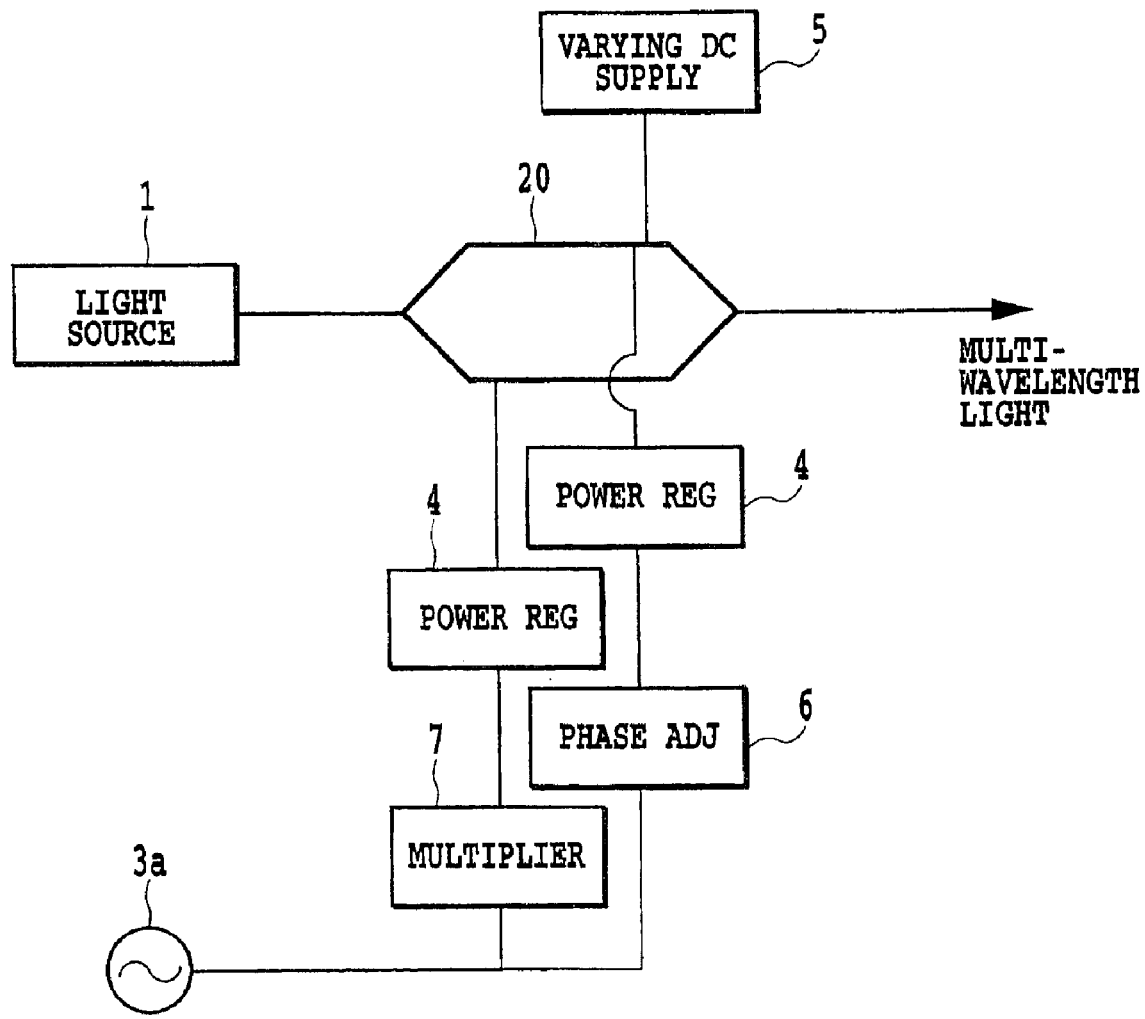
FIG. 35 is a view showing a fourth embodiment of the multi-wavelength generating apparatus according to the present invention.

FIG. 35 shows the configuration of the fourth embodiment of the multi-wavelength generating apparatus according to the present invention.

The multi-wavelength generating apparatus of this embodiment shown in FIG. 35 comprises, instead of the oscillator 3 of the third embodiment, an oscillator 3a for generating a sinusoidal signal voltage as one for generating a signal voltage repeated with a predetermined period. It further comprises a multiplier 7 coupled to the power regulator 4 in series.

This configuration varies the frequency of the signal voltage applied to the opposite electrodes of the Mach-Zehnder intensity modulator 20. That is, an output signal voltage from the oscillator 3a is applied to one of the electrodes after having its frequency multiplied by the multiplier 7, while the output frequency from the oscillator 3a is applied to the other electrode as it is.

In this embodiment, the signal voltage repeated with the predetermined period and applied to the Mach-Zehnder intensity modulator 20 is a sinusoidal signal of a single frequency, so that the frequency band required for the electric elements constituting the electric circuit (the phase modulator 6 and the following component) can be limited, thus reducing the costs of these electric elements. Further, since the multiplier 7 multiplies the frequency of the signal voltage, the output optical spectrum can have a wide band.

[Fifth Embodiment of the Multi-Wavelength Generating Apparatus]

Figure 36:
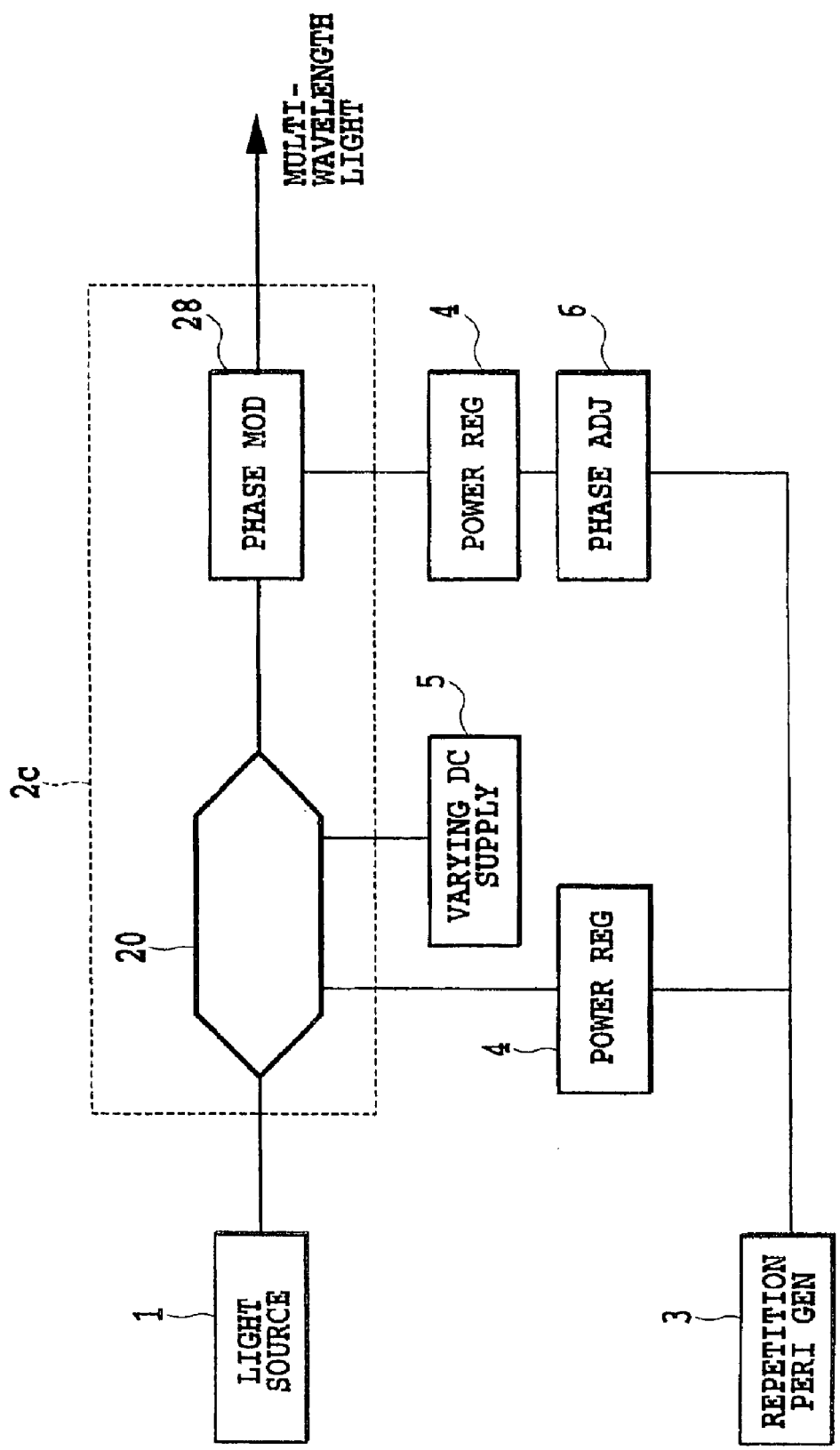
FIG. 36 is a view showing a fifth embodiment of the multi-wavelength generating apparatus according to the present invention.

FIG. 36 shows the configuration of the fifth embodiment of the multi-wavelength generating apparatus according to the present invention. The multi-wavelength generating apparatus of this embodiment shown in FIG. 36 is composed of the light source 1 generating a light having a single central wavelength, a group of optical modulators 2c consisting of the bipolar Mach-Zehnder intensity modulator 20 and a phase adjuster 28 coupled together in series, the oscillator 3 for generating a signal voltage repeated with a predetermined period, the power regulator 4, the power-varying DC power supply 5, and the phase regulator 6.

A signal voltage from the oscillator 3 has its power regulated properly by the power regulator 4 and is then applied to the Mach-Zehnder intensity modulator 20. This signal voltage further has its temporal position regulated by the phase regulator 6, has its power regulated properly by the power regulator 4, and is then applied to the Mach-Zehnder intensity modulator 20. The Mach-Zehnder intensity modulator 20 also receives a bias with its power regulated properly, from the power-varying DC power supply 5.

A light from the light source 1 is incident on the group of optical modulators 2c. The group of optical modulators 2c modulate the incident light on the basis of the above signal voltage and bias; the amplitude and/or phase of the light source light is modulated.

In this embodiment, since the two optical modulators (Mach-Zehnder intensity modulator 20 and phase adjuster 28) are arranged in series, the output optical spectrum can have a winder band than in the third and fourth embodiments.

Figure 37:
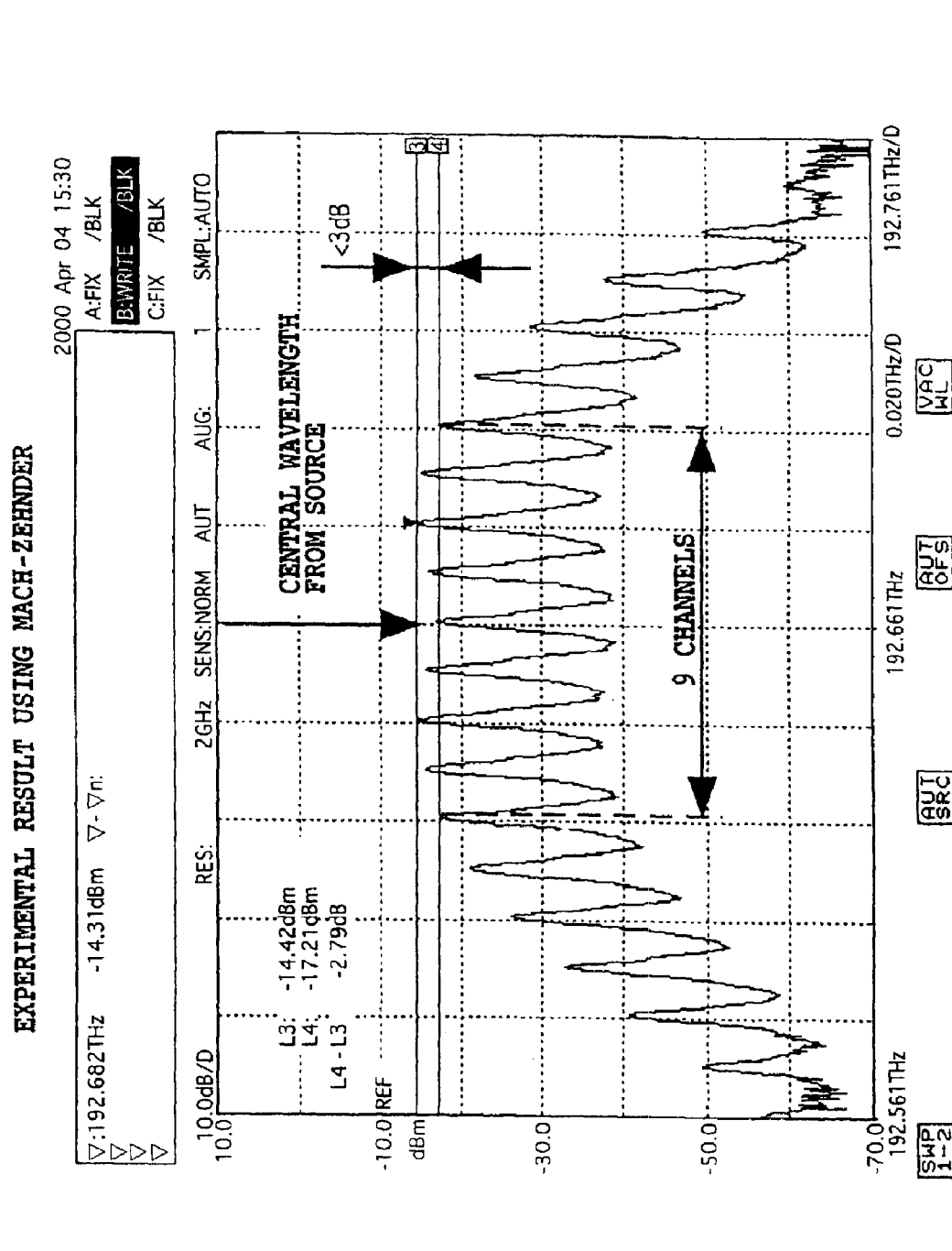
FIG. 37 is a waveform diagram showing the results of an experiment according to the fifth embodiment of the multi-wavelength generating apparatus of the present invention.

FIG. 37 shows the results of an experiment according to this embodiment in which a 10-GHz sinusoidal wave is used as the signal voltage from the oscillator 3 which is repeated with the predetermined period. FIG. 37 indicates that a flatness below 3 dB can be achieved for a 9-channel signal including the central frequency of the light from the light source 1.

[Sixth Embodiment of the Multi-Wavelength Generating Apparatus]

Figure 38:
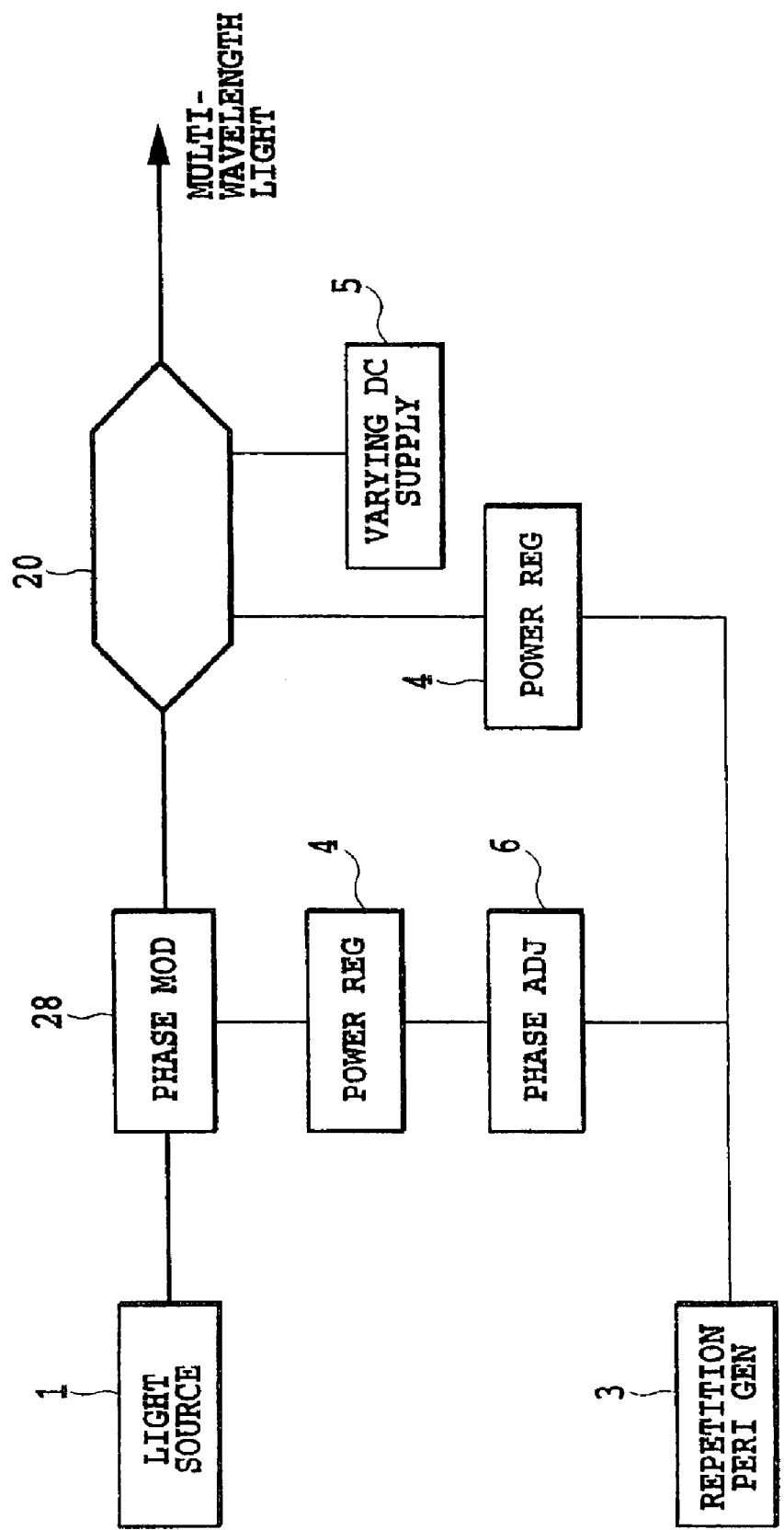
FIG. 38 is a view showing a sixth embodiment of the multi-wavelength generating apparatus according to the present invention.

In the sixth embodiment of the multi-wavelength generating apparatus according to the present invention, the Mach-Zehnder intensity modulator 20 and the phase adjuster 28 of the fifth embodiment are replaced with each other as shown in FIG. 38. This embodiment can perform modulating operations similar to those of the fifth embodiment.

As shown in this example, even if the optical modulators coupled together in series in the multi-wavelength generating apparatus of the present invention are replaced with each other, the output optical spectrum obtained is not affected, but effects similar to those of the above embodiments can be obtained.

[Seventh Embodiment of the Multi-Wavelength Generating Apparatus]

Figure 39:
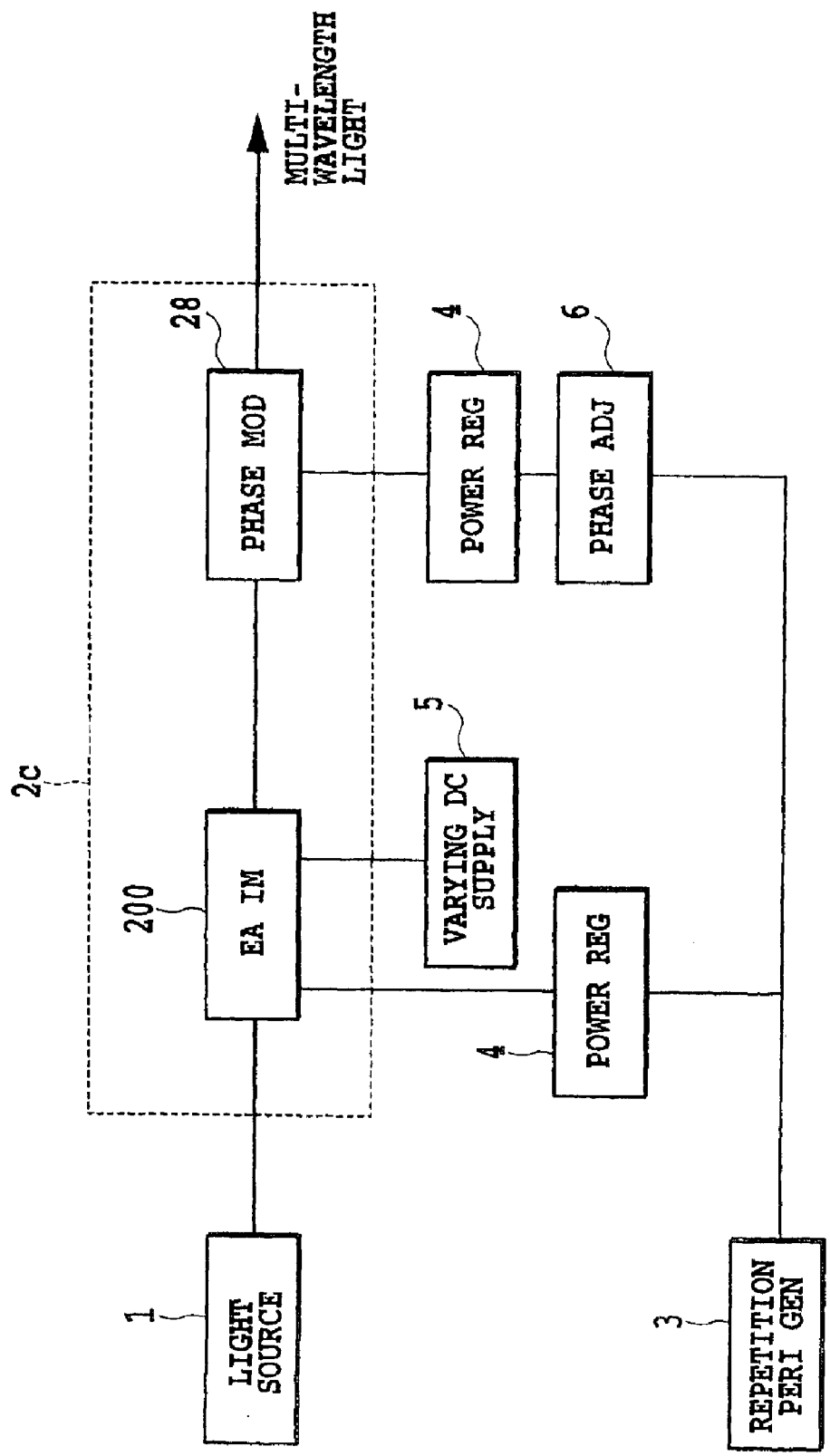
FIG. 39 is a view showing a seventh embodiment of the multi-wavelength generating apparatus according to the present invention.

In the seventh embodiment of the multi-wavelength generating apparatus according to the present invention, the Mach-Zehnder intensity modulator 20 of the fifth embodiment is replaced with a group of optical modulators 2e comprising an electro-absorption intensity modulators 200 as shown in FIG. 39. The multi-wavelength generating apparatus of this embodiment provides operational effects similar to those of the fifth embodiment as shown below.

Figure 40:
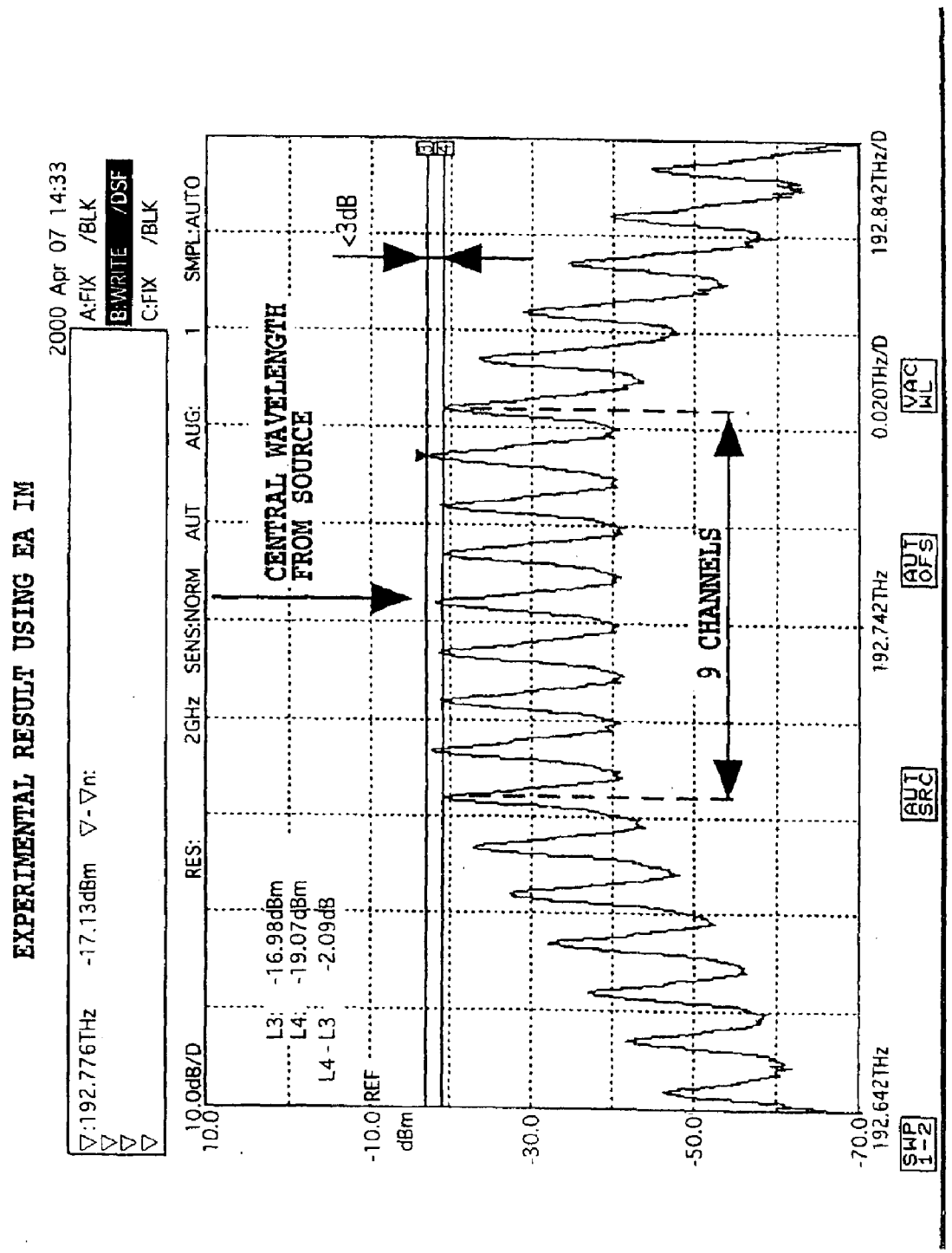
FIG. 40 is a waveform diagram showing the results of an experiment according to the seventh embodiment of the multi-wavelength generating apparatus of the present invention.

FIG. 40 shows the results of an experiment according to this embodiment in which a 10-GHz sinusoidal wave is used as the signal voltage from the oscillator 3 which is repeated with the predetermined period. FIG. 40 indicates that a flatness below 3 dB can be achieved for a 9-channel signal including the central frequency of the light from the light source 1 as in the fifth embodiment (FIG. 37).

[Eighth Embodiment of the Multi-Wavelength Generating Apparatus]

Figure 41:
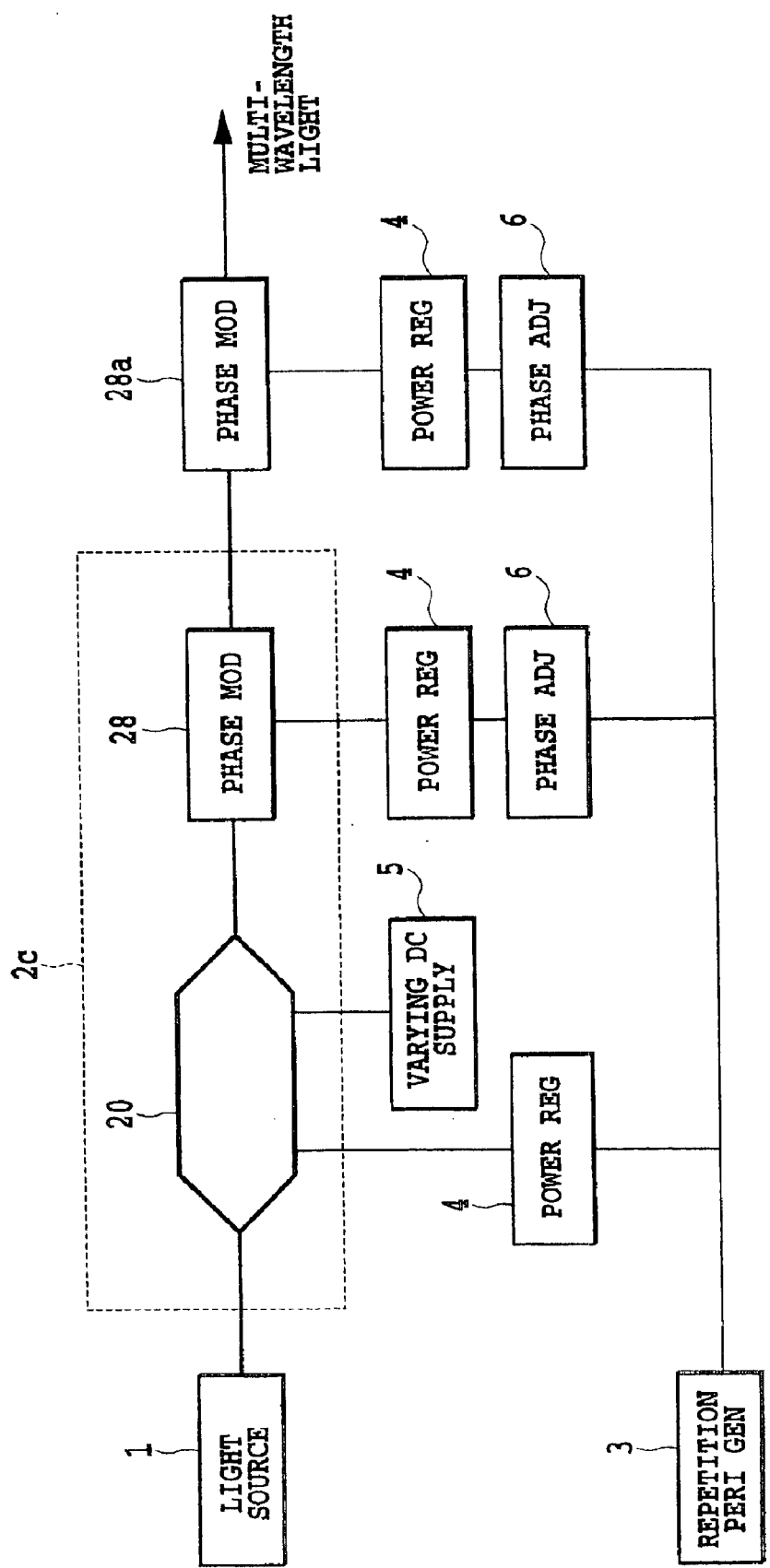
FIG. 41 is a view showing an eighth embodiment of the multi-wavelength generating apparatus according to the present invention.

In the eighth embodiment of the multi-wavelength generating apparatus according to the present invention, a phase adjuster 28a is provided after the group of optical modulators 2c of the fifth embodiment, and the power regulator 4 and the phase regulator 6 coupled together in series are correspondingly added, as shown in FIG. 41. That is, this embodiment comprises the group of three optical modulators; the first is an amplitude modulator, and the second and third are phase modulators.

Thus, the output optical spectrum can have a much wider band than in the fifth to seventh embodiments.

[Ninth Embodiment of the Multi-Wavelength Generating Apparatus]

Figure 42:
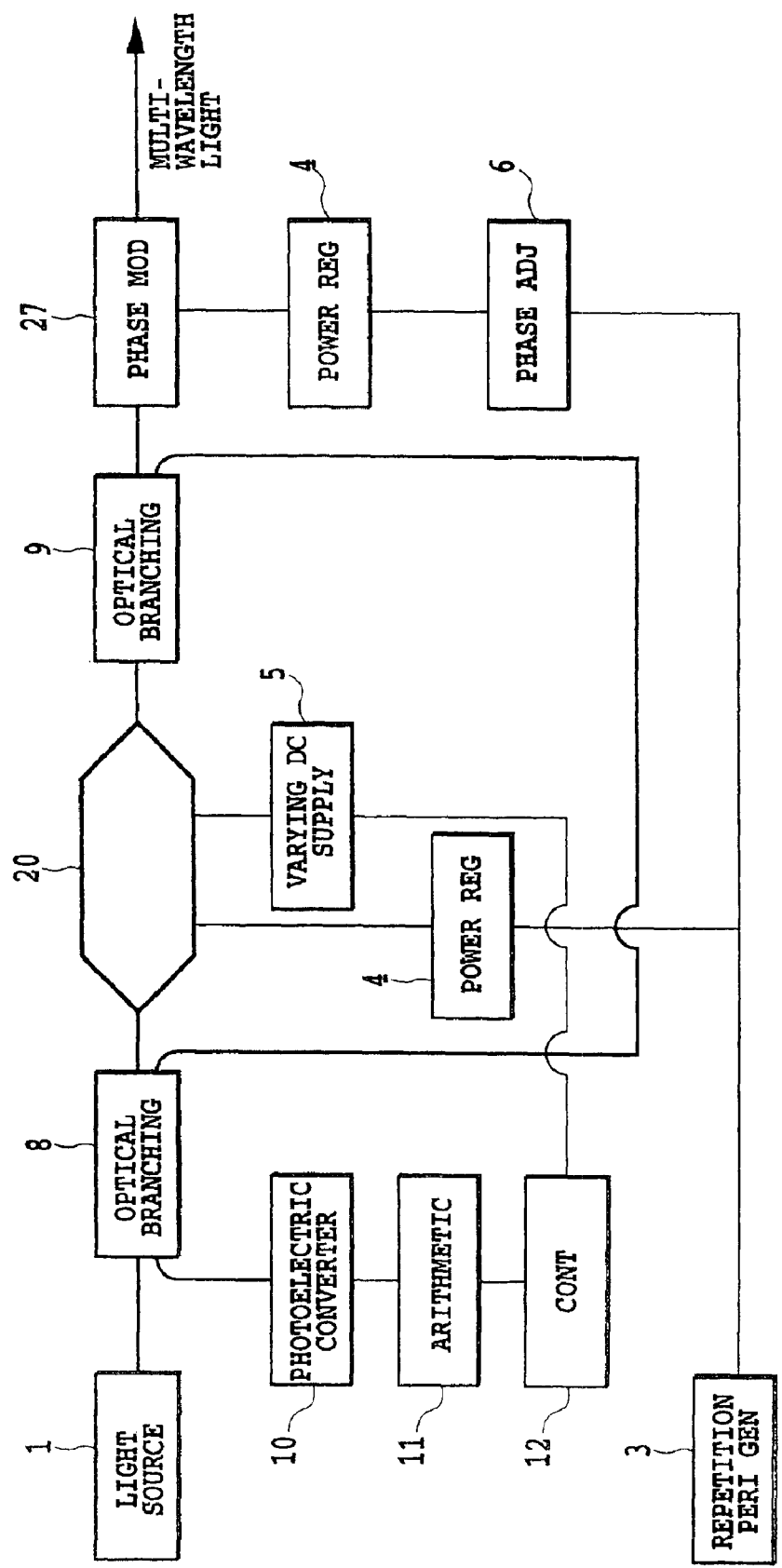
FIG. 42 is a view showing a ninth embodiment of the multi-wavelength generating apparatus according to the present invention.
Figure 43:
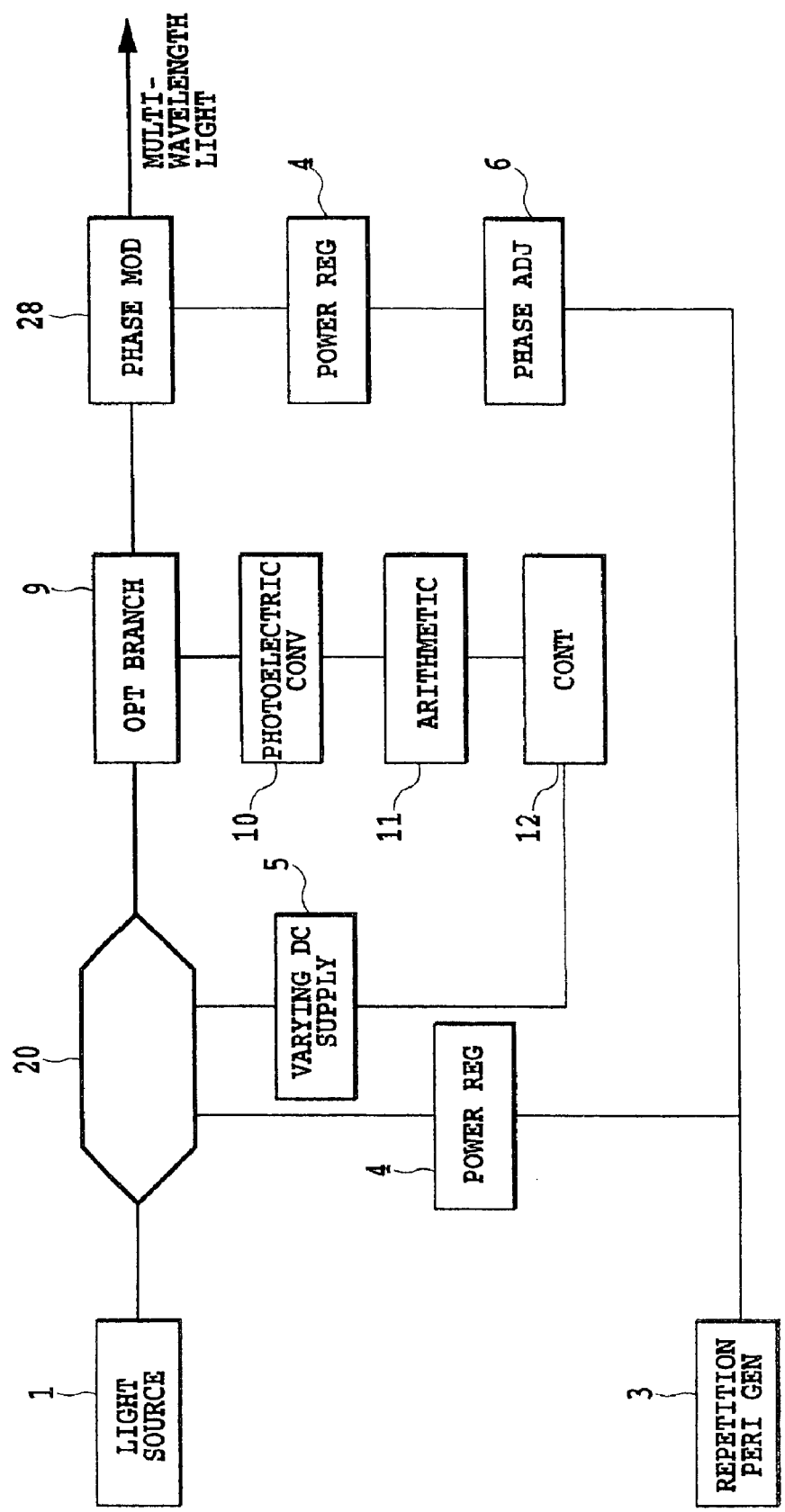
FIG. 43 is a view showing a tenth embodiment of the multi-wavelength generating apparatus according to the present invention.

In the ninth embodiment of the multi-wavelength generating apparatus according to the present invention, an optical branching unit 8 is arranged between the light source 1 and the Mach-Zehnder intensity modulater 20 of the fifth embodiment, an optical branching unit 9 is arranged between the Mach-Zehnder intensity modulater 20 and the phase adjuster 28 of the fifth embodiment, with the optical branching units 8 and 9 coupled together, and a cascade circuit of a photoelectric converter 10, an arithmetic unit 11, and a controller 12 is coupled to a branching output of the optical branching unit 8, as shown in FIG. 42. That is, this embodiment comprises the optical branching units 8 and 9 at the input and output sides of the Mach-Zehnder intensity modulator 20, respectively. The controller 12 controls the bias provided to the Mach-Zehnder intensity circuit 20 by the power-varying DC power supply 5.

In the above configuration, a branched light obtained with the optical branching unit 8 by branching a light from the light source 1 is allowed to fall on the output-side optical branching unit 9, and is transmitted therethrough in the direction opposite to that of the output multi-wavelength light, and then falls on the Mach-Zehnder intensity modulator 20. The light transmitted in the opposite direction has the same central wavelength as well as a light from the light source, which is incident on the Mach-Zehnder intensity modulator 20 and has the single central wavelength. The light transmitted in the opposite direction is taken out by the input-side optical branching unit 8 and then falls on the photoelectric converter 10. The light is then converted by the photoelectric converter 10 into an electric signal depending on its monitored power. The arithmetic unit 11 calculates a difference between the level of the electric signal obtained by the conversion and a preset target value. The controller 12 regulates an output power from the power-varying DC power supply 5 on the basis of the result of the calculation to control a bias point for the Mach-Zehnder intensity modulator 20, thus flattening the output optical spectrum.

Another configuration is possible wherein an optical circulator (not shown) is installed after the input-side optical branching unit 8 so that the function of branching the light from the light source 1 is provided for the optical branching unit 8, while the function of taking out the light transmitted in the opposite direction and allowing it to fall on the photoelectric converter 10 is provided for the optical circulator. Further, the output-side optical branching unit 9 may be an optical circulator.

[Tenth Embodiment of the Multi-Wavelength Generating Apparatus]

In the tenth embodiment of the multi-wavelength generating apparatus according to the present invention, the optical branching unit 9 is arranged between the Mach-Zehnder intensity circuit 20 and the phase adjuster 28 of the fifth embodiment, and the cascade circuit of the photoelectric converter 10, the arithmetic unit 11, and the controller 12 is coupled to an output of the optical branching unit 9. That is, the Mach-Zehnder intensity circuit 20 includes the optical branching unit 9 at its output side. The controller 12 regulates the bias for the Mach-Zehnder intensity modulator 20 provided by power-varying DC power supply 5.

In the above configuration, an output light from the Mach-Zehnder intensity modulator 20 which has been branched by the optical branching unit 9 is output to the photoelectric converter 10, where it is converted into an electric signal depending on the monitored power of the light.

[Eleventh Embodiment of the Multi-Wavelength Generating Apparatus]

Figure 44:
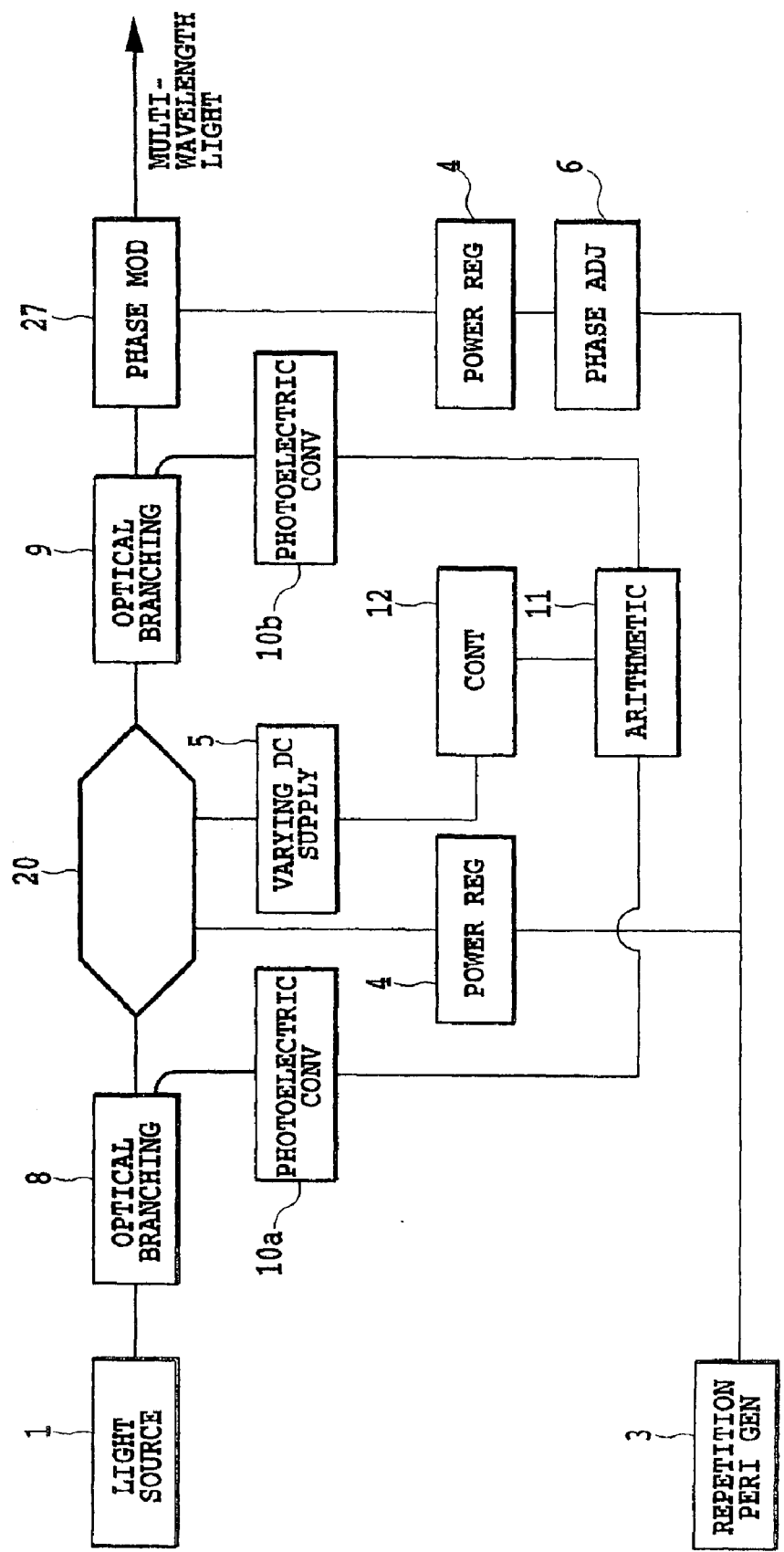
FIG. 44 is a view showing an eleventh embodiment of the multi-wavelength generating apparatus according to the present invention.

FIG. 44 is a view showing an eleventh embodiment of the multi-wavelength generating apparatus according to the present invention.

The above described ninth and tenth embodiments suffer from a deviation in a target bias value due to a power deviation of the light source 1. The eleventh embodiment would eliminate the power deviation detriment.

The configuration of the embodiment includes an optical branching unit 8 and a photoelectric converter 10a provided at output of the light source 1 additionally to the configuration of the tenth embodiment. The arithmetic unit 11 monitors an input optical power level and an output optical power level of the Mach-Zehnder intensity modulator 20 through the photoelectric converters 10a and 10b. The controller 12 controls the power-varying DC power supplies 5 according to monitored two levels such that a bias applied to the Mach-Zehnder intensity modulator 20 by the power-varying DC power supplies 5 maintains the ratio of both optical power level constant. In the eleventh embodiment, thus, the power deviation of the light source 1 does not influence to the target bias value.

[Twelfth Embodiment of the Multi-Wavelength Generating Apparatus]

Figure 45:
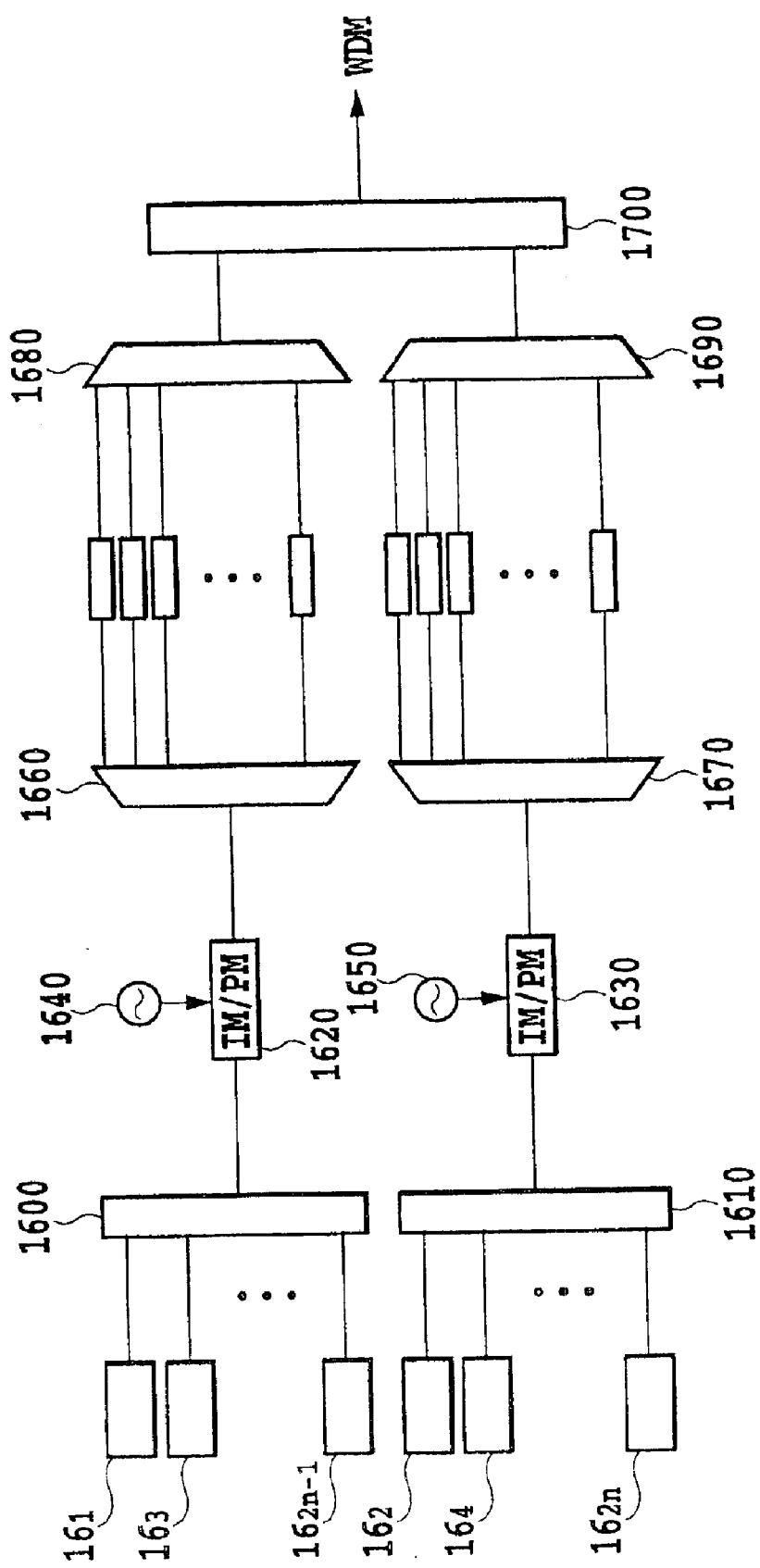
FIG. 45 is a view showing a twelfth embodiment of the multi-wavelength generating apparatus according to the present invention.

FIG. 45 is a view showing the configuration of the twelfth embodiment of the multi-wavelength generating apparatus according to the present invention.

In the multi-wavelength generating apparatus of this embodiment, a light source light from $2n$ (n is a natural number of 1 or more) lasers for generating lights of different single central wavelengths is divided into two beams, which are separately processed. The results of the processes are multiplexed to obtain a final multiplexed output. The configuration and operation of this embodiment will be described below in detail.

In FIG. 45, reference numerals $16_1$, $16_2$, $16_3$, $16_4$, ... $16_{2n-1}$, and $16_{2n}$ denote laser light emitting elements for generating lights of different single central wavelengths, the elements being arranged on the frequency axis at equal intervals in the order of the subscripts. Reference numeral 1600 denotes an optical multiplexer for multiplexing lights from odd-number-th laser light-emitting elements. Reference numeral 1610 denotes an optical multiplexer for multiplexing lights from even-number-th laser light-emitting elements independently of the odd-number-th laser light-emitting elements. The optical multiplexers 1600 and 1610 maybe optical couplers.

Figure 46A:
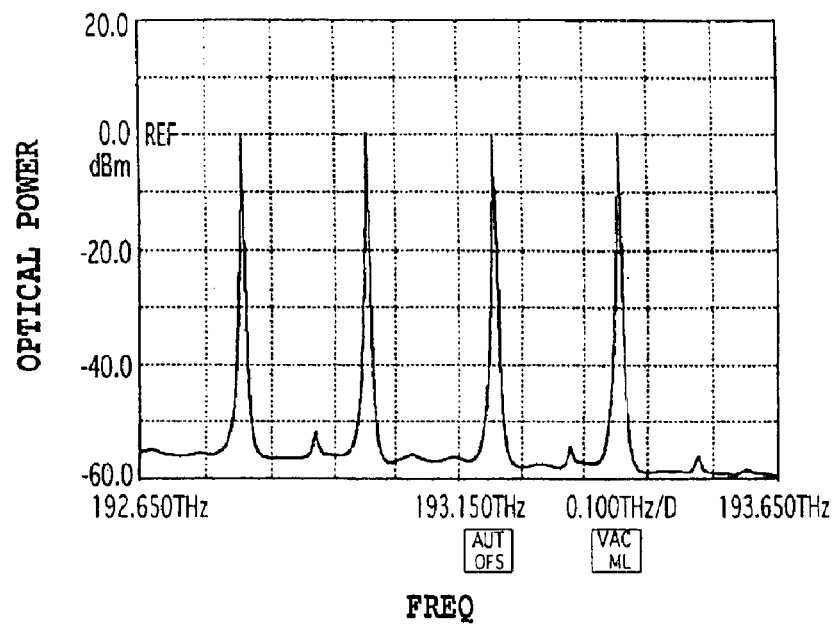
FIGS. 46A and 46B are waveform diagrams showing results of experiments according to the twelfth embodiment of the multi-wavelength generating apparatus of the present invention.
Figure 46B:
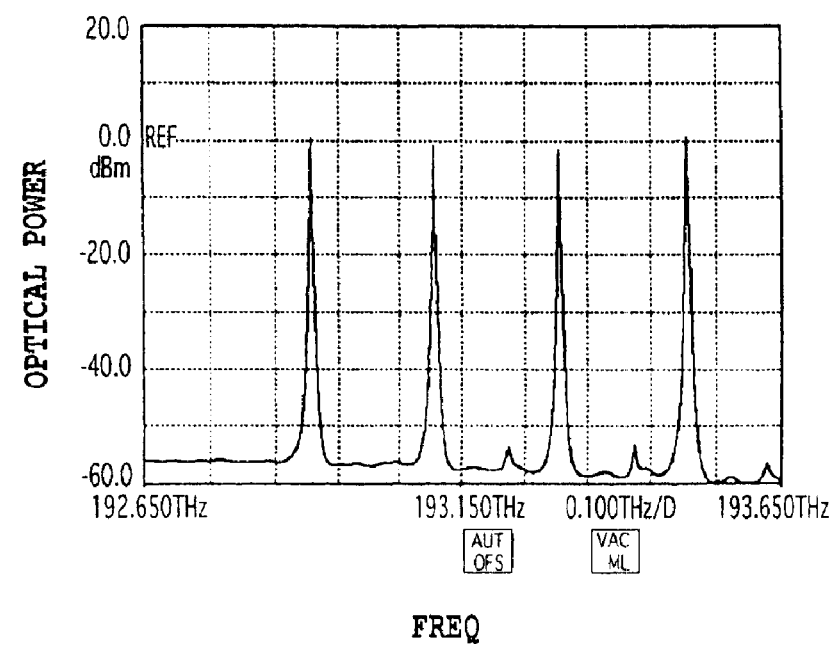

FIG. 46A shows the results of a measurement of an output optical spectrum from the optical multiplexer 1600 when n=8, and FIG. 46B shows the results of a measurement of an output optical spectrum from the optical multiplexer 1610 when n=8. These figures show that the eight light source lights are arranged on the frequency axis at equal intervals. Further, the powers of the light source lights are substantially the same.

One of the lights which is output from the optical multiplexer and which has such a spectrum is incident on a multi-wavelength generating apparatus (IM/PM) 1620, while the other is incident on a multi-wavelength generating apparatus (IM/PM) 1630 (IM/PM) 1630. The multi-wavelength generating apparatuses 1620 and 1630 have a configuration similar to that of the multi-wavelength generating apparatus of the fifth embodiment (see FIG. 36) and each comprise a group of optical modulators composed of a Mach-Zehnder intensity modulator (IM) and a phase modulator(PM), a power regulator, a power-varying DC power supply, and a phase regulator (see FIG. 36). Signal voltages from the oscillators 1640 and 1650, which are repeated within a predetermined period, are input to the multi-wavelength generating apparatuses 1620 and 1630, respectively. multi-wavelength generating apparatus of a different configuration such as the ones disclosed in the first to tenth embodiments may also be used.

Figure 47A:
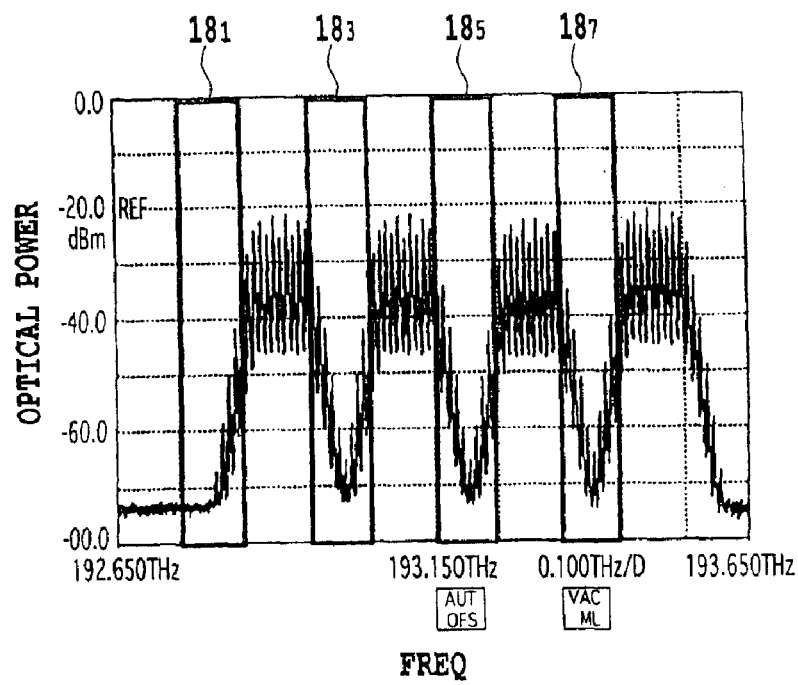
FIGS. 47A and 47B are waveform diagrams useful in explaining results of experiments according to the twelfth embodiment of the multi-wavelength generating apparatus of the present invention, as well as the operation of a modified example of the twelfth embodiment.
Figure 47B:
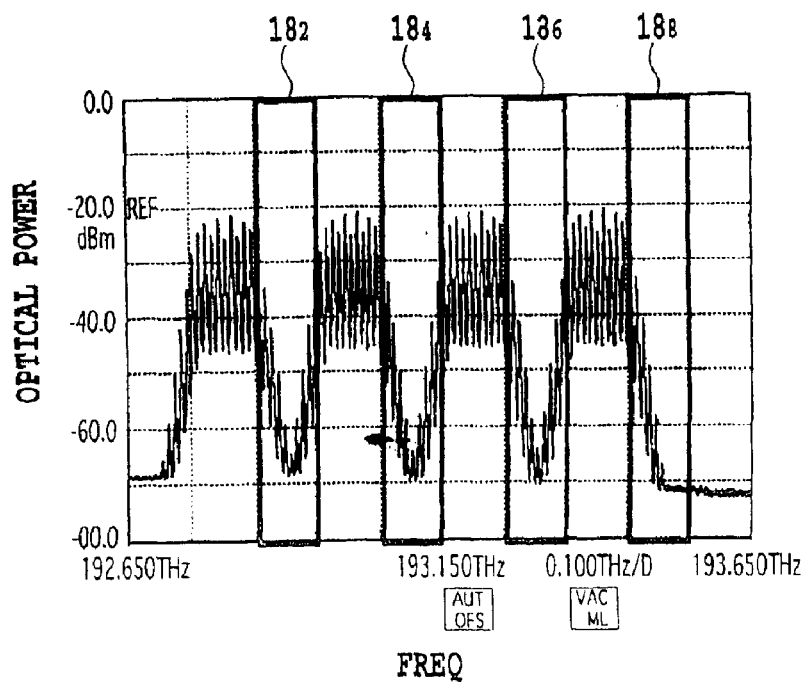

Thus, the results of the measurement obtained when, for example, n=8 indicate that the output optical spectrum from the multi-wavelength generating apparatus 1620 is flattened as shown in FIG. 47A and that the output optical spectrum from the multi-wavelength generating apparatus 1630 is flattened as shown in FIG. 47B.

Then, a light output from the multi-wavelength generating apparatus 1620 is demultiplexed by a demultiplexer 1660 into different wavelengths, which are then multiplexed by a multiplexer 1680. Further, a light output from the multi-wavelength generating apparatus 1630 is demultiplexed by a demultiplexer 1670 into different wavelengths, which are then multiplexed by a multiplexer 1690. The lights obtained by means of the multiplexing operations performed by both multiplexers are mulitplexed by an optical coupler 1700.

Figure 48:
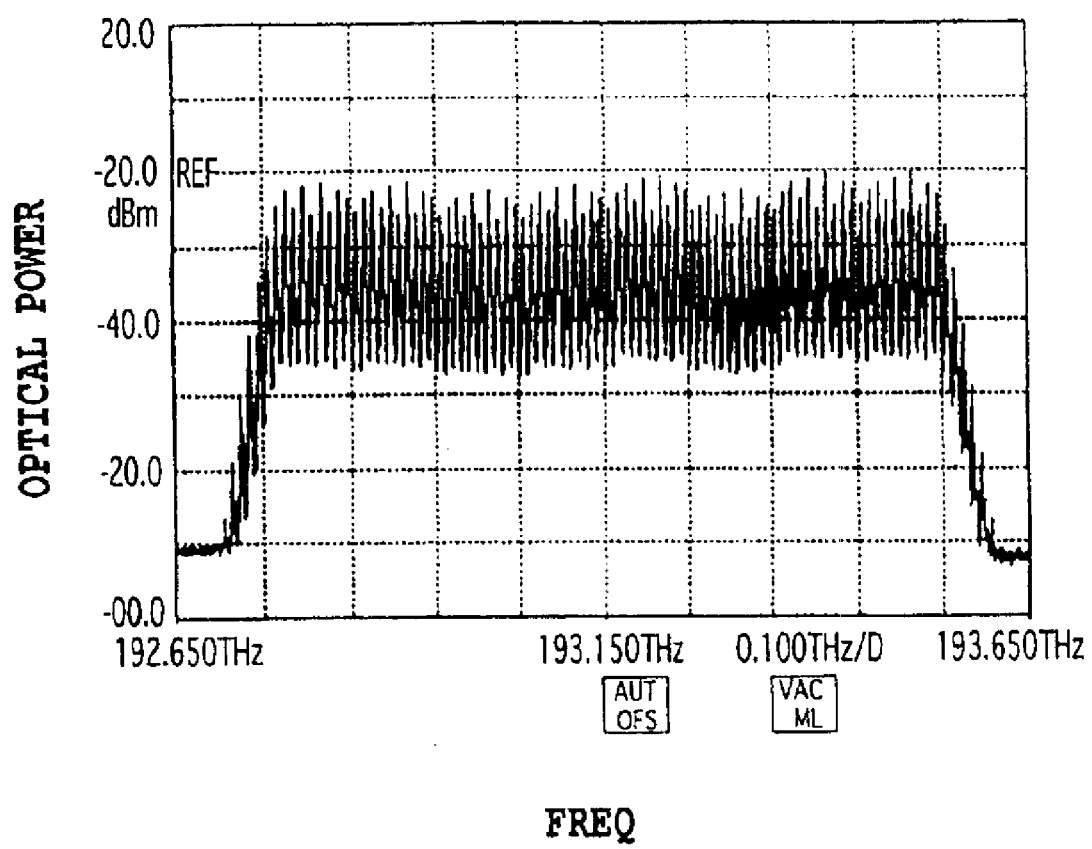
FIG. 48 is a waveform diagram showing the results of an experiment according to the twelfth embodiment of the multi-wavelength generating apparatus of the present invention.

If the lights shown in FIGS. 47A and 47B enter the multiplexers 1660 and 1670, the results of a measurement of an output optical spectrum from the optical coupler 1700 are as shown in FIG. 48, and more WDM signals can be generated than in the embodiments in which the light source light of the single wavelength is modulated, thereby increasing the band of the output optical spectrum.

[Modified Example of the Eleventh Embodiment of the Multi-wavelength Generating Apparatus]

If multi-wavelength lights are obtained in the twelfth embodiment, cross talk may disadvantageously occur between a system composed of the elements 1600 to 1680 and a system composed of the elements 1610 to 1690.

Thus, in this modified example, those side modes of the modified outputs from the multi-wavelength generating apparatuses 1620 and 1630 which are finally not used as signal lights are deleted by a multiplexer and demultiplexer (demultiplexer 1660 and multiplexer 1680 or demultiplexer 1670 and multiplexer 1690) by extracting central wavelengths emitted from the laser light emitting elements $16_1$, $16_3$, ... $16_{2n-1}$ and $16_2$, $16_4$, ... $16_{2n}$, through output ports $17_1$, $17_3$, ... $17_{2n-1}$ and $17_2$, $17_4$, ... $17_{2n}$ of the demultiplexers 1660 and 1670.

Consequently, when, for example, n=8, lights free from the areas shown by thick frames $18_1$, $18_3$, $18_5$, and $18_7$ in FIG. 47A are obtained at the output of the multiplexer 1680. Further, lights free from the areas shown by thick frames $18_2$, $18_4$, $18_6$, and $18_8$ in FIG. 47A are obtained at the output of the multiplexer 1690. Since the optical power of these areas is zero at the outputs of both multiplexers (not shown), an optical output WDM signal finally provided by the optical coupler 1700 by multiplexing the lights is free from the cross talk between the two systems.

As described above, this embodiment provides the configuration comprising the modulating section having the at least one optical modulating means coupled together in series and arranged at the predetermined locations of the plurality of paths including the one to which the incident light of the single central wavelength is input, and the plurality of voltage applying means for independently regulating and applying the signal voltage of the predetermined period to the input port of the optical modulating means. In this configuration, a multi-wavelength light is generated by flattening the incident light depending on the regulated and applied signal voltage and the predetermined period of the signal voltage, thus making it possible to generate a WDM signal as a multi-wavelength light having a flattened optical spectrum, using the simple and inexpensive configuration and without the need to design a complicated optical circuit.
[Application of the Eleventh Embodiment of the Multi-Wavelength Generating Apparatus]

Figure 49A:
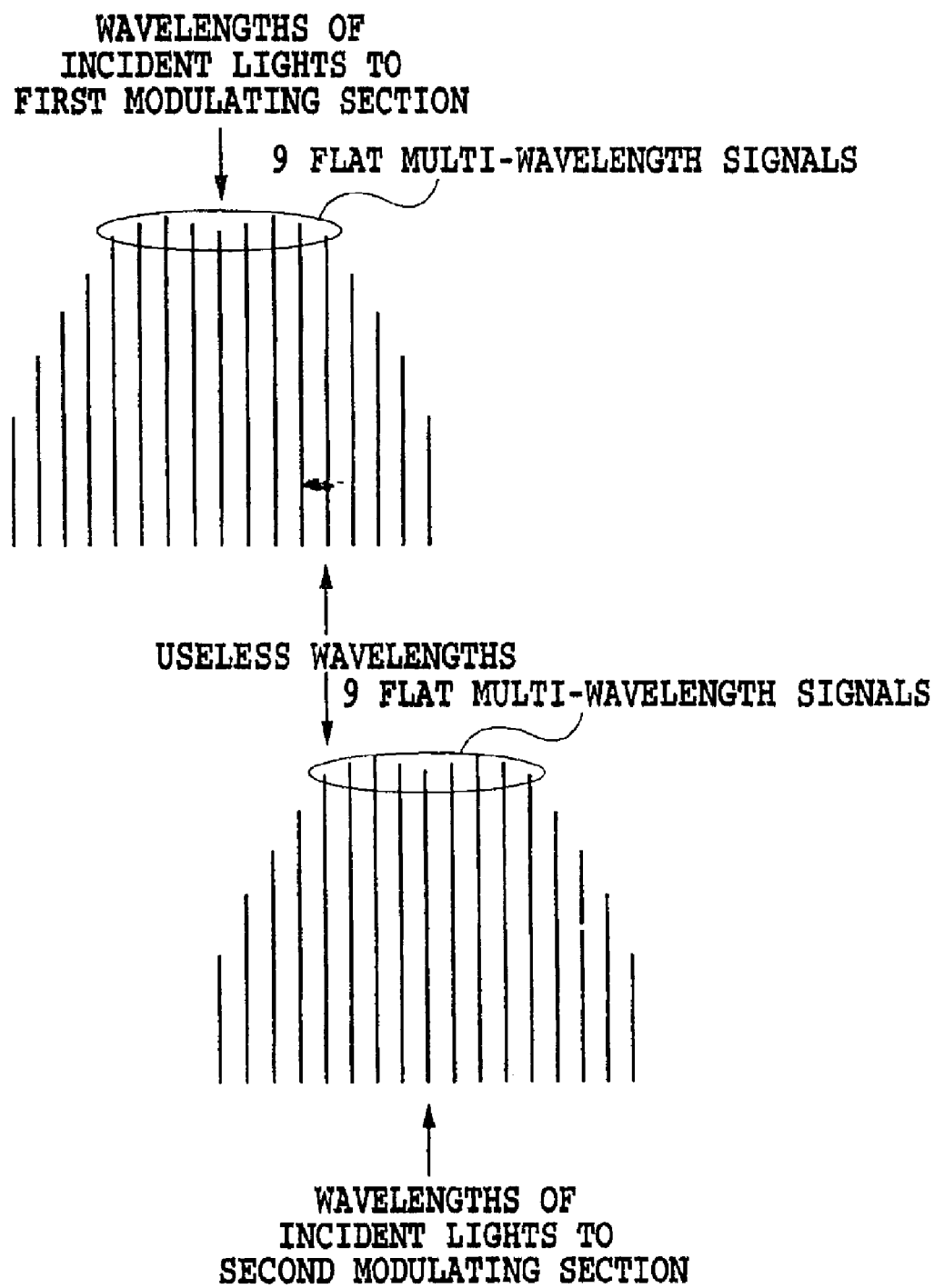
FIGS. 49A and 49B are schematic view useful in explaining operations to which the twelfth embodiment of the multi-wavelength generating apparatus of the present invention is applied.
Figure 49B:
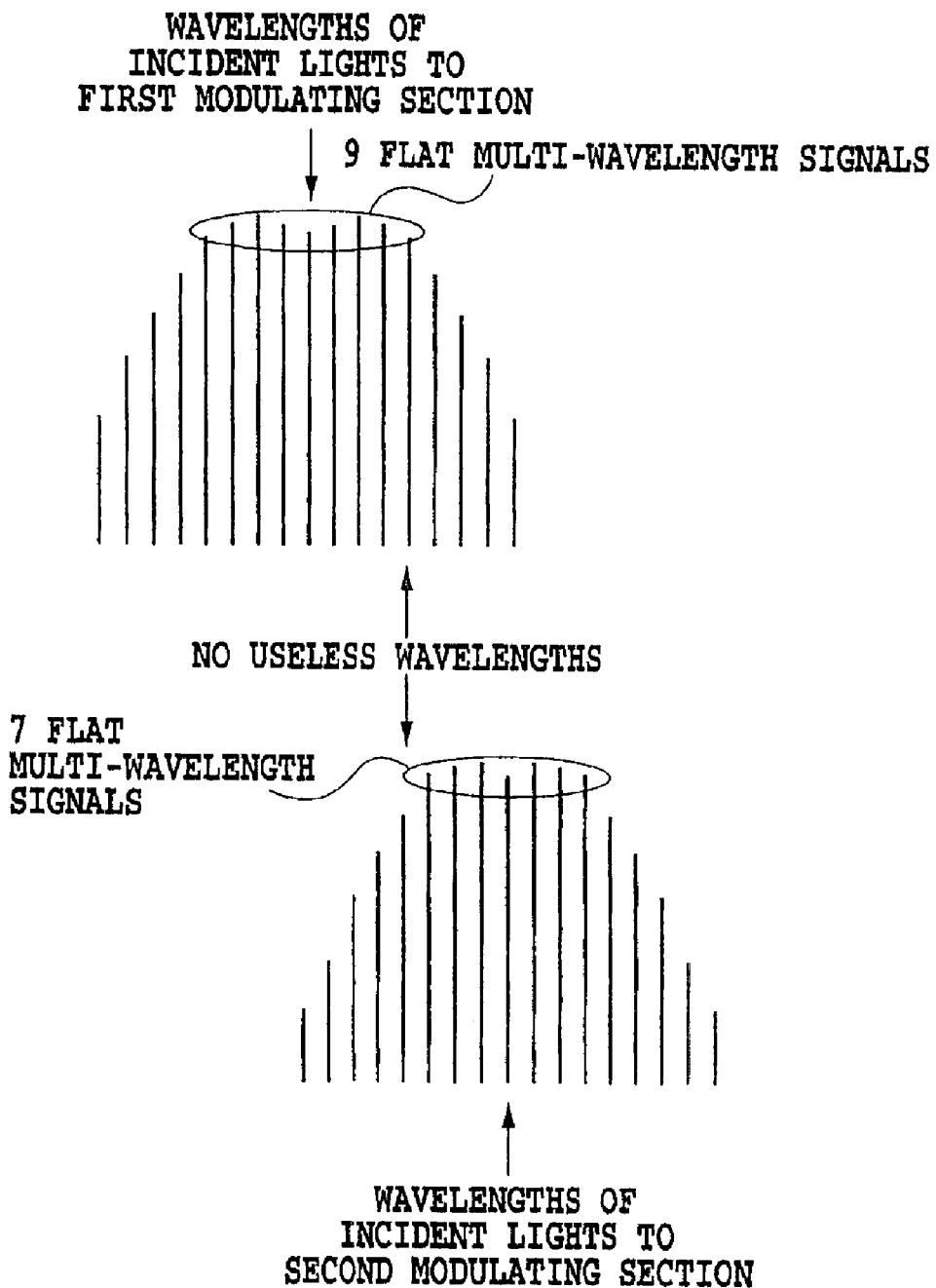

FIGS. 49A and 49B are schematic views useful in explaining an applied operation of the twelfth embodiment of the multi-wavelength generating apparatus according to the present invention.

In the configuration shown in FIG. 45, the modulating sections possessed by the multi-wavelength generating apparatus 1620 and 1630 are a first and a second modulating sections, respectively. The wavelengths of lights incident on the modulating sections are offset from each other by a distance eight times as large as the intervals of the output multi-wavelength light.

FIG. 49A is a schematic view showing the relationship between both incident wavelengths in a case in which the multi-wavelength generating apparatuses 1620 and 1630 generate flattened 9-channel multi-wavelength lights and allow them to fall on the first and second modulating sections. As is apparent from this figure, the rightmost wavelength to the first modulating section overlaps the leftmost wavelength to the second modulating section, thus resulting in the useless wavelengths.

Thus, in this applied example, the multi-wavelength generating apparatuses 1620 and 1630 are operated independently in such a manner that a flattened 9-channel multi-wavelength light is allowed to fall on the first modulating section, whereas a flattened 7-channel multi-wavelength light is allowed to fall on the second modulating section. This operation can be achieved by setting the voltages applied to the first and second modulating sections at different values. Specifically, by setting the voltage applied to the second modulating section at a lower value than the voltage applied to the first modulating section, the useless wavelengths can be eliminated, while reducing the signal voltage. Of course, similar effects are obtained by reversing the operations of the first and second modulating sections.

Next, several embodiments of another aspect of the present invention will be described.

(First Embodiment of the Coherent Multi-Wavelength Signal Generating Apparatus)

Figure 50:
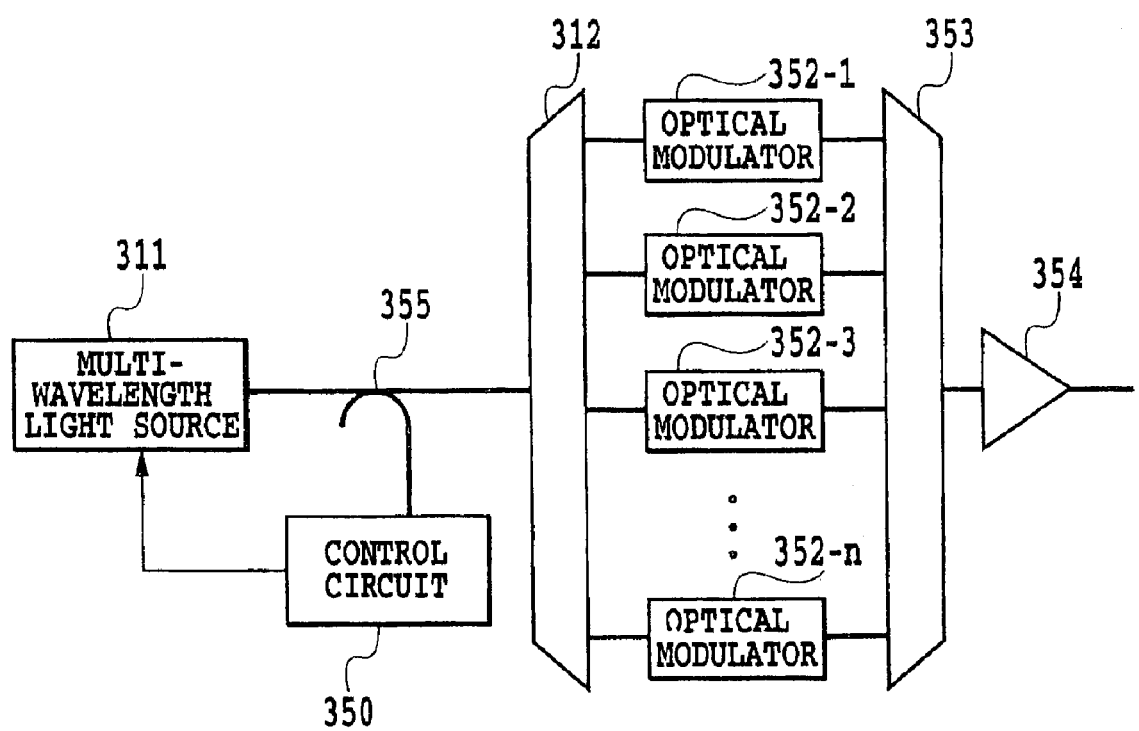
FIG. 50 is a view showing a first embodiment of a coherent multi-wavelength signal generating apparatus according to another aspect of the present invention.

FIG. 50 shows a first embodiment of a coherent multi-wavelength signal generating apparatus. In this figure, the coherent multi-wavelength signal generating apparatus is composed of a multi-wavelength light source 311 of the above embodiments, a demultiplexer 312 for slicing a spectrum of a multi-wavelength light into different wavelengths, optical modulators 352-1 to 352-n for modulating each spectrum-sliced light using a transmitted signal, a multiplexer 353 for multiplexing the modulated signal lights to output a coherent multi-wavelength signal, an optical amplifier 354, an optical coupler 355 for branching part of the multi-wavelength light output from the multi-wavelength light source 311, and a control circuit 350 for receiving the branched multi-wavelength light and controlling the shape of the optical spectrum from the multi-wavelength light source 311 so that the relative intensity noise RIN for the inputs to the optical modulators or the signal-to-noise ratio SNR for the outputs from the optical modulators has a design value.

(Second Embodiment of the Coherent Multi-Wavelength Signal Generating Apparatus)

Figure 51:
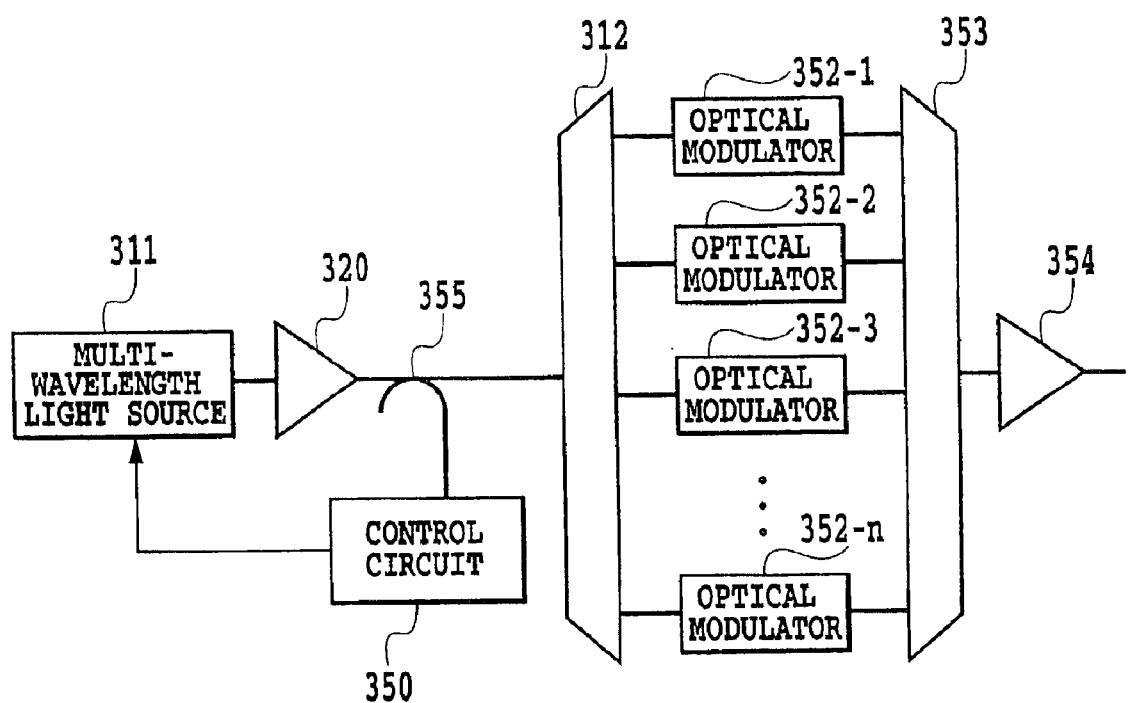
FIG. 51 is a view showing a second embodiment of the coherent multi-wavelength signal generating apparatus according to the aspect of the present invention shown in FIG. 50.

FIG. 51 shows the second embodiment of the coherent multi-wavelength signal generating apparatus. The coherent multi-wavelength signal generating apparatus of this embodiment includes an optical amplifier 320 for amplifying a multi-wavelength light which amplifier is arranged between the multi-wavelength light source 311 and demultiplexer 312 of the configuration of the first embodiment so that part of the amplified multi-wavelength light is guided to the control circuit 350.

Figure 52:
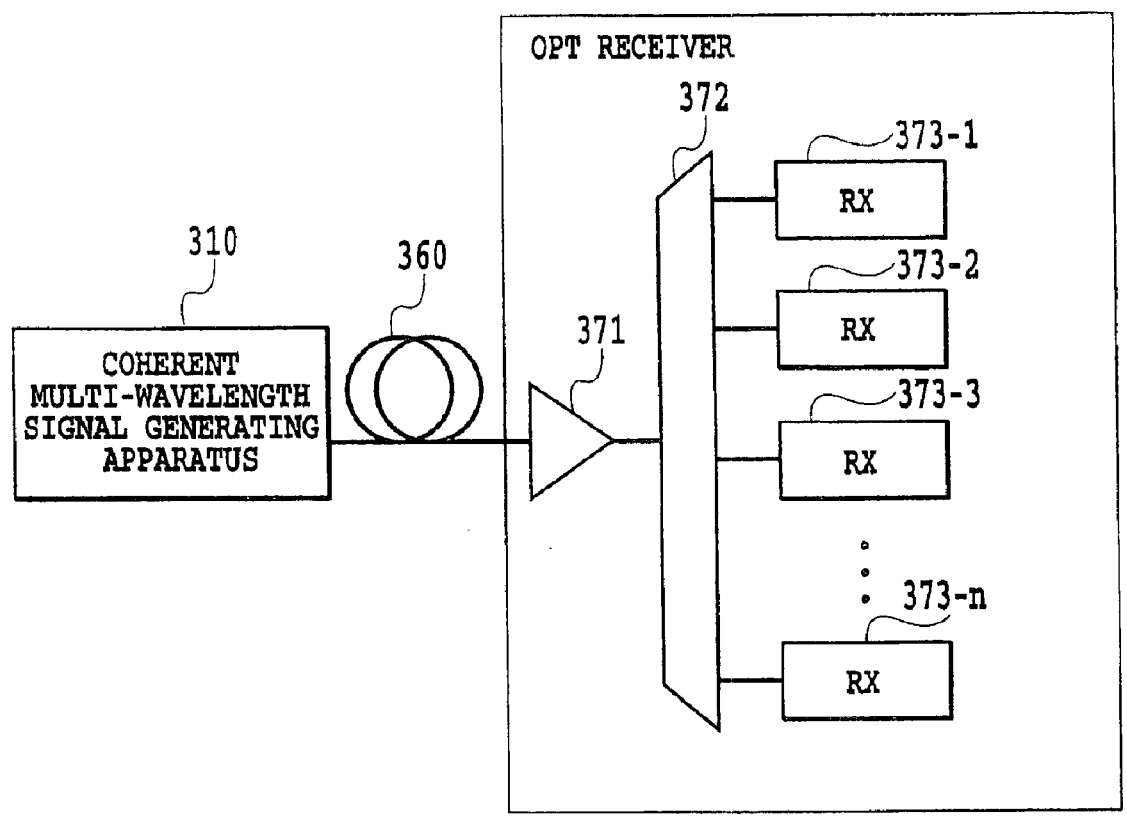
FIG. 52 is a view showing an example of the configuration of a WDM transmission system using the coherent multi-wavelength signal generating apparatus according to the aspect of the present invention shown in FIG. 50.

FIG. 52 is an example of the configuration of a WDM transmission system using the coherent multi-wavelength signal generating apparatus of the present invention. In FIG. 52, an optical receiving section 370 connected to a coherent multi-wavelength signal generating apparatus 10 via an optical amplifier 371 for amplifying a transmitted WDM (Wavelength Division Multiplexing) signal light, a demultiplexer 372 for demultiplexing the WDM signal light into signal lights of different wavelengths, and receivers 373-1 to 373-n for receiving the corresponding signals lights of the different wavelengths.

Figure 53:
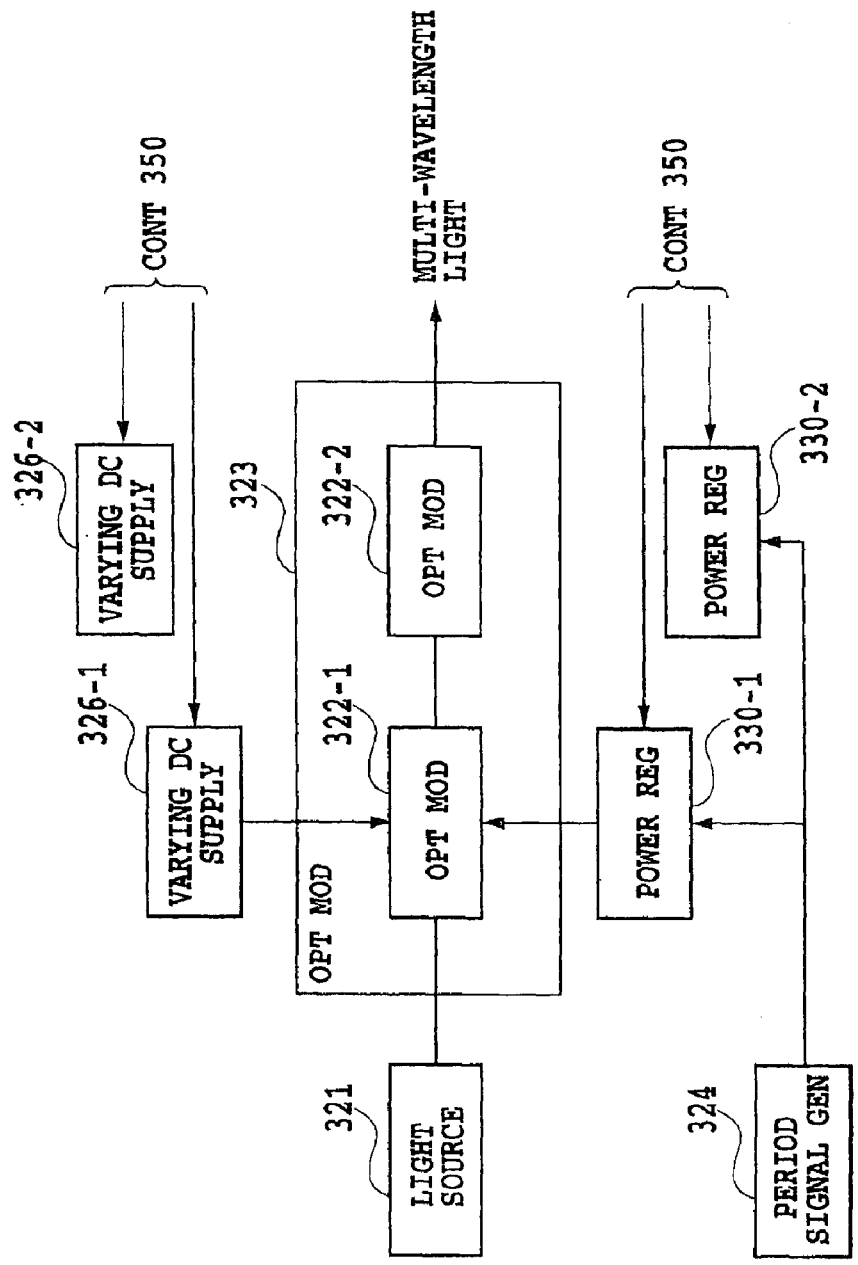
FIG. 53 is a view showing an example of a first configuration of a multi-wavelength light source.

FIG. 53 is an example of a first configuration of a multi-wavelength light source 311. In this figure, the multi-wavelength light source 311 is composed of a light source 321 for generating a light of a single central wavelength, an optical modulating section 323 having a plurality of optical modulators 322-1 and 322-2 for modulating the amplitude or phase of the optical light from the light source 321, a period signal generator 324 for generating predetermined period signals, power regulators 330-1 to 330-2 for regulating period signal voltages to predetermined values and applying the obtained voltages to the optical modulator 322-1 to 322-2, and power-varying DC power supplies 326-1 to 326-2 for applying a power-regulated bias voltage to each of the optical modulators 322-1 to 322-2. The optical modulating section 323 may be configured to perform an amplitude modulating operation as a whole by, for example, modulating the phase using a path branched using a Mach-Zehnder intensity modulator.

Figure 54:
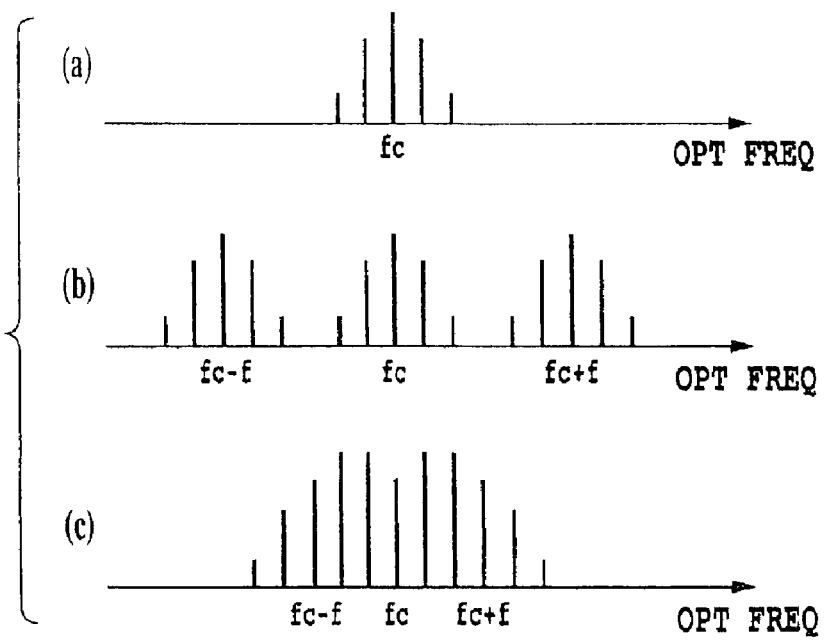
FIGS. 54(a)–54(c) are views useful in explaining the principle of generation of a multi-wavelength light from the multi-wavelength light source.

FIG. 54 is a view useful in explaining the principle of generation of a multi-wavelength light. The optical modulator 322-1 of the optical modulating section 323 modulates the amplitude or phase of the temporal waveform of an output light (CW light) from the light source 311 to apply a fixed correlationship to the phases of the modes of a discrete optical spectrum of the output light (a). Furthermore, the optical modulator 322-2 modulates the amplitude or phase of the modulated wave to shift the discrete optical spectrum to an upper and lower sidebands on the frequency axis (b). In this case, power level deviations among the modes can be controlled to a fixed value by regulating the frequency shift amount to cause the discrete optical spectrum to overlap the upper and lower sidebands.

Figure 55:
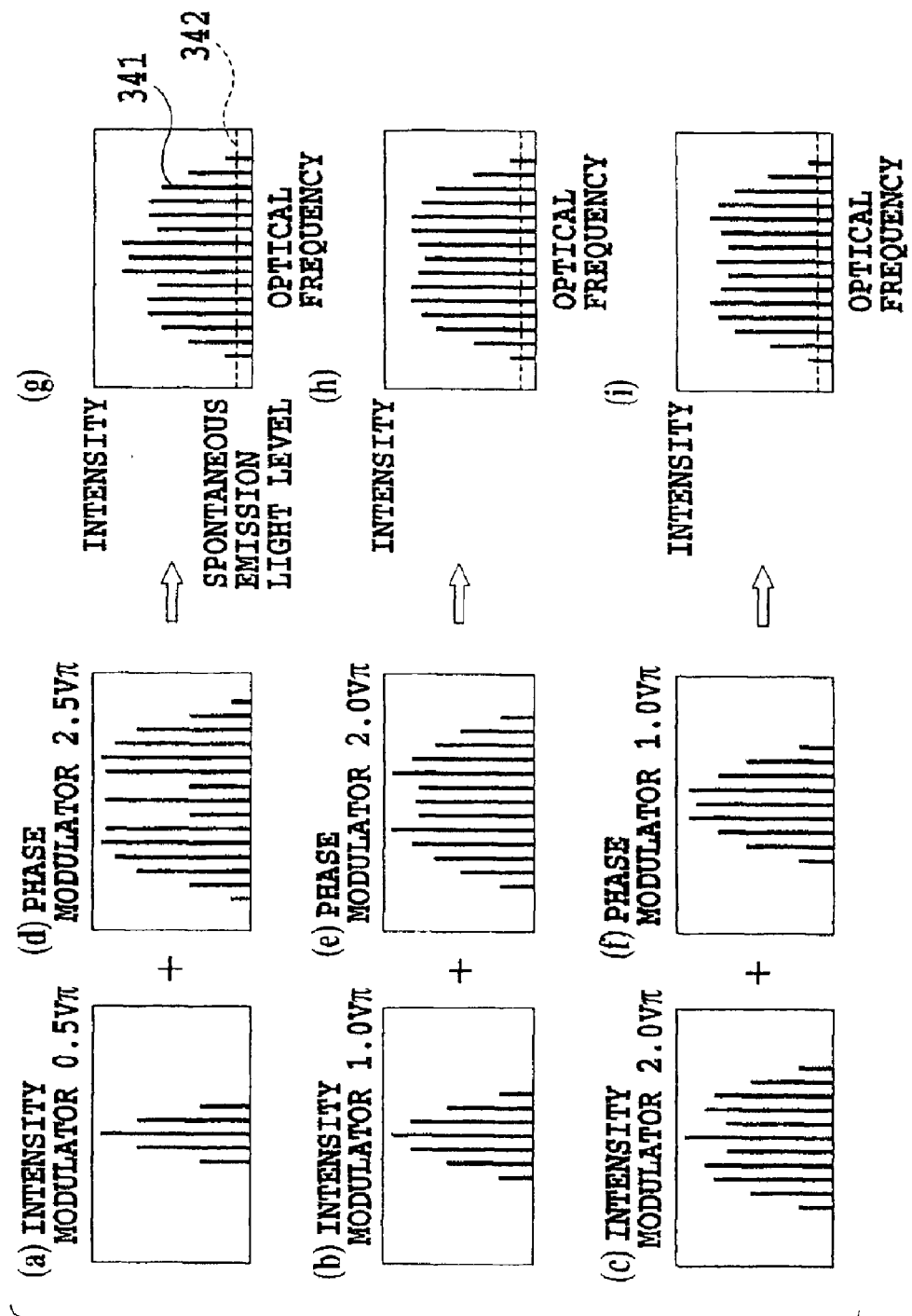
FIGS. 55(a)–55(i) are views showing an example of a manner of controlling the shape of an optical spectrum using an intensity modulator and a phase modulator as an optical modulating section.

FIG. 55 shows an example of the shape of an optical spectrum obtained if the optical modulating section 323 comprises an intensity modulator and a phase modulator. Reference numerals (a), (b), and (c) in FIG. 55 show examples of spectra obtained by varying the voltage (Vπvoltage) applied to the Mach-Zehnder intensity modulator, reference numerals (d), (e), and (f) in FIG. 55 examples of spectra obtained by varying the voltage (normalized by Vπ voltage) applied to the phase modulator, and reference numerals (g), (h), and (i) in FIG. 55 show examples of spectra of multi-wavelength lights obtained when both modulators are combined together for each applied voltage. The optical spectra of the multi-wavelength lights each have a plurality of carriers 341 as a coherent light and a spontaneous emission light 342 extending over a wide band.

Figure 56:
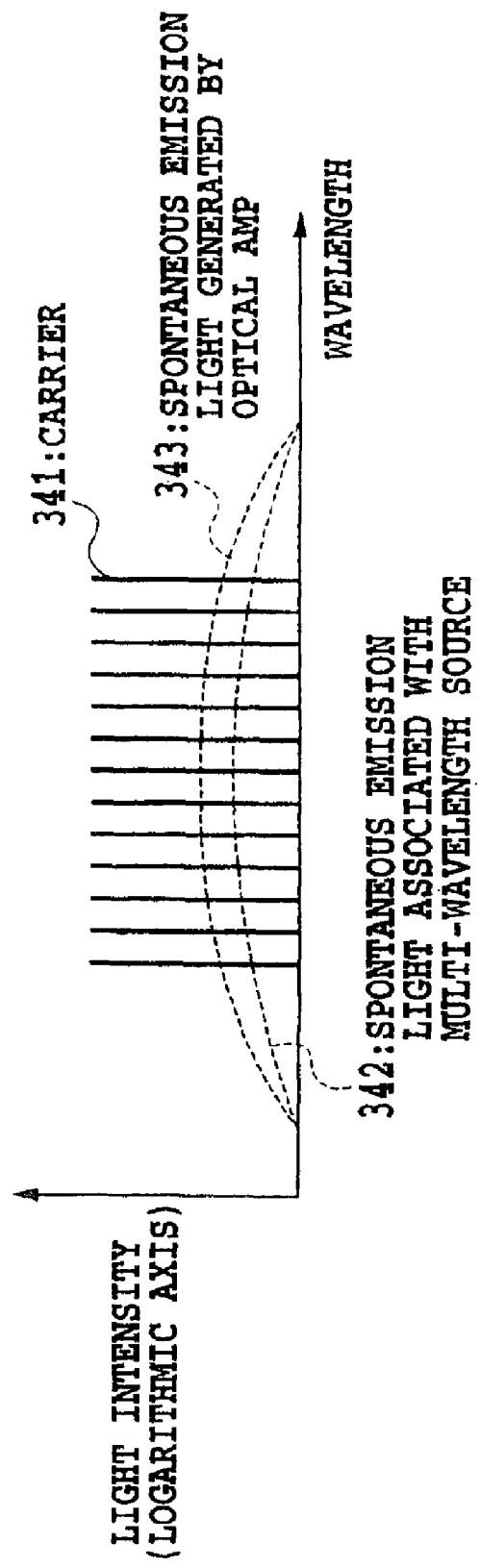
FIG. 56 is a view showing an optical spectrum of a multi-wavelength light amplified by an optical amplifier.

FIG. 56 is a schematic view of an optical spectrum of a multi-wavelength light amplified by the optical amplifier. The optical spectrum of the multi-wavelength light has the plurality of carriers 341 as a coherent light, the spontaneous emission light 342 extending over a wide band, and a spontaneous emission light (amplified spontaneous emission light: ASE) generated by the optical amplifier.

Control parameters for varying the shape of the optical spectrum include the modulation index (period signal voltages) for the intensity and phase modulators and the bias voltage for the intensity modulator. That is, control can be provided so as to obtain a predetermined optical spectrum by inputting control signals to the power regulators 330-1 to 330-2 and the power-varying DC power supplies 326-1 to 326-2 to thereby regulate the period signal voltage and the bias voltage.

Figure 57:
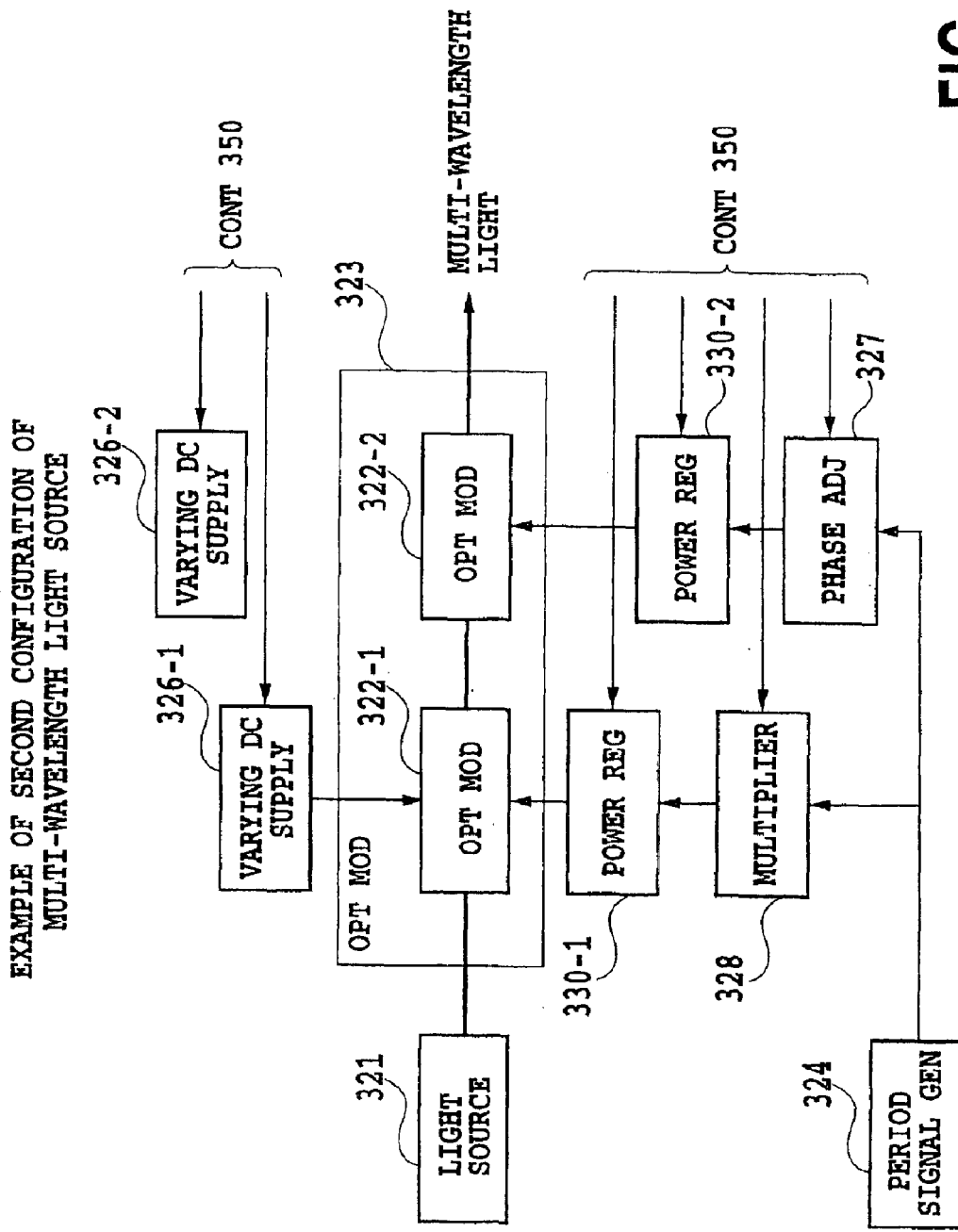
FIG. 57 is a view showing an example of a second configuration of the multi-wavelength light source.

FIG. 57 shows an example of a second configuration of the multi-wavelength light source 311. In this configuration, a phase modulator 327 and a multiplier 328 are arranged before the power regulators 330-1 to 330-2 of the example of the first configuration. Control can be provided so as to obtain a predetermined optical spectrum by causing the semi-phase modulator 327 to regulate a phase difference between the period signals applied to the optical modulators 322-1 and 322-2 and causing the multiplier 328 to control the multiplier factors for the frequencies of the period signals.

Figure 58:
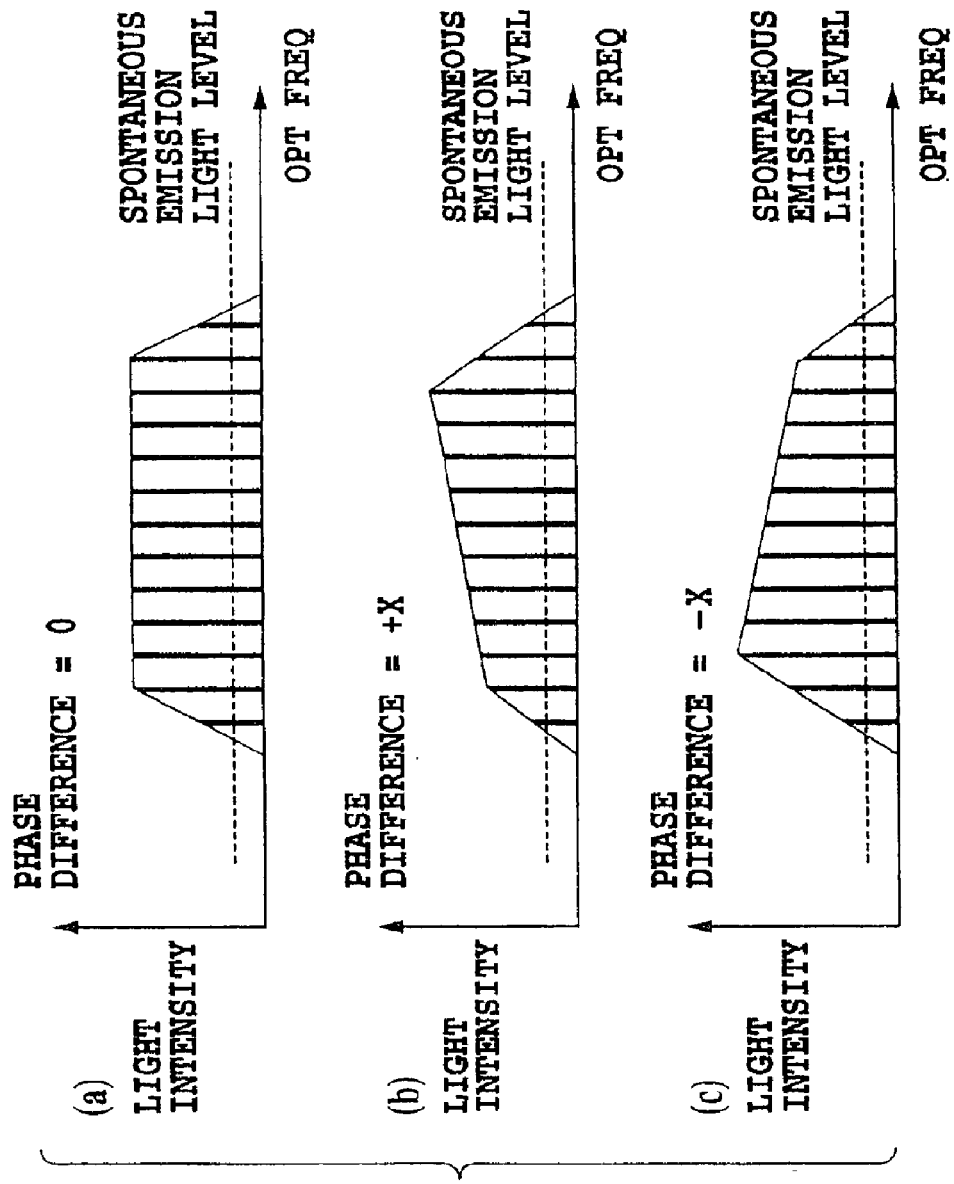
FIGS. 58(a)–58(c) are views showing an example of a manner of controlling the shape of an optical spectrum by regulating the phase of a period signal.

FIG. 58 is an example showing how the shape of an optical spectrum is controlled by regulating the phase of the period signal. Reference numerals (a), (b), and (c) in FIG. 58 show the shapes of optical spectra obtained if the phase difference is set at 0, +X, and −X.

Figure 59:
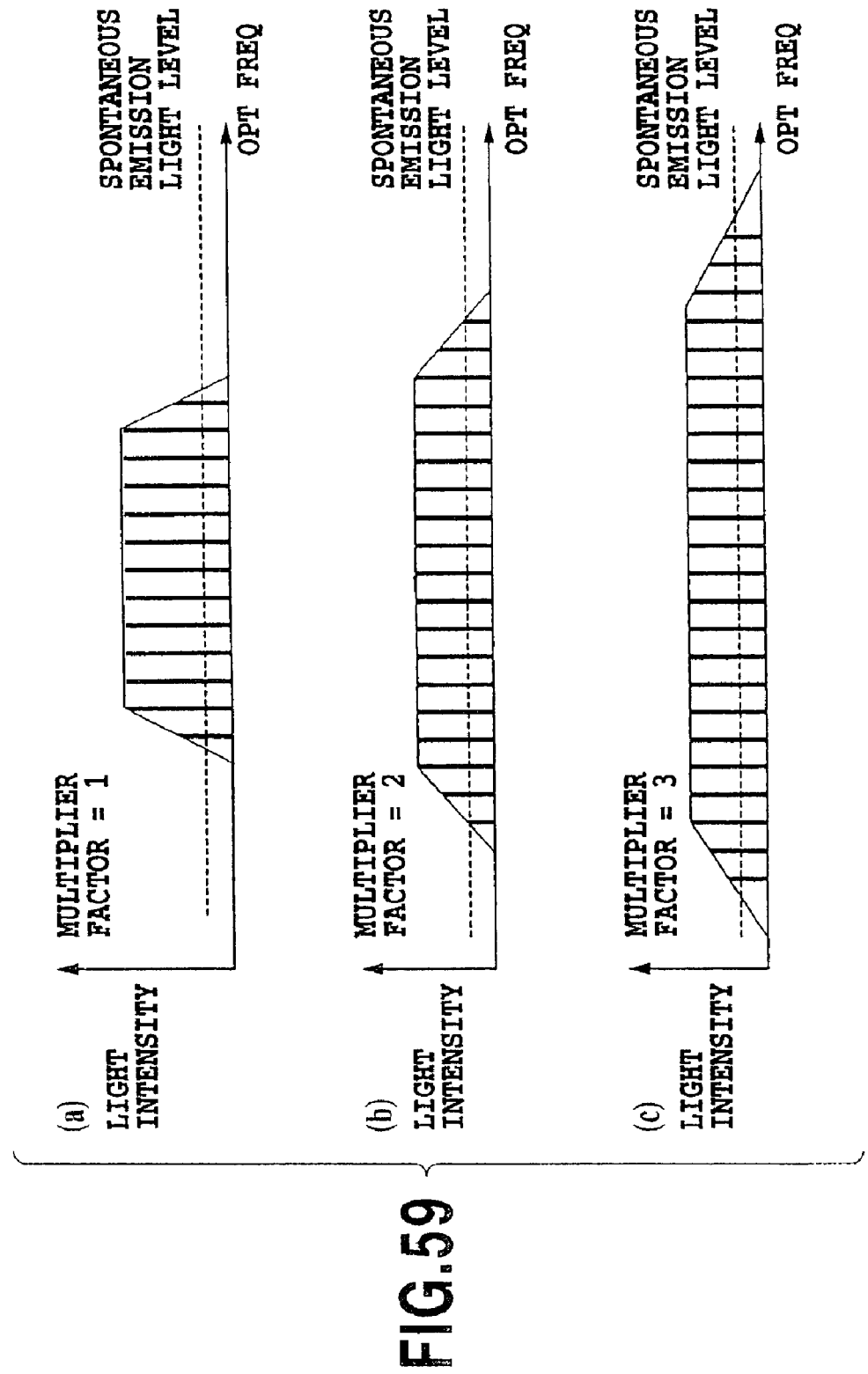
FIGS. 59(a)–59(c) are views showing an example of a manner of controlling the shape of the optical spectrum by multiplying the frequency of the period signal.

FIG. 59 is an example showing how the shape of an optical spectrum is controlled by multiplying the frequency of the period signal. Reference numerals (a), (b), and (c) in FIG. 59 show the shapes of optical spectra obtained if the multiplier factor is set at 1, 2, and 3.

Figure 60:
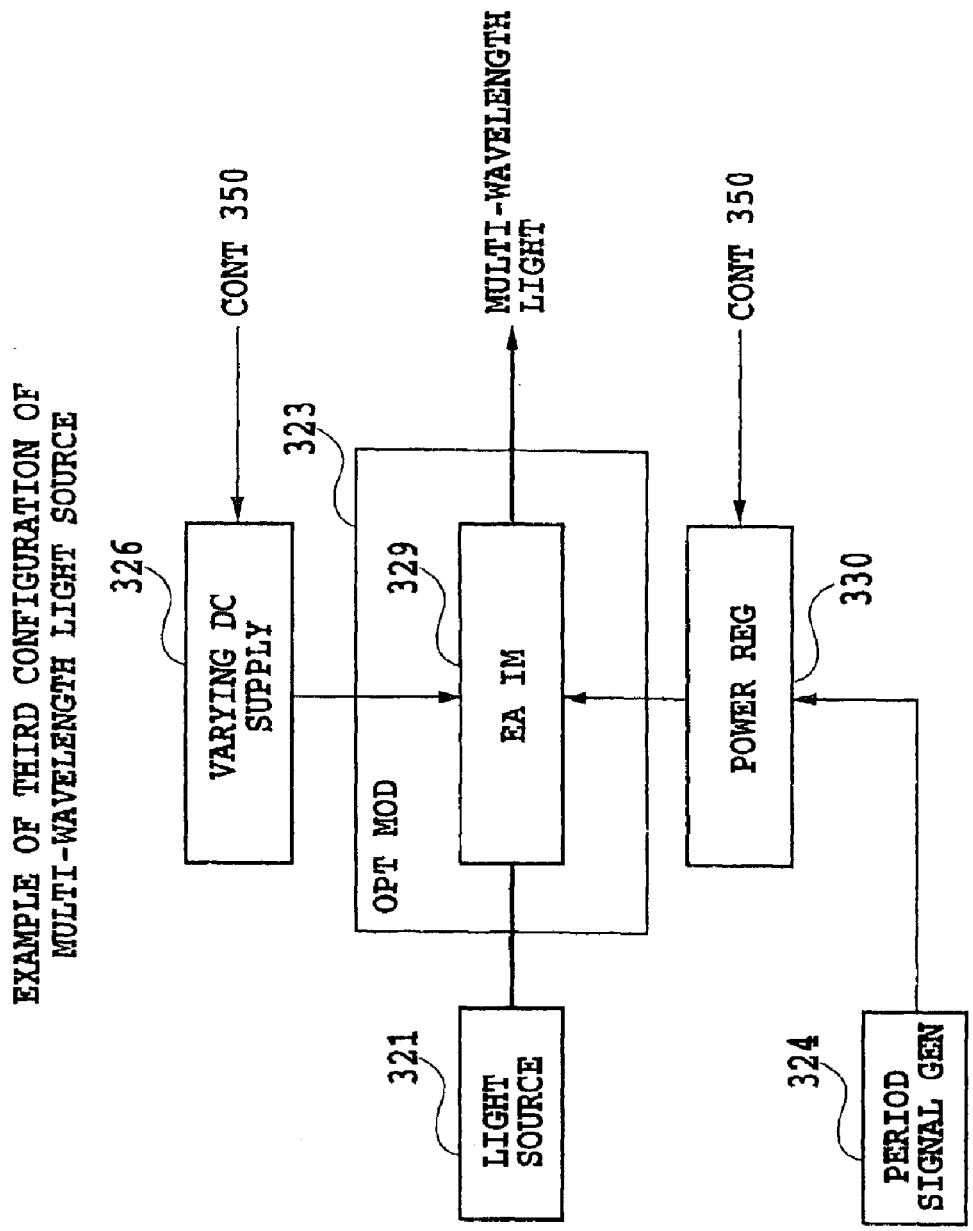
FIG. 60 is a view showing an example of a third configuration of the multi-wavelength light source.

FIG. 60 shows an example of a third configuration of the multi-wavelength light source 311. In this configuration, an electro-absorption intensity modulator 329 is used as the optical modulating section 323 of the example of the first configuration. The shape of an optical spectrum can be varied by utilizing the exponential characteristic of an absorption factor (transmission factor) for the voltage applied to the electro-absorption intensity modulator to provide the period signal voltage with a rectangular output light intensity and by varying the bias point to vary the duty ratio.

Figure 61:
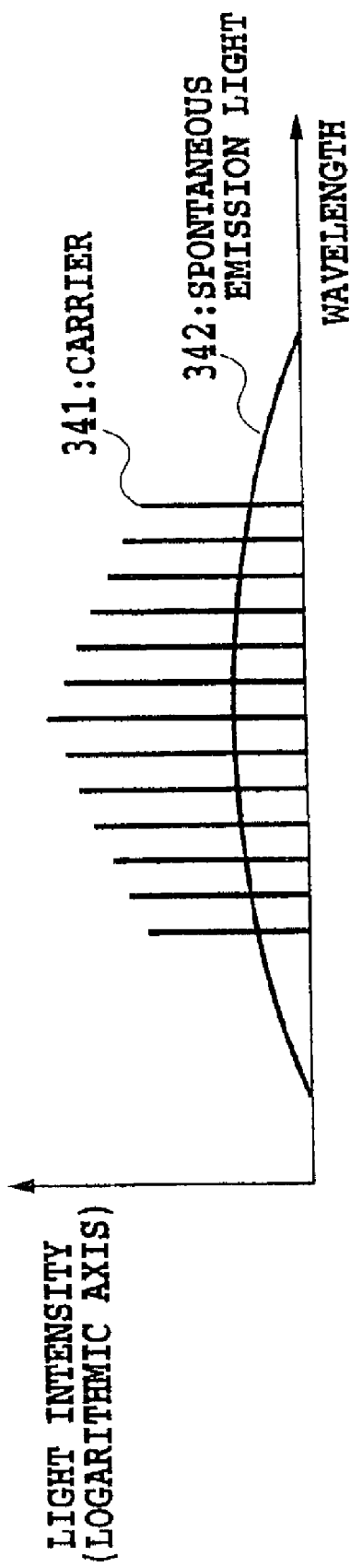
FIG. 61 is a view showing an optical spectrum of a multi-wavelength light obtained using an electro-absorption intensity modulator.

FIG. 61 is a schematic view of an optical spectrum of a multi-wavelength light obtained if the electro-absorption intensity modulator is used. The optical spectrum of the multi-wavelength light has the plurality of carriers 341 as a coherent light and the spontaneous emission light 342 extending over a wide band.

Figure 62:
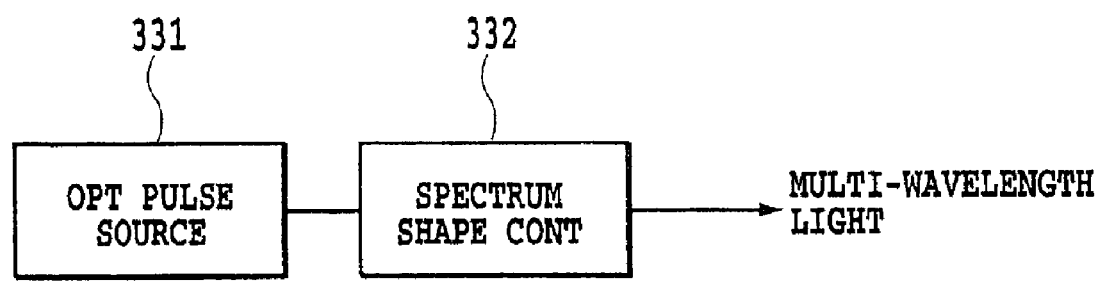
FIG. 62 is a view showing an example of a fourth configuration of the multi-wavelength light source.
Figure 63A:
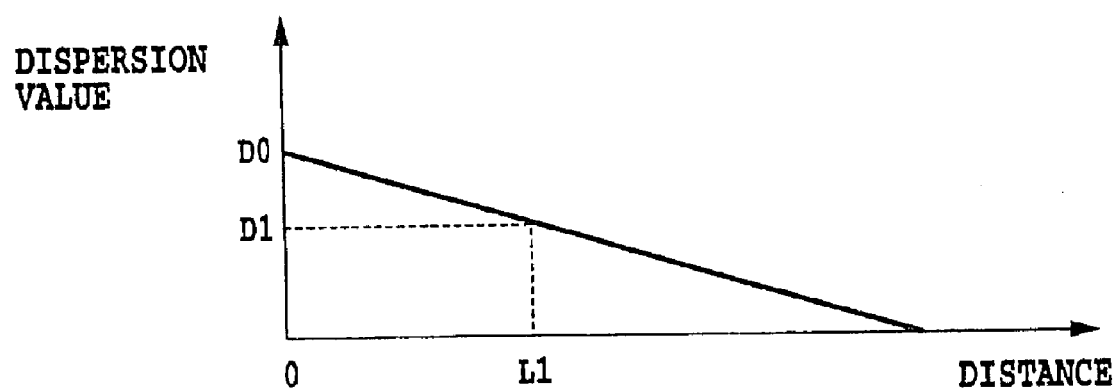
FIGS. 63A and 63B are views useful in explaining the principle of adiabatic compression using a dispersion reducing fiber.
Figure 63B:
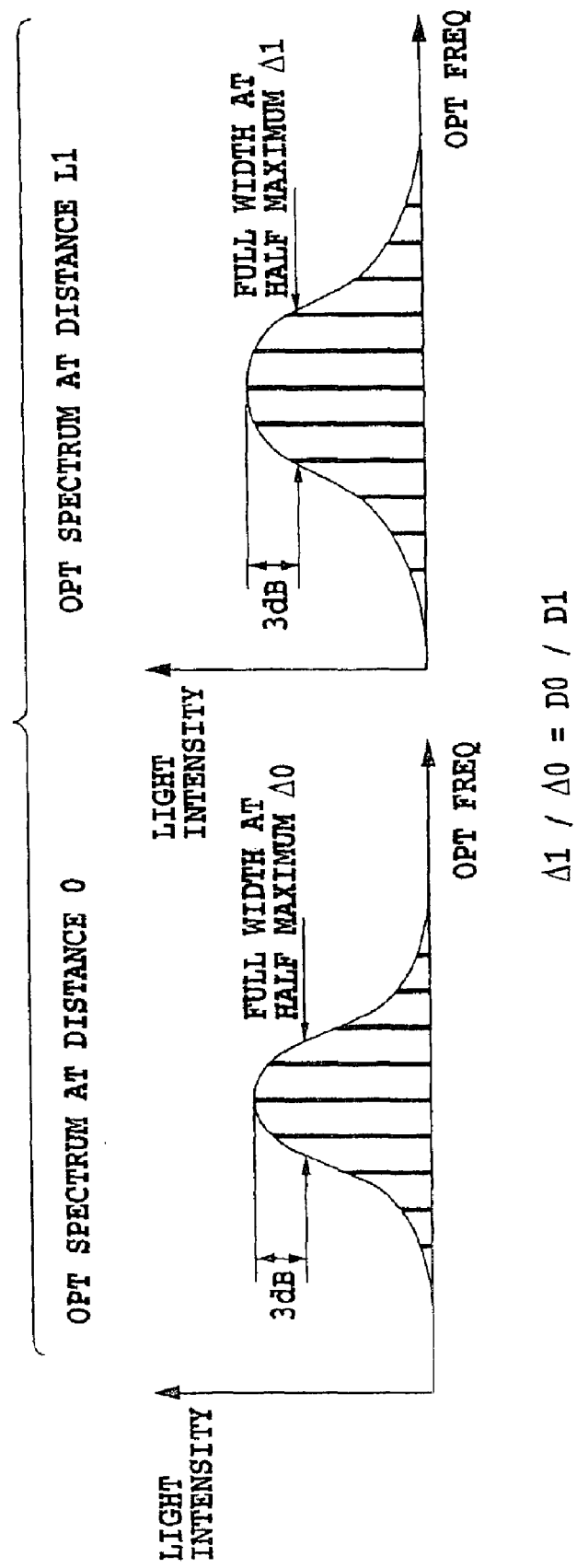

FIG. 62 shows an example of a fourth configuration of the multi-wavelength light source. In this figure, the multi-wavelength light source 311 is composed of a pulsed light source 331 and spectrum shape control means 332 for controlling the shape of a spectrum of an output pulsed light from the pulsed light source 331. The spectrum shape control means 332 controls the shape of a spectrum (relating to the pulse width and the amount of chirp) in the frequency area of pulsed light to a predetermined one by means of pulse compression such as adiabatic compression using a dispersion reducing fiber. In this case, the control parameter is a compression rate determined by a dispersion value $D_0$ at the input side of the dispersion reducing fiber and a dispersion value $D_1$ at the output side thereof as shown in FIGS. 63A to 63B.

Figure 64:
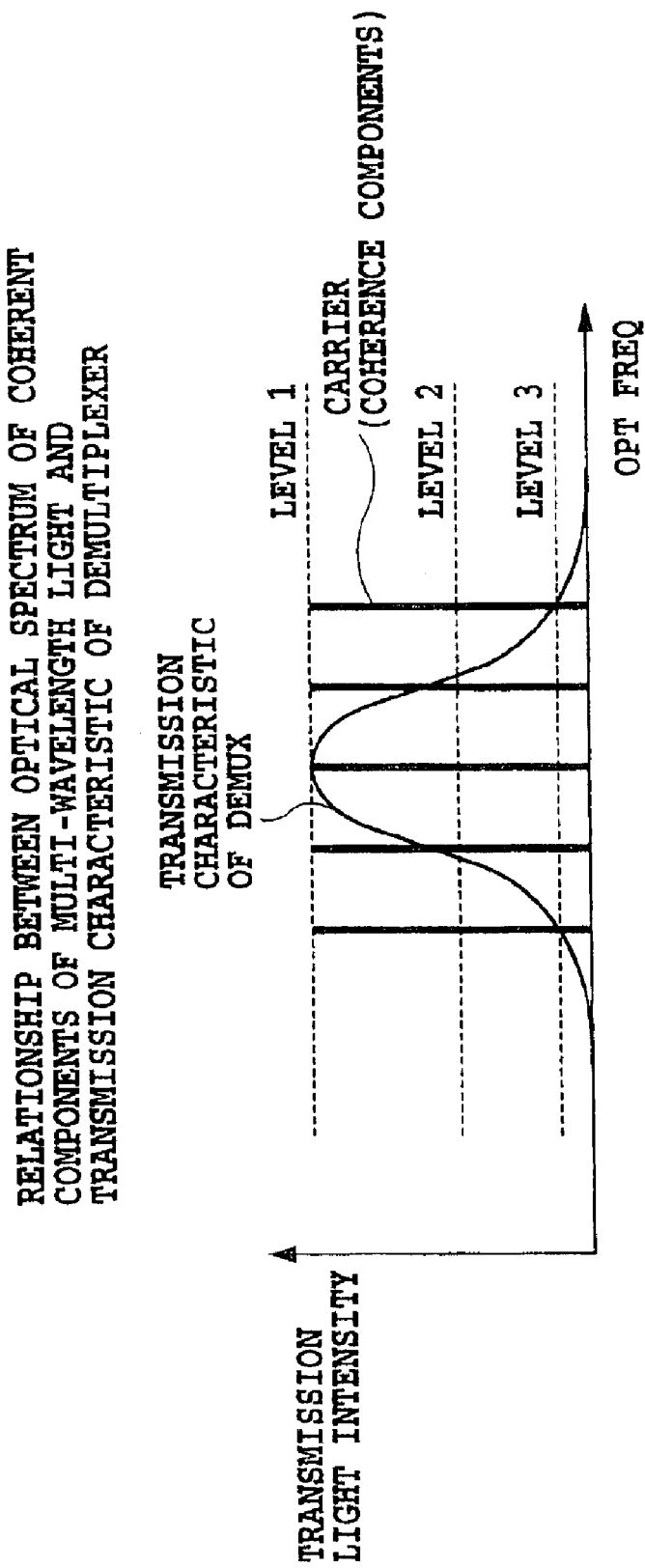
FIG. 64 is a view useful in explaining an optical spectrum of coherent components of a multi-wavelength light vs. the transmission characteristic of a demultiplexer.

FIG. 64 shows the relationship between an optical spectrum of coherent components of a multi-wavelength light. In this figure, a level 1 corresponds to the coherent components of the multi-wavelength light, and the double of the level 2 or 3 corresponds to the noise of a beat frequency equal to the wavelength channel spacing. Accordingly, if the transmission band width for the demultiplexer 312 is sufficiently reduced compared to the wavelength channel spacing of the multi-wavelength light, then when a desired wavelength component is cut out, leakage from the adjacent channels can be restrained. This enables a CW light to be output even if the multi-wavelength light is pulsed.

A description will be given of design for meeting a performance specification required of a conventional optical transmitting section using semiconductor lasers and which is used in a structure for controlling the shape of an optical spectrum of a multi-wavelength light.

(Example of Design of the Relative Intensity Noise RIN(i) for Inputs to the Modulator)

Figure 65:
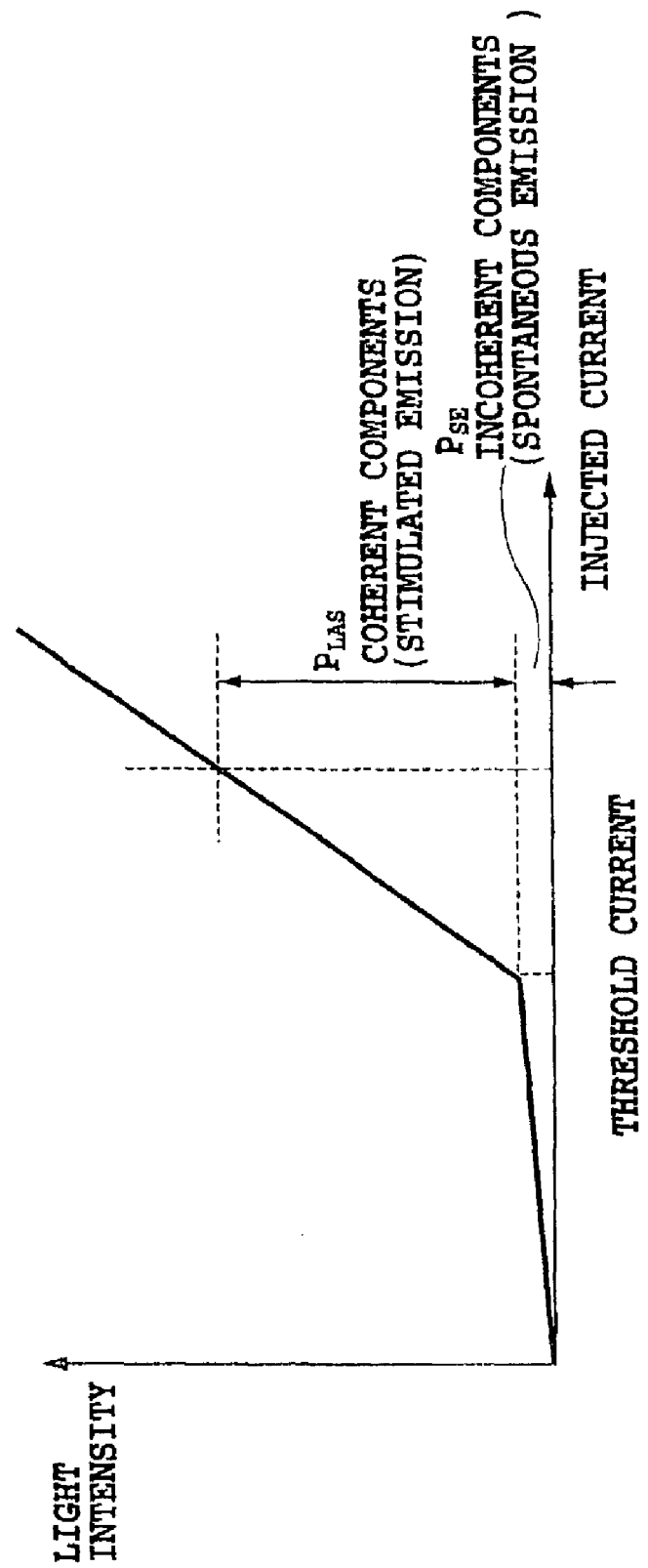
FIG. 65 is a view useful in explaining a stimulated emission light from a semiconductor laser vs. a spontaneous emission light.

FIG. 65 shows the relationship between a stimulated emission light and a spontaneous emission light from semiconductor lasers. Below a threshold, the semiconductor laser has its optical output intensity varying slowly with an increase in injected current (excitation light intensity if solid lasers are used), and at the threshold, it enters a stimulated emission state to rapidly increase the optical output. The spontaneous emission light is incoherent and is given as an optical output intensity $P_{SE}$ and the stimulated emission light is coherent and is given as an optical output intensity $P_{LAS}$ depending on the injected current.

In this case, the stimulated emission probability ratio γ is defined by the following equation:

$$\gamma = 10\log_{10}(P_{LAS}/P_{SE}) \qquad (23)$$

On the other hand, when the spontaneous output band is defined as $BW_{SR}$[Hz], the relative intensity noise prior to spectrum slicing by the multiplexer is defined as RIN[dB/Hz], and the light intensity of the i-th wavelength component obtained by the spectrum slicing by the multiplexer is defined as Pi, the relative intensity noise RIN(i) is expressed by the following equation:

$$RIN(i) = RIN + 10\text{Log}_{10}(Pi/\Sigma Pi)$$
$$RIN = -\gamma - 10\log_{10}BW_{SE} + 3 \qquad (24)$$

The control circuit 350 in FIG. 50 calculates the relative intensity noise RIN(i) of the i-th wavelength component by measuring the relative intensity noise RIN of a multi-wavelength light and estimating the intensity Pi of the i-th output light obtained by the spectrum slicing executed by the demultiplexer 312. Then, the power modulating section 330, power-varying DC power supply 326, phase regulator 327, multiplier 328, and others of the multi-wavelength light source 311 are controlled so as to set the relative intensity noise RIN(i) of each wavelength component at a design value.

Further, the intensity Pi of the i-th output light, measured using the input power monitoring function of the optical modulators 352-1 to 352-n, may be input to the control circuit 350. Moreover, the control circuit 350 may directly measure the relative intensity noise RIN(i) of each wavelength component obtained by the spectrum slicing executed by the demultiplexer.

Further, the multi-wavelength light amplified by the optical amplifier 320 is input to the control circuit 350 in FIG. 51. This multi-wavelength light has the spontaneous emission light (amplified spontaneous emission light: ASE) generated by the optical amplifier 320, as shown in FIG. 56.

If the gain of the optical amplifier 320 is defined as g, the optical amplified area is defined as $BW_{AMP}$[Hz], the total number of lateral modes is defined as m, the population inversion parameter is defined as $n_{sp}$, and the central optical frequency of the multi-wavelength light source 311 is defined as $\upsilon$[Hz], then the ratio $\gamma$ of the probability of stimulated emission to that of spontaneous emission is expressed by the following equation:

$$\gamma = 10\log_{10}[gP_{LAS}/\{gP_{SE}(BW_{SE}/BW_{AMP}) + h\nu(g-1)nsp \cdot m \cdot BW_{AMP}\}] \quad (25)$$

(Example 1 of Design of the Signal-to-Noise Ratio SNR for Outputs from the Modulator)

In the coherent multi-wavelength signal generating apparatus shown in FIG. 50 or 51, the band of a receiver 373 of the WDM transmission system shown in FIG. 52 is defined as Be[Hz], the demultiplexing band of the demultiplexer 372 is defined as $B_0$[Hz], the signal mark rate is defined as M, the signal light intensity of an output from the i-th modulator is defined as P(i)[dBm], the intensity of the stimulated emission light in the output from this modulator is defined as Pc(i)[dBm], the intensity of the spontaneous emission light in the output from this modulator is defined as Ps(i)[dBm], an equivalent current flowing through the receiver is defined as Ieq[A], shot noise in the signal components is defined as Ns, the beat noise between the signal components and the spontaneous emission light is defined as Ns-sp, the beat noise between spontaneous emission light is defined as Nsp-sp, and thermal noise from the receiver is defined as $N_{th}$. Then, the signal-to-noise ratio SNR for outputs from the modulators is expressed as follows:

$$SNR = S/(Ns + Ns\text{-}sp + Nsp\text{-}sp + N_{th})$$

$$Ps(i) = RIN(i) + 10\log_{10}Be + Pc(i) + 10\log_{10}M$$

$$S = ((e\eta/h\nu)Pc(i))^2$$

$$Ns = 2e((e\eta/h\nu)P(i))Be$$

$$Ns\text{-}sp = 4(e\eta/h\nu)^2 Pc(i)Ps(i)Be/Bo$$

$$N_{th} = Ieq^2 Be \quad (26)$$

In this case, P(i), Pc(i), and Ps(i) in S, Ns, and Ns-sp are expressed in W using the linear notation.

The control circuit 350 of the coherent multi-wavelength signal generating apparatus controls the power modulating section 330, power-varying DC power supply 326, phase regulator 327, multiplier 328, and others of the multi-wavelength light source 311 so as to make the signal-to-noise ratio (SNR) for outputs from the modulators follow the above equations.

(Example 2 of Design of the Signal-to-Noise Ratio SNR for Outputs from the Modulator)

In the coherent multi-wavelength signal generating apparatus shown in FIG. 50 or 51, the band of a receiver 373 of the WDM transmission system shown in FIG. 52 is defined as Be[Hz], the demultiplexing band of the demultiplexer 372 is defined as $B_0$[Hz], the signal mark rate is defined as M, the signal light intensity of an output from the i-th modulator is defined as P(i)[dBm], the intensity of the stimulated emission light in the output from this modulator is defined as Pc(i)[dBm], the intensity of the spontaneous emission light in the output from this modulator is defined as Ps(i)[dBm], an equivalent current flowing through the receiver is defined as Ieq[A], the rate of leakage from the j-th port to the i-th port of the multiplexer is defined as XT(j), the light intensity of a cross talk signal from the multiplexer is defined as Px(i)[dBm], shot noise in the signal components is defined as Ns, the beat noise between the signal components and the spontaneous emission light is defined as Ns-sp, the beat noise between the signal components and the cross talk signal light is defined as Ns-x, the beat noise between spontaneous emission lights is defined as Nsp-sp, the beat noise between the cross talk signal light and the spontaneous emission light is defined as Nx-sp, and thermal noise from the receiver is defined as $N_{th}$. Then, the signal-to-noise ratio SNR for outputs from the modulators is expressed as follows:

$$SNR = S/(Ns + Ns\text{-}sp + Nx\text{-}sp + Nsp\text{-}sp + Ns\text{-}x + N_{th})$$

$$Ps(i) = RIN(i) + 10\log_{10}Be + Pc(i) + 10\log_{10}M$$

$$Px(i) = \Sigma P(j) \cdot XT(j)$$

$$S = ((e\eta/h\nu)Pc(i))^2$$

$$Ns = 2e((e\eta/h\nu)P(i))Be$$

$$Ns\text{-}sp = 4(e\eta/h\nu)^2 Pc(i)Ps(i)Be/Bo$$

$$Nx\text{-}sp = 4(e\eta/h\nu)^2 Px(i)Ps(i)Be/Bo$$

$$Ns\text{-}x = 4(e\eta/h\nu)^2 Pc(i)Px(i)$$

$$N_{th} = Ieq^2 Be \quad (27)$$

In this case, P(i), Pc(i), and Ps(i) in S, Ns, Ns-sp and Ns-x are expressed in Ws using the linear notation.

The control circuit 350 of the coherent multi-wavelength signal generating apparatus controls the power modulating section 330, power-varying DC power supply 326, phase regulator 327, multiplier 328, and others of the multi-wavelength light source 311 so as to make the signal-to-noise ratio (SNR) for outputs from the modulators follow the above equations.

As described above, the coherent multi-wavelength signal generating apparatus of the present invention is configured to regulate the voltages or bias voltages of the period signals applied to the optical modulators constituting the multi-wavelength light source in order to control the shape of an optical spectrum of a generated multi-wavelength light. This makes it possible to quantitatively design the relative intensity noise RIN for inputs to the optical modulators or the signal-to-noise ratio SNR for outputs from the optical modulators, the optical modulators modulating coherent lights of different wavelengths obtained by slicing the spectrum of the multi-wavelength light.

This also applies to the configuration for controlling the shape of an optical spectrum of a multi-wavelength light generated by controlling the phases of the period signals applied to the optical modulators constituting the multi-wavelength light source or the multiplier factors for the frequencies of the period signals.

Consequently, a coherent multi-wavelength signal generating apparatus can be designed which can meet the performance specification required of the conventional optical transmitting section using semiconductor lasers.

Next, several embodiments of yet another aspect of the present invention will be described.

[First Embodiment of the Multi-wavelength Light Source]

Figure 66:
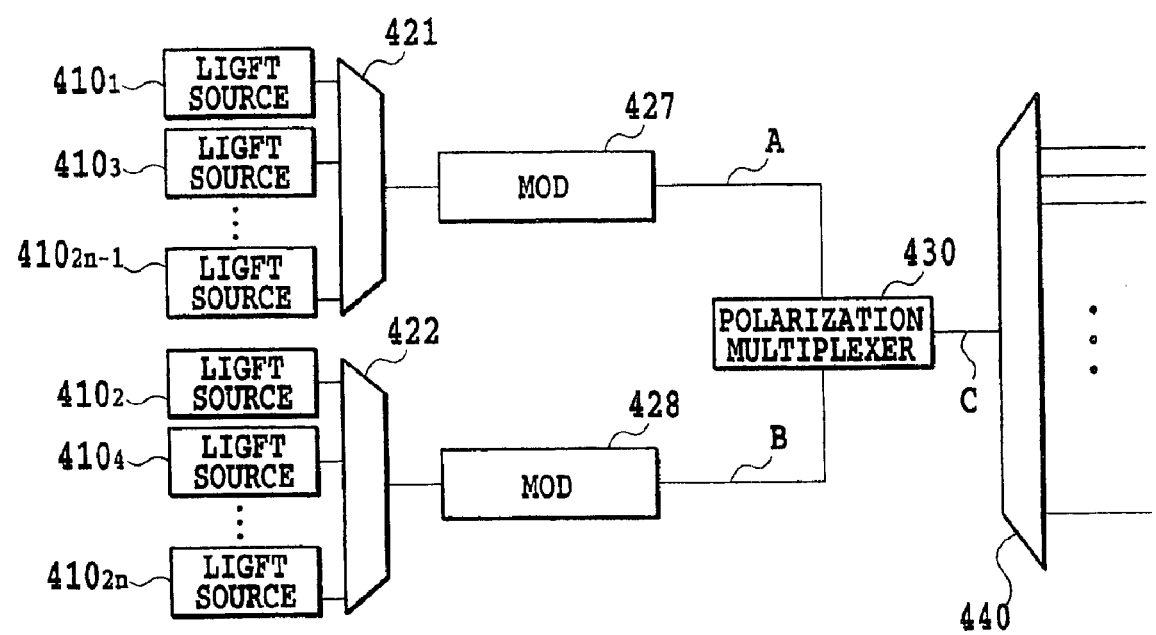
FIG. 66 is a view showing the configuration of a first embodiment of a multi-wavelength light source according to yet another aspect of the present invention.

FIG. 66 is a view showing the configuration of a first embodiment of a multi-wavelength light source according to the present invention.

In the multi-wavelength light source according to the present invention, input lights from 2n (n is a natural number of 1 or more) light sources $401_1$ to $410_{2n}$ are divided into two lines, which are then multiplexed and modulated. The results of the modulations are combined with orthogonal polarization and then separated into a plurality of carriers of different wavelengths to obtain the final output. The configuration and operation of this embodiment will be described below in detail.

In FIG. 66, the light sources 410, 4102, 4103, ... 4102n-1, and 4102n comprise, for example, distributed feedback (DFB) semiconductor lasers or external-cavity-type semiconductor lasers. The light sources emit lights of different single central wavelengths arranged on the frequency axis at equal intervals in the order of the subscripts.

Reference numerals 421 and 422 denote optical multiplexers comprising, for example, array waveguide diffraction gratings or optical couplers; the optical multiplexer 421 multiplexes lights from odd-number-th light sources. The optical multiplexer 422 multiplexes lights from even-number-th light sources independently of the multiplexer 421. A multiplexed output from the optical multiplexer 421 is modulated by a modulator 427, while a multiplexed output from the optical multiplexer 422 is modulated by a modulator 428. The modulators 427 and 428, for example, modifies the intensity and phase of the input multiplexed light and are specifically one Mach-Zehnder intensity modulator using lithium niobate as a medium and one phase modulator using lithium niobate as a medium, the modulators being connected together in series.

Output lights from the modulators 427 and 428 are combined by the polarization multiplexer 430, and are demultiplexed into different wavelengths by a demultiplexer 440 composed of a separation filter, thus generating a plurality of optical carriers of different wavelengths.

Figure 67A:
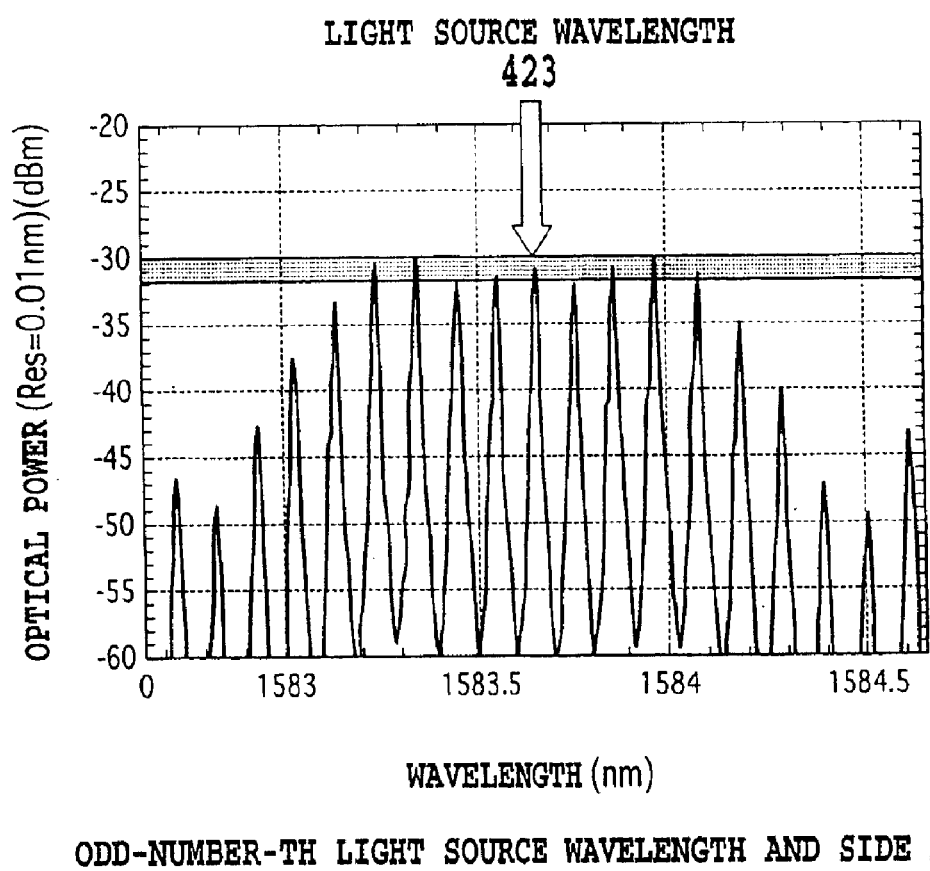
FIGS. 67A and 67B are characteristic views showing, for odd-number-th light sources and even-number-th light sources, optical spectra observed before a polarization multiplexer according to the first embodiment of the multi-wavelength light source of the aspect of the present invention shown in FIG. 66.
Figure 67B:
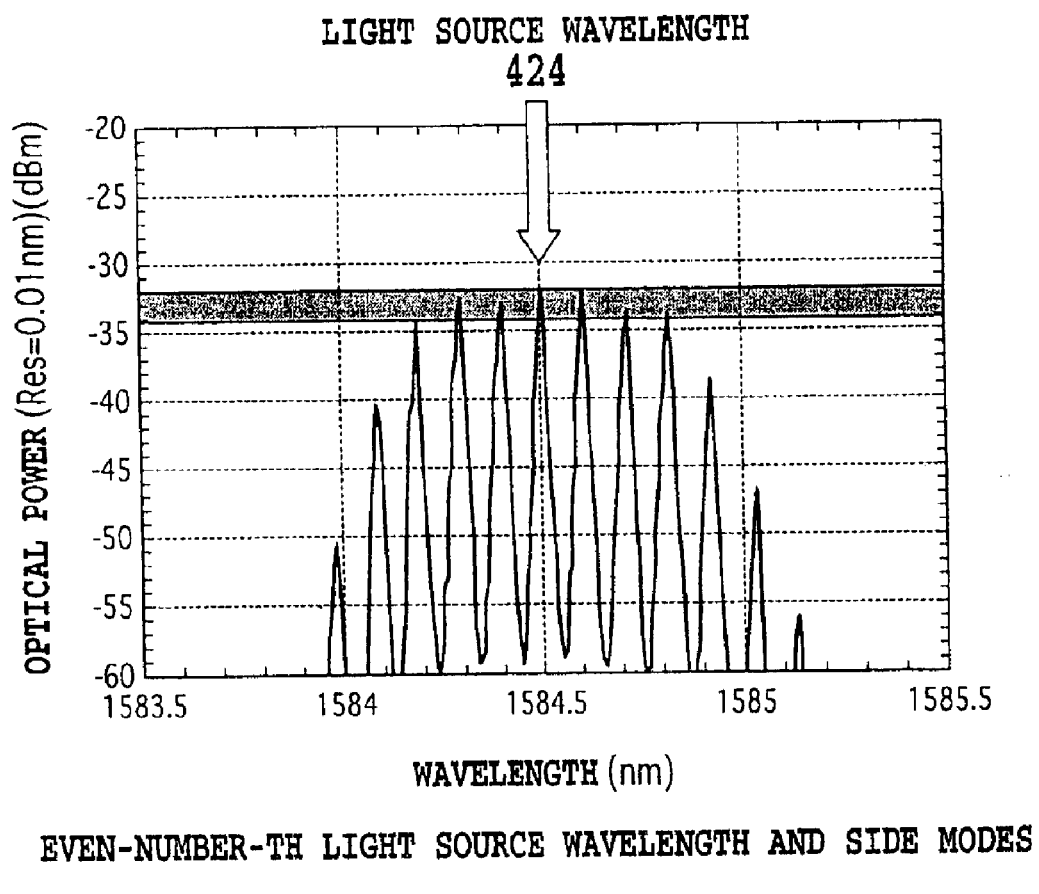

FIG. 67A shows an enlarged view of part of a multi-wavelength optical spectrum of odd-number-th wavelengths at a point A prior to polarization multiplexing. FIG. 67B shows an enlarged view of part of a multi-wavelength optical spectrum of even-number-th wavelengths at a point B prior to the polarization multiplexing.

Figure 68:
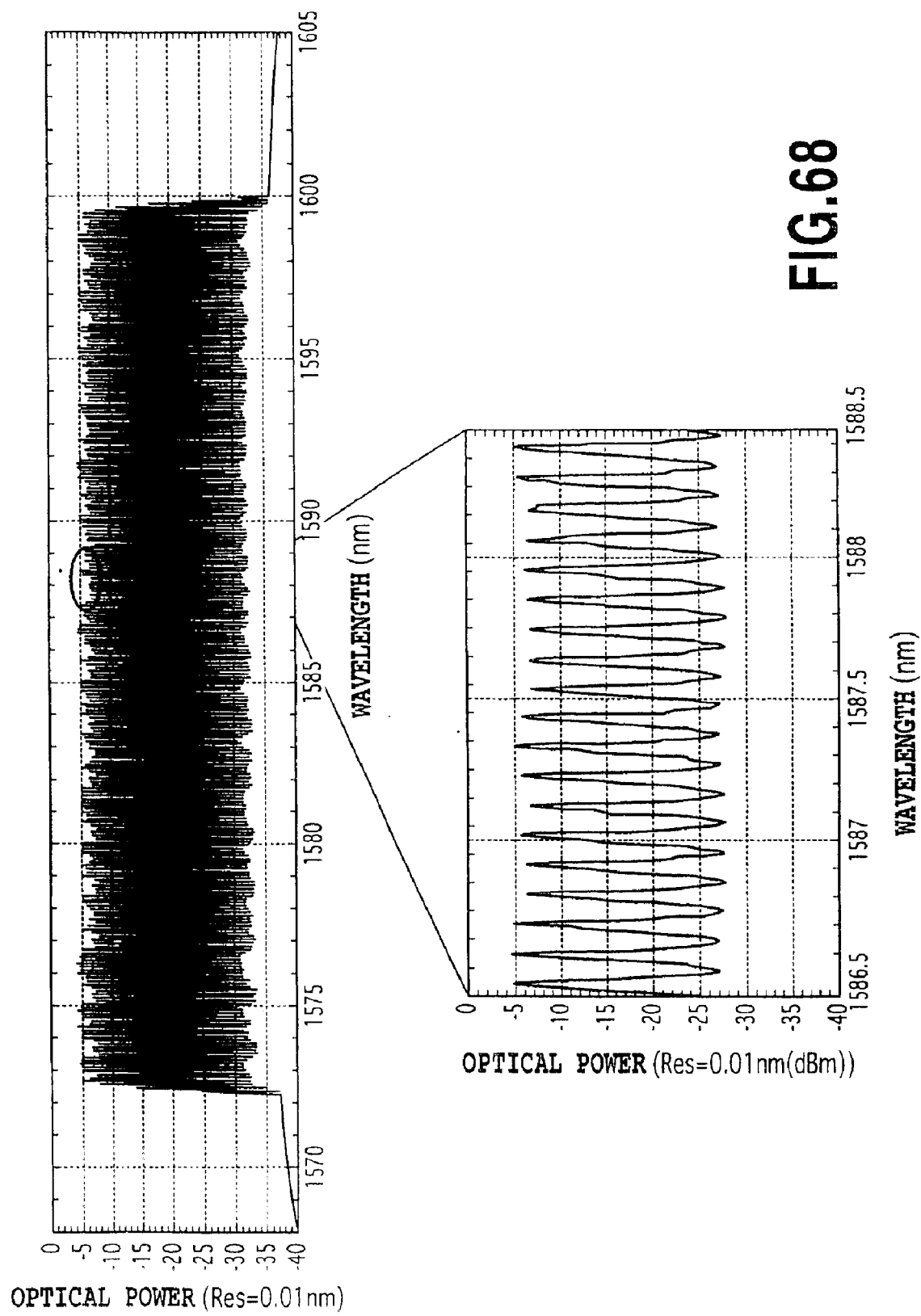
FIG. 68 is a characteristic view showing optical spectra observed after the polarization multiplexer according to the first embodiment of the multi-wavelength light source of the aspect of the present invention shown in FIG. 66.

As shown in FIGS. 67A and 67B, the shape of a spectrum of a side mode light from the modulator 427 (FIG. 67A) need not necessarily be the same as the shape of a spectrum of a side mode light from the modulator 428 (FIG. 67B). These shapes may be properly regulated after the polarization multiplexing by the polarization multiplexer 430 so that the optical powers of all the wavelengths are substantially the same as shown in FIG. 68. FIG. 68 shows an optical spectrum from a multi-wavelength light source implemented with the above configuration including 2n=32 light sources of wavelength spacing 100 GHz, the spectrum having been obtained at a point C before passage through the final polarization multiplexer 430.

The number of wavelengths obtained after the wavelength multiplexing process based on the present invention is generally odd, but the system requirements often include an even multiple of the number of light sources (for example, generation of spectra at intervals of 10 GHz, 12.5 GHz, or 25 GHz from a plurality of light sources providing wavelengths at internals of 100 GHz). Thus, side mode lights are preferably generated by regulating the operations of the modulators 427 and 428 so that, for example, the wavelengths from the odd-number-th light sources are multiplied by (2N+m) (N is a natural number, and m is an integer), whereas the wavelengths from the even-number-th light sources are multiplied by (2N−m).

FIG. 67A shows an example in which the wavelengths from the odd-number-th light sources are multiplied by 9. The "multiplication by 9" means the light source wavelength shown by an arrow 423 and eight other side mode lights, that is, the optical powers of the nine wavelengths, are present within a predetermined range. On the other hand, the example in FIG. 67B shows, for the even-number-th light sources, "multiplication by 7" in which the output powers of the light source wavelength shown by an arrow 424 and of six other side mode lights are present within a predetermined range. When the modulators 421 and 422 generate multi-wavelength lights of different spectral shapes and the polarization multiplexer 430 combines these multi-wavelength lights as described above, optical power deviations among all the wavelengths can be reduced down to 3.5 dB or less, so that the optical powers are substantially uniform.

Figure 69:
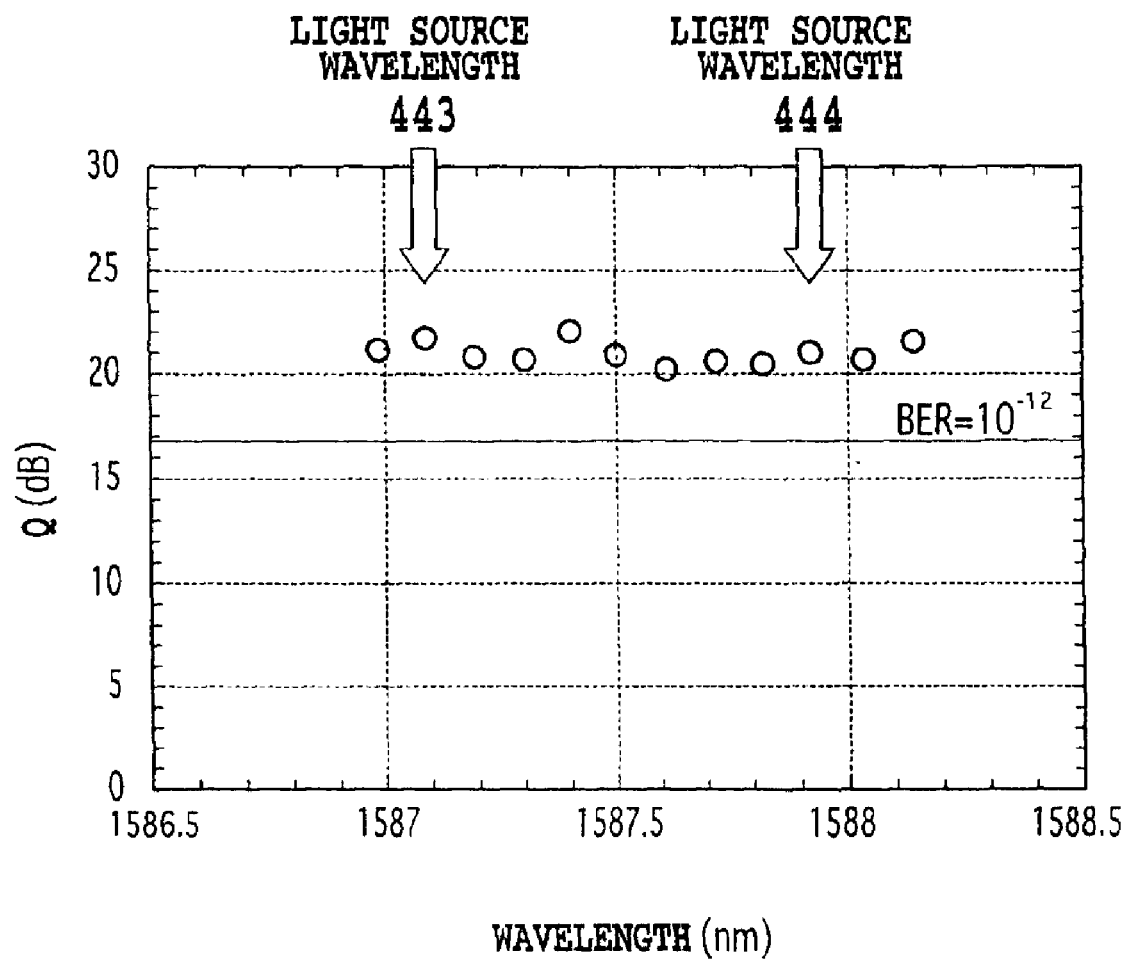
FIG. 69 is a characteristic diagram showing a Q factor according to the first embodiment of the multi-wavelength light source of the aspect of the present invention shown in FIG. 66.

FIG. 69 shows the results of a measurement of the Q factor of a signal obtained by causing a wavelength separating filter of the demultiplexer 440 to separate the light source wavelengths from one another and modulating each wavelength using a test signal.

The Q factor is obtained by measuring the code error rate by varying an identification point of a received waveform, while measuring the code error rate, and by estimating a kind of signal-to-noise ratio on the basis of the measurement. As the Q factor increases, the signal-to-noise ratio increases and the characteristics are improved. In FIG. 69, a light source wavelength 443 and a light source wavelength 444 are obtained from adjacent light sources (the subscripts of the reference numerals are continuous). Polarization multiplexed wavelengths side mode lights of the light source wavelengths 443 and 444 also exhibit high Q factors, indicating that this embodiment enables signal modulation free from interfering noise or the like. [Second Embodiment of the Multi-Wavelength Light Source]

Figure 70:
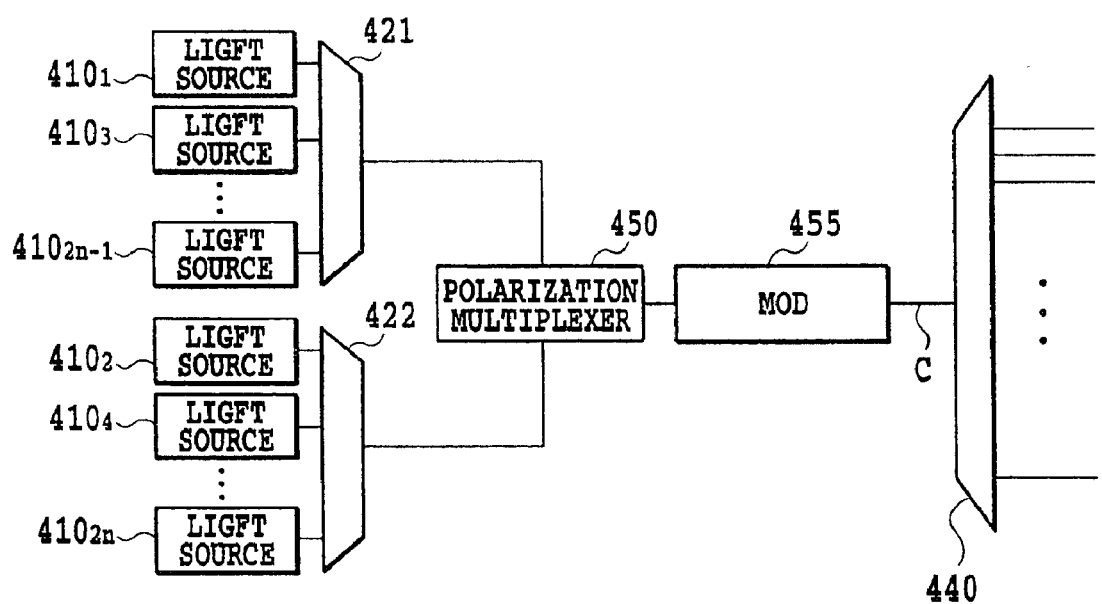
FIG. 70 is a view showing the configuration of a second embodiment of the multi-wavelength light source according to the aspect of the present invention shown in FIG. 66.

FIG. 70 is a view showing the configuration of a second embodiment of the multi-wavelength light source according to the present invention.

The multi-wavelength light source according to this embodiment is composed of light sources $410_1$ to $410_{2n}$, an optical multiplexer 421, an optical multiplexer 422, a polarization multiplexer 450, a modulator 455, and a demultiplexer 440. Components denoted by the same reference numerals as those in FIG. 66 have the same configuration, and description thereof is thus omitted.

The multi-wavelength light source of this embodiment will be described in comparison with that of the first embodiment. In this embodiment, the polarization multiplexer 450 combines a spectrum before the modulator 455 executes the wavelength multiplexing process.

This configuration reduces the number of modulators, and is thus much simpler than that of the first embodiment. The modulator 455, however, must include a polarization-independent intensity and phase modulators.

In the configuration of this embodiment, the modulator 455 preferably regulates the shape of a spectrum of side mode lights generated by the light sources $410_1$ to $410_{2n}$ so that the optical powers of the wavelengths obtained at the point C before passage through the polarization multiplexer 430 located at the end are substantially equal.

An example of regulations will be described with reference to FIG. 71, the regulations required if side mode light are generated from a plurality of light sources providing wavelengths at intervals of 100 GHz so that the spectrum spacing is 12.5 GHz after the wavelength multiplexing process according to this configuration. Reference numerals (a) to (c) in FIG. 71 show spectra obtained at the point C.

Numeral (a) shows a spectrum from the odd-number-th light sources, numeral (b) shows a spectrum from the even-number-th light sources, and numeral (c) shows a combination of these spectra.

The spectrum from the odd-number-th light sources includes a wavelength 461 from an odd-number-th light source, 6 side mode lights 461a of a substantially equal power, and the other side mode lights 461b of half the power, a wavelength 463 from another odd-number-th light sources, 6 side mode lights 463a of a substantially equal power, and the other side mode lights 463b of half the power, . . . . On the other hand, the spectrum from the even-number-th light sources includes a wavelength 462 from an even-number-th light source, 6 side mode lights 462a of a substantially equal power, and the other side mode lights 462b of half the power, . . . .

When the intensity and phase modulating operations are regulated so as to obtain such spectra, the optical spectrum prior to separation is substantially uniform at the point C before passage through the polarization multiplexer 430 located at the end, as shown by numeral (c) in FIG. 71.

As described above, according to the multi-wavelength light source of the present invention, when a plurality of optical carriers are generated by generating side mode lights by means of intensity and phase modulations to multiplex the wavelengths of input lights from the plurality of light sources for generating lights of different wavelengths, two side mode lights of the same wavelength generated by different light sources with contiguous wavelengths do not interfere with each other, thereby preventing noise. A multi-wavelength light source having a simple and inexpensive configuration and having no gap among wavelength grids arranged at equal intervals can be provided without the need to design a complicated optical circuit.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A multi-wavelength light for generating a plurality of optical carriers of different wavelengths from a plurality of input lights of different central wavelengths, comprising:

first multiplexing means for multiplexing those of said plurality of input lights which have an odd-number-th wavelength;

second multiplexing means for multiplexing those of said plurality of input lights which have an even-number-th wavelength;

first modulating means for modulating an output light from said first multiplexing means;

second modulating means for modulating an output light from said second multiplexing means;

polarization multiplexing means for combining outputs from said first and second modulating means with orthogonal polarization; and separating means for separating a synthesized multi-wavelength output from said polarization multiplexing means, into said optical carriers of different wavelengths.

2. A multi-wavelength light according to claim 1, wherein:

said first modulating means generates side mode lights at an output thereof in a manner such that the optical powers of (2N+m) (N is a natural number, and m is an integer) wavelengths fall within a predetermined range, and said second modulating section generates side mode lights at an output thereof in a manner such that the optical powers of (2N−m) (N is a natural number, and m is an integer) wavelengths fall within a predetermined range.

3. A multi-wavelength light according to claim 1, wherein:

said first and second modulating means executes such modulations that side modes are output so that the optical powers of output wavelengths at outputs of said polarization multiplexing means are substantially equal.

4. A multi-wavelength light according to claim 3, wherein:

said first and second modulating means outputs side modes so that those of the side modes of an output light corresponding to said plurality of adjacent input lights which are each located between each of adjacent input optical wavelengths and a substantially intermediate wavelength between said input optical wavelengths have a substantially fixed optical power, and side modes of the same wavelength, that is, said substantially intermediate wavelength, have substantially half of said fixed optical power.

5. A multi-wavelength light for generating a plurality of optical carriers of different wavelengths from a plurality of input lights of different central wavelengths, comprising:

first multiplexing means for multiplexing those of said plurality of input lights which have an odd-number-th wavelength;

second multiplexing means for multiplexing those of said plurality of input lights which have an even-number-th wavelength;

polarization multiplexing means for combining a multiplexed output from said first multiplexing means and a multiplexed output from said second multiplexing means so that those outputs are combined with orthogonal polarization;

modulating means for modulating an output light from said polarization multiplexing means; and separating means for separating a modulated multi-wavelength output from said modulating means, into said optical carriers of different wavelengths.

6. A multi-wavelength light according to claim 5, wherein:

said modulating means executes such modulations that side modes are output so that the optical powers of output wavelengths at output of said modulating means are substantially equal.

7. A multi-wavelength light according to claim 6, wherein:

said modulating means outputs side modes so that those of the side modes of an output light corresponding to said plurality of adjacent input lights which are each located between each of adjacent input optical wavelengths and a substantially intermediate wavelength between said input optical wavelengths have a substantially fixed optical power, and side modes of the same wavelength, that is, said substantially intermediate wavelength, have substantially half of said fixed optical power.

* * * * *